United States Patent
Myung et al.

(10) Patent No.: US 11,917,684 B2
(45) Date of Patent: Feb. 27, 2024

(54) CHANNEL ACCESS PROCEDURE BY APPARATUS IN UNLICENSED BAND

(71) Applicant: LG ELECTRONICS INC., Seoul (KR)

(72) Inventors: Sechang Myung, Seoul (KR); Suckchel Yang, Seoul (KR); Seonwook Kim, Seoul (KR); Joonkui Ahn, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 17/421,652

(22) PCT Filed: Jan. 13, 2020

(86) PCT No.: PCT/KR2020/000597
§ 371 (c)(1),
(2) Date: Jul. 8, 2021

(87) PCT Pub. No.: WO2020/145784
PCT Pub. Date: Jul. 16, 2020

(65) Prior Publication Data
US 2022/0086908 A1 Mar. 17, 2022

Related U.S. Application Data

(60) Provisional application No. 62/887,661, filed on Aug. 15, 2019.

(30) Foreign Application Priority Data

Jan. 11, 2019 (KR) .................. 10-2019-0004105
Mar. 28, 2019 (KR) .................. 10-2019-0036051

(51) Int. Cl.
*H04W 74/08* (2009.01)
*H04W 16/14* (2009.01)

(52) U.S. Cl.
CPC ... *H04W 74/0816* (2013.01); *H04W 74/0875* (2013.01); *H04W 16/14* (2013.01)

(58) Field of Classification Search
CPC ............. H04W 16/14; H04W 74/0816; H04W 74/0875
See application file for complete search history.

(56) References Cited

U.S. PATENT DOCUMENTS 11,184,926 B2 * 11/2021 Falahati ................ H04W 16/14
11,272,539 B2 * 3/2022 Babaei .................. H04W 48/12
(Continued)

FOREIGN PATENT DOCUMENTS

KR 10-2018-0121938 A 11/2018
WO 2018/024022 A1 2/2018
(Continued)

*Primary Examiner* — Liton Miah
(74) *Attorney, Agent, or Firm* — BRYAN CAVE LEIGHTON PAISNER LLP

(57) ABSTRACT

Provided are a method of performing a channel access procedure by an apparatus in an unlicensed band, and an apparatus using same method. The apparatus determines a contention window size (CWS) and performs a channel access procedure with respect to a first channel on the basis of the determined contention window size. The contention window size may be adjusted on the basis of feedback information relating to a second channel. When a transmission history of the second channel, which is to be reflected in determining the contention window size, does not exist, the contention window size may be determined to be a minimum CWS value in a specific channel access priority class.

18 Claims, 42 Drawing Sheets

(56) References Cited

U.S. PATENT DOCUMENTS

| | | |
|---|---|---|
| 2018/0124828 A1 | 5/2018 | Kim et al. |
| 2019/0149270 A1* | 5/2019 | Liu ........................ H04L 1/187 370/329 |
| 2019/0150196 A1* | 5/2019 | Koorapaty ........ H04W 72/0446 370/329 |
| 2019/0215866 A1* | 7/2019 | Falahati ................ H04L 5/0055 |
| 2020/0374922 A1* | 11/2020 | Tang .................... H04L 5/0055 |
| 2021/0219339 A1* | 7/2021 | Tang .................... H04L 1/1812 |
| 2021/0377944 A1* | 12/2021 | Noh ................. H04W 72/0453 |

FOREIGN PATENT DOCUMENTS

| | | |
|---|---|---|
| WO | 2018/029654 A1 | 2/2018 |
| WO | 2018/174613 A1 | 9/2018 |

\* cited by examiner

FIG. 19
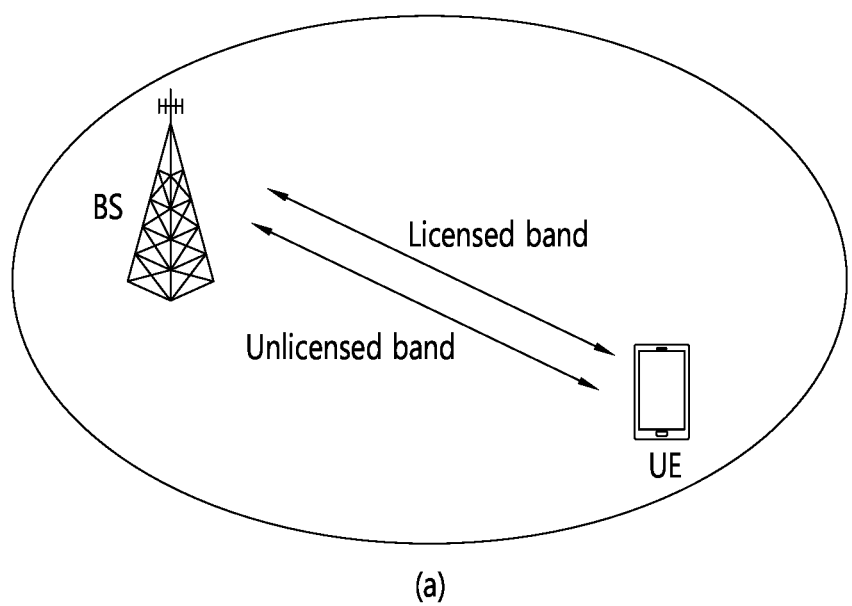
(a)
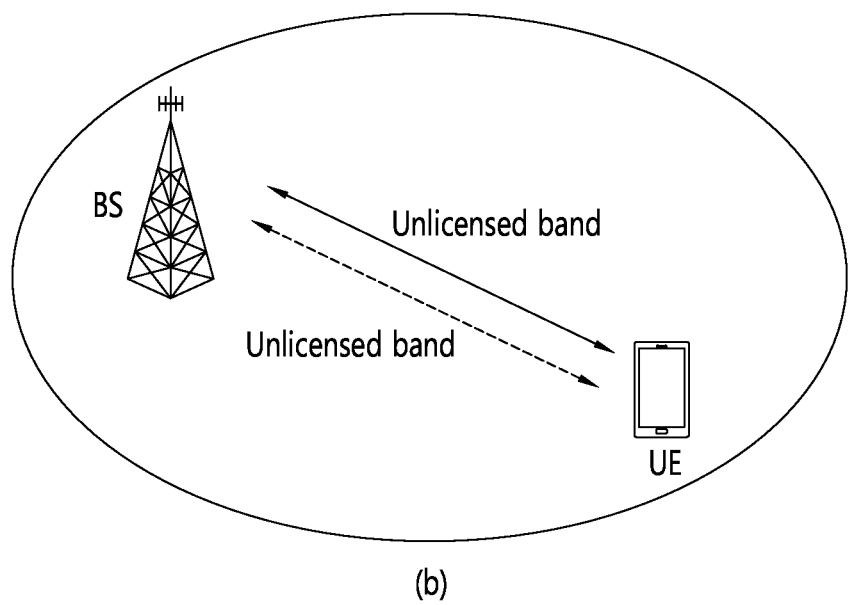
(b)

Non-interleaved CCE-to-REG mapping

CHANNEL ACCESS PROCEDURE BY APPARATUS IN UNLICENSED BAND

This application is a 35 USC § 371 National Stage entry of International Application No. PCT/KR2020/000597, filed on Jan. 13, 2020, which claims priority to U.S. Provisional Application No. 62/887,661, filed on Aug. 15, 2019, Korean Patent Application No. 10-2019-0004105, filed on Jan. 11, 2019, and Korean Patent Application No. 10-2019-0036051, filed on Mar. 28, 2019 all of which are incorporated by reference in their entirety herein.

FIELD OF THE DISCLOSURE

The present disclosure relates to a channel access procedure of a device in an unlicensed band.

RELATED ART

Wireless communication systems are widely developed to provide various types of communication services such as voice and data. In general, a wireless communication system is a multiple access system capable of supporting communication with multiple users by sharing available system resources (bandwidth, transmission power, etc.). Examples of multiple access systems include code division multiple access (CDMA) systems, frequency division multiple access (FDMA) systems, time division multiple access (TDMA) systems, orthogonal frequency division multiple access (OFDMA) systems, and single carrier-frequency division multiple access (SC-FDMA) systems.

Meanwhile, as more communication devices require a larger communication capacity, there is a need for improved mobile broadband communication compared to the existing radio access technology (RAT). In addition, massive machine type communications (MTC), which provides various services anytime and anywhere by connecting multiple devices and objects, is one of the major issues to be considered in next-generation communications. In addition, a communication system design in consideration of services/UEs sensitive to reliability and latency has been discussed. The introduction of a next-generation wireless access technology considering the enhanced mobile broadband communication), massive MTC, and ultra-reliable and low latency communication (URLLC) has been discussed, and in this disclosure, the technology is called new RAT or NR for convenience.

Cellular communication systems such as long term evolution (LTE)/NR systems considers to use unlicensed bands such as the 2.4 gigahertz (GHz) band mainly used by existing Wi-Fi systems or unlicensed bands such as 5 GHz and 60 GHz bands, which are attracting new attention, for traffic offloading.

Basically, the unlicensed band assumes a method of transmitting and receiving wirelessly through contention between communication nodes, it is required for each communication node to perform channel sensing before transmitting a signal to determine that another communication node does not transmit a signal. For convenience, this operation is called listen before talk (LBT) or channel access procedure, and in particular, the operation of determining whether another communication node transmits a signal is called carrier sensing (CS) and the case of determining that another communication node does not transmit a signal is defined as that clear channel assessment (CCA) is confirmed.

Meanwhile, among the channel access procedures, there may be a method of using a backoff counter and a method of not using a backoff counter. The method of using the backoff counter is to set a random value between 0 and a value called the contention window (CW) (let's call it CWp) as the initial value of the backoff counter, and it checks whether the channel of the unlicensed band is in the idle state, and if it is in the idle state, the backoff counter value is reduced by 1. Through this process, when the backoff counter value becomes 0, a signal is transmitted through the channel And, if the channel of the unlicensed band is not in the idle state, it is checked whether the channel state is in the idle state again. In this manner, the size of the contention window may be adjusted based on feedback from the receiving end.

However, among the channels transmitted by the transmitting end, there may be a channel in which the receiving end does not provide feedback. In this case, it may be a problem of how to determine the size of the contention window.

SUMMARY OF THE DISCLOSURE

The technical problem to be solved by the present disclosure is to provide a channel access procedure for a device in an unlicensed band.

In one aspect, provided is a method for performing a channel access procedure of a terminal in an unlicensed band. When there is no transmission history of a second channel to be reflected in determining the contention window size (CWS), the terminal determines a minimum CWS value in a specific channel access priority class (CAPC) as the CWS. And then the terminal performs a channel access procedure for a first channel based on the determined CWS.

In another aspect, provided is a terminal. The terminal includes a transceiver, at least one memory and at least one processor being operatively connected to the at least one memory and the transceiver. The processor is operated according to the method.

In still another aspect, provided is a method for communicating with a terminal by a base station in an unlicensed band. The method includes receiving, from the terminal, a signal through a first channel, the signal being a signal transmitted through the first channel after the terminal determines a contention window size (CWS) and performs a channel access procedure for the first channel based on the determined CWS. When there is no transmission history of the second channel to be reflected in determining the CWS, the CWS is determined as a minimum CWS value in a specific channel access priority class (CAPC).

In still another aspect, provided is a base station. The base station includes a transceiver, at least one memory and at least one processor being operatively connected to the at least one memory and the transceiver. The processor is operated according to the method for communicating with a terminal by a base station.

In still another aspect, provided is at least one computer readable medium (CRM) including instructions being executed by at least one processor. When there is no transmission history of a second channel to be reflected in determining the channel window size (CWS), the CRM determines a minimum CWS value in a specific channel access priority class (CAPC) as the CWS, and performs a channel access procedure for a first channel based on the determined CWS.

In still another aspect, provided is an apparatus. The apparatus includes at least one memory and at least one processor being operatively connected to the at least one memory. When there is no transmission history of a second channel to be reflected in determining the channel window size (CWS), the processor determines a minimum CWS value in a specific channel access priority class (CAPC) as the CWS, and performs a channel access procedure for a first channel based on the determined CWS.

This specification can have various effects. For example, it is possible to effectively update the contention window size for a channel or signal without explicit feedback. The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

BRIEF DESCRIPTION OF THE DRAWINGS

FIGS. 19(a) and 19(b) illustrate an example of a wireless communication system supporting an unlicensed band.

DESCRIPTION OF EXEMPLARY EMBODIMENTS

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, and C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, parentheses used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

In the present specification, technical features that are individually described in one drawing may be implemented individually or at the same time.

Figure 1:
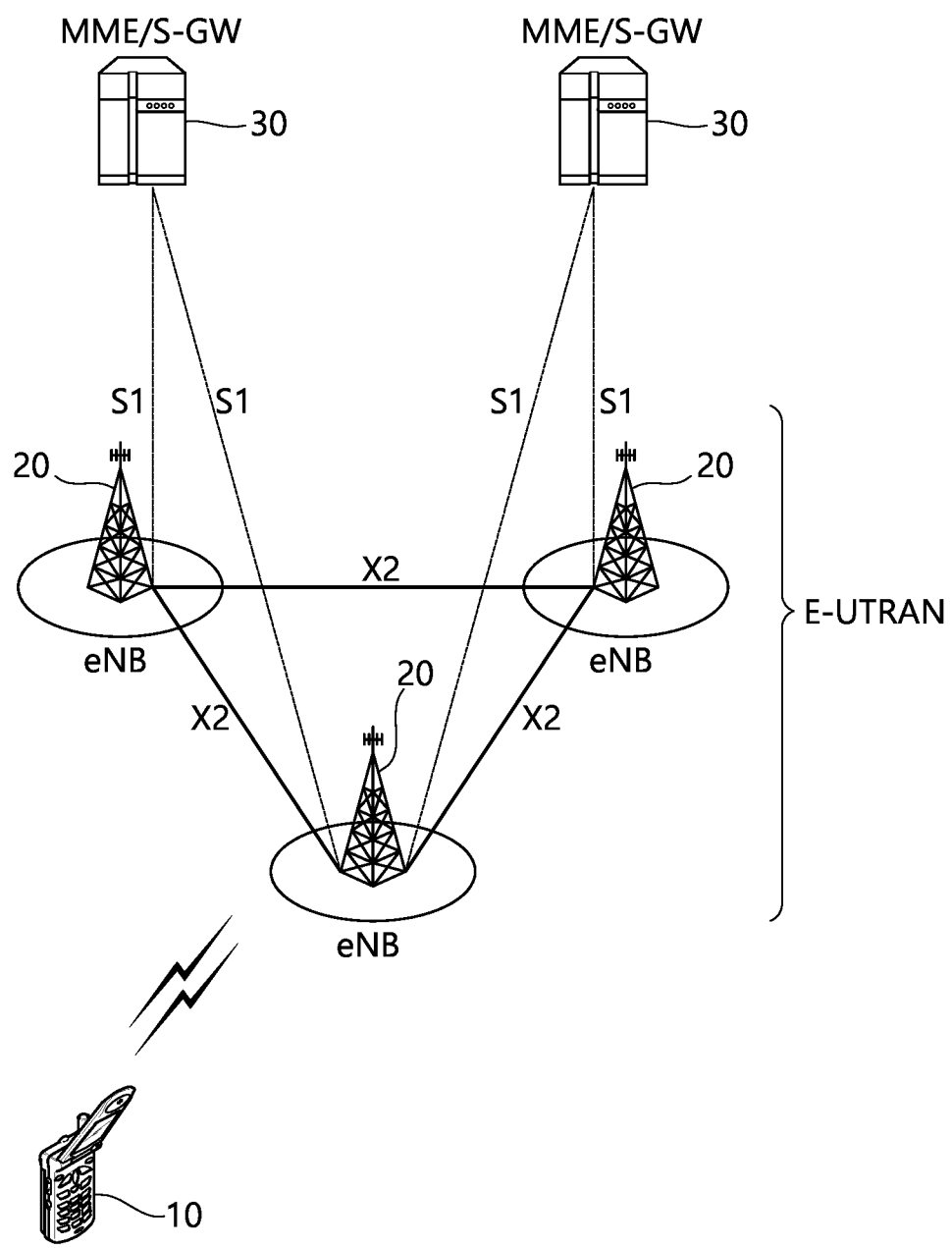
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
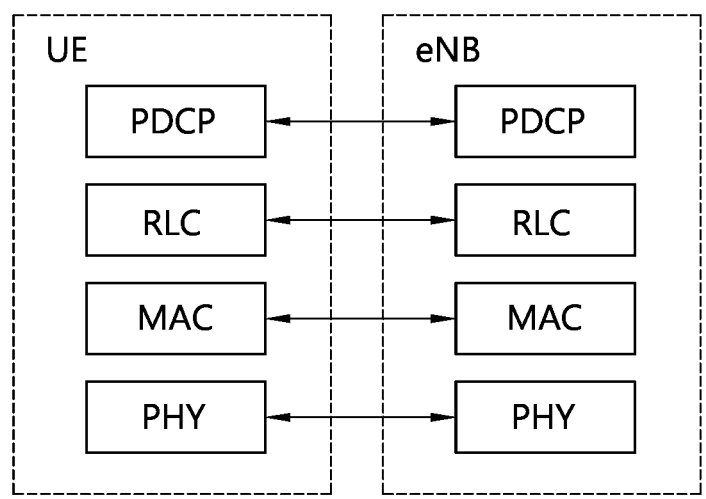
FIG. 2 is a diagram showing a radio protocol architecture for a user plane.
Figure 3:
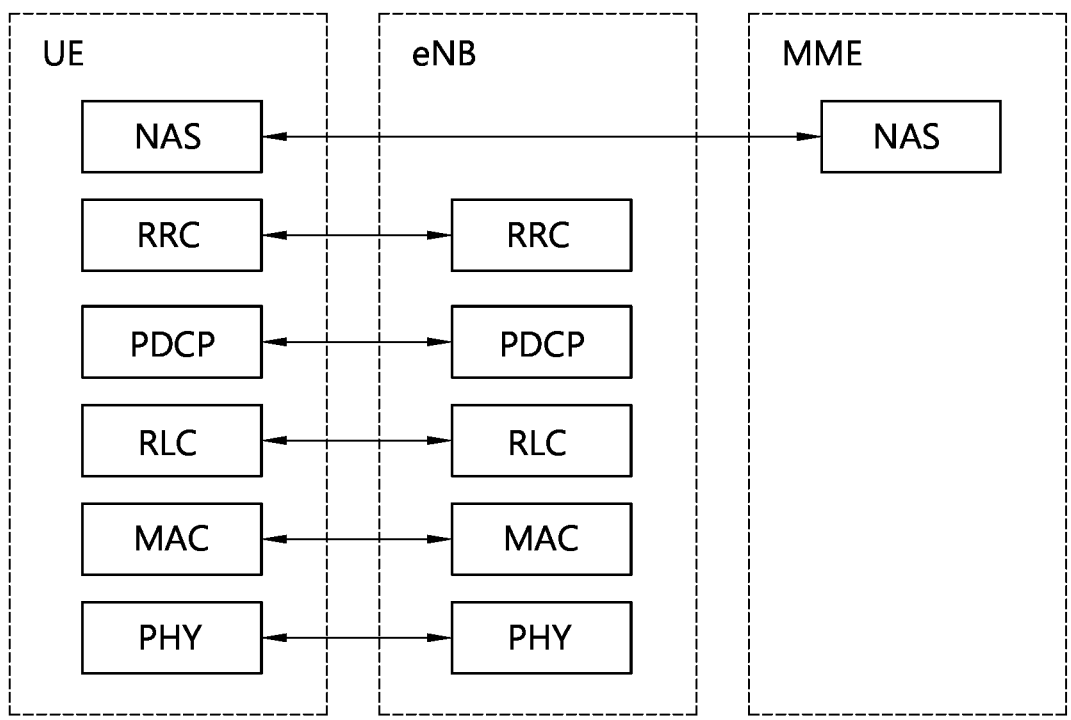
FIG. 3 is a diagram showing a radio protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission. For example, a subframe or a slot may be the TTI.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
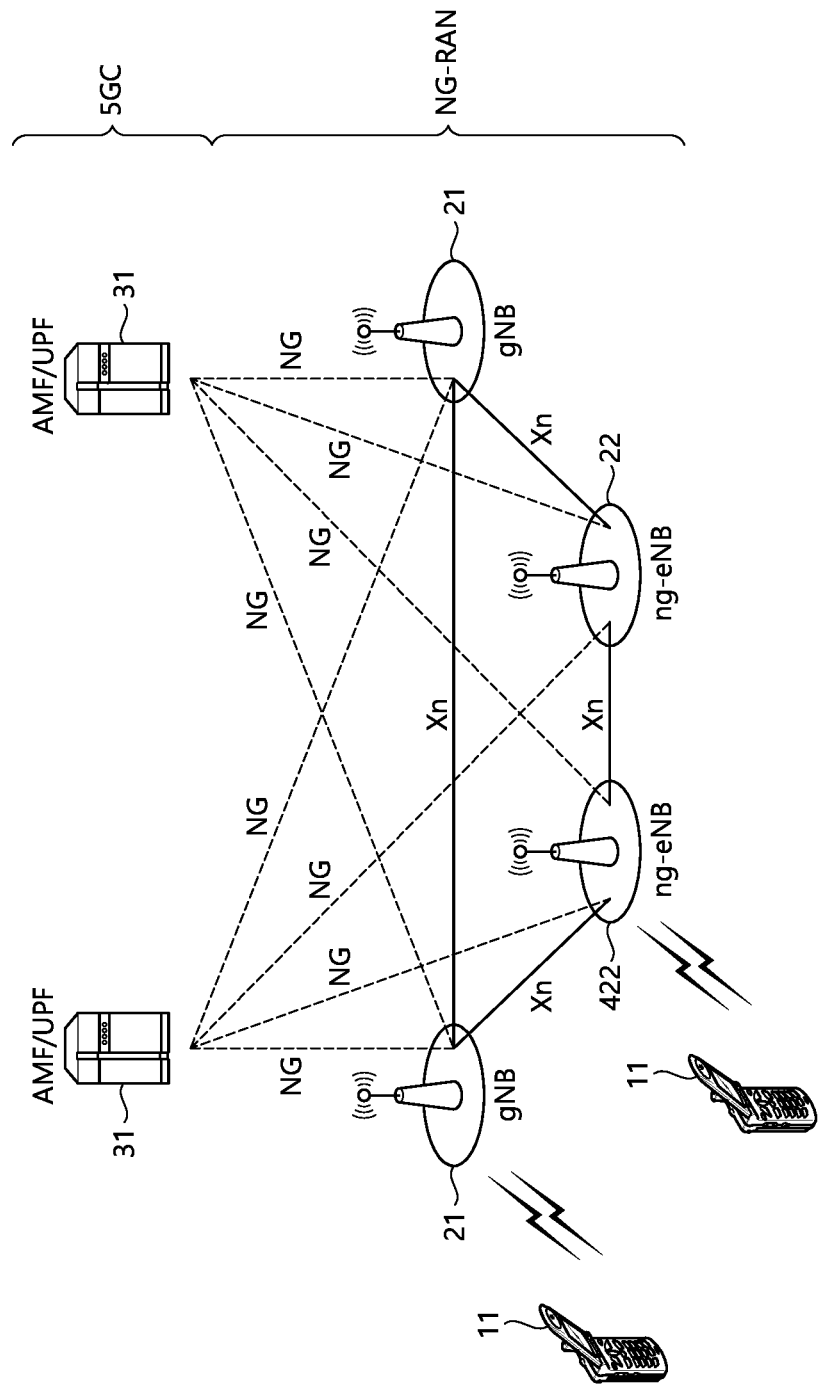
FIG. 4 illustrates another example of a wireless communication system to which technical features of the present disclosure are applicable.

FIG. 4 illustrates another example of a wireless communication system to which technical features of the present disclosure are applicable.

Specifically, FIG. 4 shows system architecture based on a 5G new radio access technology (NR) system. Entities used in the 5G NR system (hereinafter, simply referred to as "NR") may absorb some or all functions of the entities (e.g., the eNB, the MME, and the S-GW) introduced in FIG. 1. The entities used in the NR system may be identified by terms with "NG" to be distinguished from LTE entities.

Referring to FIG. 4, the wireless communication system includes at least one UE 11, a next-generation RAN (NG-RAN), and a 5G core network (5GC). The NG-RAN includes at least one NG-RAN node. The NG-RAN node is an entity corresponding to the BS 20 illustrated in FIG. 5. The NG-RAN node includes at least one gNB 21 and/or at least one ng-eNB 22. The gNB 21 provides an end point of NR control-plane and user-plane protocols to the UE 11. The ng-eNB 22 provides an end point of E-UTRA user-plane and control-plane protocols to the UE 11.

The 5GC includes an access and mobility management function (AMF), a user plane function (UPF), and a session management function (SMF). The AMF hosts functions of NAS security and idle-state mobility processing. The AMF is an entity that includes the functions of a conventional MME. The UPF hosts functions of mobility anchoring function and protocol data unit (PDU) processing. The UPF is an entity that includes the functions of a conventional S-GW. The SMF hosts functions of UE IP address allocation and PDU session control.

The gNB and the ng-eNB are connected to each other via an Xn interface. The gNB and the ng-eNB are also connected to the 5GC through an NG interface. Specifically, the gNB and the ng-eNB are connected to the AMF through an NG-C interface, and to the UPF through an NG-U interface.

Figure 5:
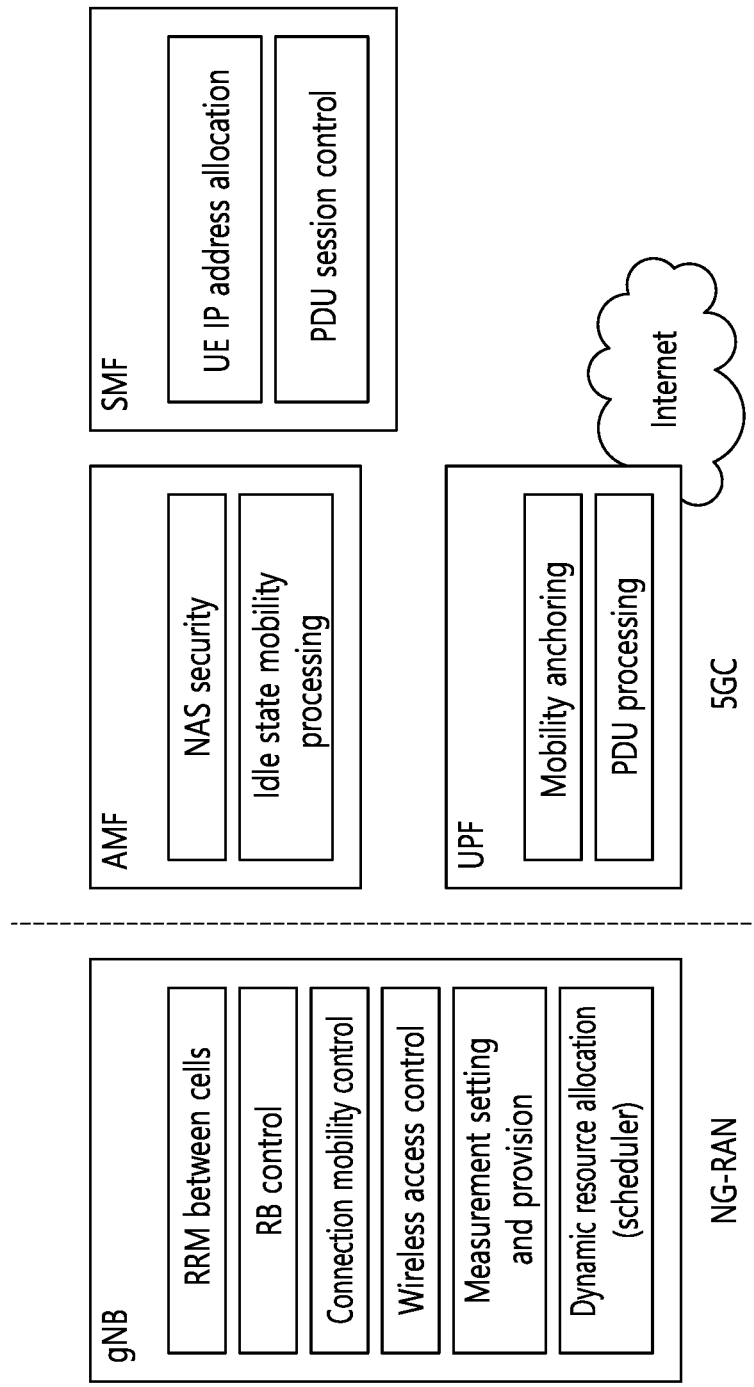
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
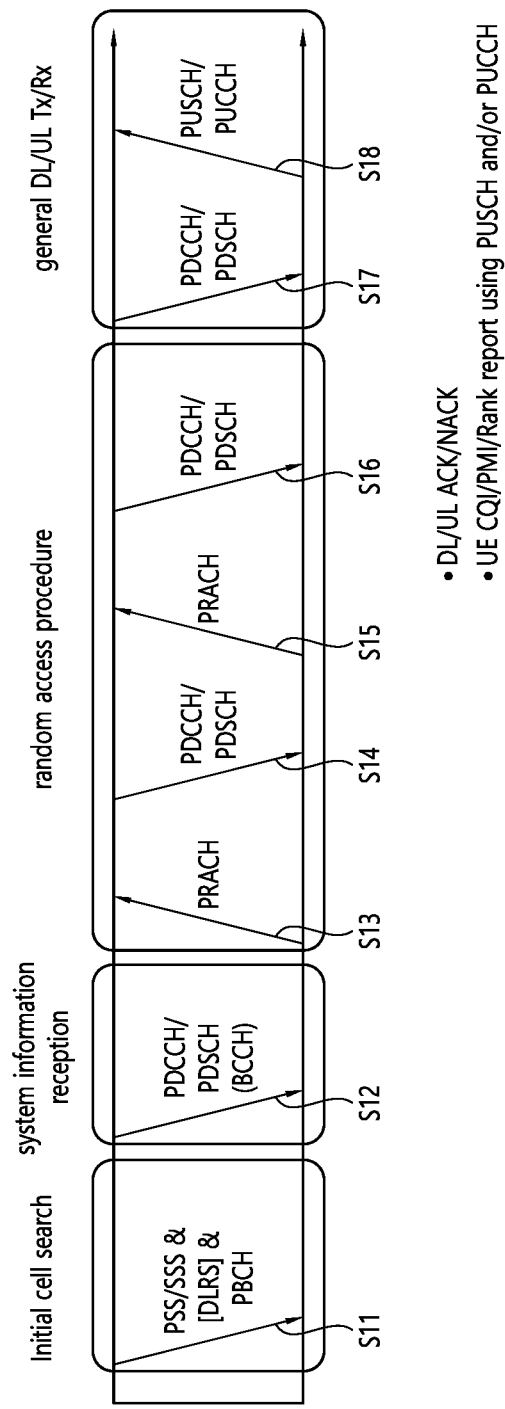
FIG. 6 illustrates physical channels and general signal transmission used in a wireless communication system.

FIG. 6 illustrates physical channels and general signal transmission used in a wireless communication system. In a wireless communication system, a terminal(=UE) receives a signal/information from a base station through a downlink (DL), and the terminal transmits the signal/information to a base station through an uplink (UL). Signals/information transmitted and received by the base station and the terminal include data and various control information, and various physical channels exist according to the type/use of signals/information transmitted and received by them.

When the power is turned on again while the power is turned off, or the terminal newly entering the cell performs an initial cell search operation such as synchronizing with the base station (S11). To this end, the terminal receives the SSB (Synchronization Signal Block) from the base station. SSB includes PSS (Primary Synchronization Signal), SSS (Secondary Synchronization Signal) and PBCH (Physical Broadcast Channel). The terminal synchronizes with the base station based on PSS/SSS and acquires information such as cell ID (cell identity). In addition, the terminal may receive the PBCH (Physical Broadcast Channel) from the base station to obtain intra-cell broadcast information. In addition, the terminal may check the downlink channel state by receiving the DL RS (Downlink Reference Signal) in the initial cell search step.

After completing the initial cell search, the terminal may obtain more detailed system information by receiving the PDCCH (Physical Downlink Control Channel) and the corresponding PDSCH (Physical Downlink Shared Channel) (S12). When the random access process is performed in two steps, S13/S15 is performed in one step (in which the terminal performs transmission), and S14/S16 can be performed in one step (in which the base station performs transmission).

Thereafter, the terminal may perform a random access procedure to complete the access to the base station (S13 to S16). Specifically, the terminal may transmit a preamble through a PRACH (Physical Random Access Channel) (S13) and receive a RAR (Random Access Response) for the preamble through a PDCCH and a PDSCH corresponding thereto (S14). Thereafter, the terminal transmits the PUSCH (Physical Uplink Shared Channel) using the scheduling information in the RAR (S15), and may perform a contention resolution procedure such as a PDCCH and a corresponding PDSCH (S16).

After performing the above-described procedure, the terminal may perform PDCCH/PDSCH reception (S17) and PUSCH/PUCCH (Physical Uplink Control Channel) transmission (S18) as a general uplink/downlink signal transmission procedure. Control information transmitted by the terminal to the base station is referred to as UCI (Uplink Control Information). UCI includes HARQ ACK/NACK (Hybrid Automatic Repeat and request Acknowledgement/Negative-ACK), SR (Scheduling Request), CSI (Channel State Information), and the like. CSI includes CQI (Channel Quality Indicator), PMI (Precoding Matrix Indicator), RI (Rank Indication), and the like. UCI is generally transmitted through PUCCH, but may be transmitted through PUSCH when control information and data are to be transmitted at the same time. In addition, the terminal may aperiodically transmit UCI through the PUSCH according to the request/instruction of the network.

Figure 7:
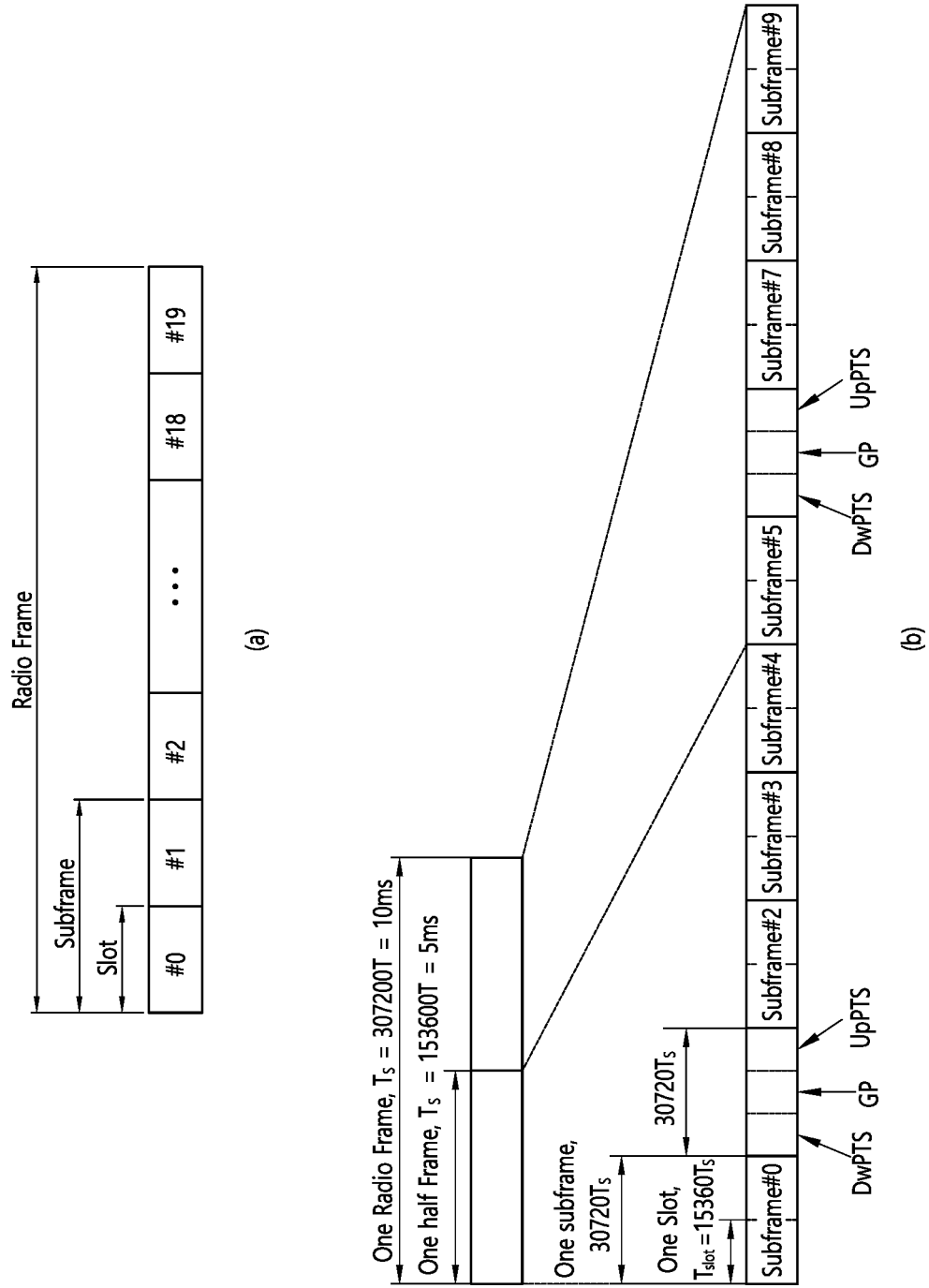
FIG. 7 illustrates an LTE radio frame structure.

FIG. 7 illustrates an LTE radio frame structure.

LTE can support frame type 1 for FDD (Frequency Division Duplex), frame type 2 for TDD (Time Division Duplex), and frame type 3 for UCell (Unlicensed Cell). In addition to PCells (Primary Cells), up to 31 SCells (Secondary Cells) may be aggregated. Unless otherwise specified, operations described below may be independently applied for each cell. When merging multi-cells, different frame structures may be used for different cells. In addition, time resources (e.g., subframes, slots, subslots) in the frame structure may be collectively referred to as a TU (Time Unit).

FIG. 7(a) exemplifies frame type 1. The downlink radio frame is defined as ten 1 ms subframes (Subframes, SFs). The subframe includes 14 or 12 symbols according to a cyclic prefix (CP). When a normal CP (which may also be referred to as a normal CP) is used, a subframe includes 14 symbols. When an extended CP is used, a subframe includes 12 symbols. The symbol may mean an OFDM(A) symbol or an SC-FDM(A) symbol according to a multiple access scheme. For example, the symbol may mean an OFDM(A) symbol in downlink and an SC-FDM(A) symbol in uplink. The OFDM(A) symbol is referred to as a CP-OFDM(A) (Cyclic Prefix-OFDM(A)) symbol, and the SC-FDM(A) symbol may be referred to as a DFT-s-OFDM(A) (Discrete Fourier Transform-spread-OFDM(A)) symbol.

A subframe may be defined as one or more slots as follows according to subcarrier spacing (SCS).

In the case of SCS=7.5 kHz or 15 kHz, subframe #i is defined as two 0.5 ms slots #2i and #2i+1 (i=0-9).

In the case of SCS=1.25 kHz, subframe #i is defined as one 1 ms slot #2i.

In the case of SCS=15 kHz, subframe #i may be defined as six subslots as exemplified in Table A1.

Table A1 exemplifies a subslot configuration in a subframe (normal CP).

TABLE A1

| | Subslot number | | | | | |
|---|---|---|---|---|---|---|
| | 0 | 1 | 2 | 3 | 4 | 5 |
| | | | Slot number | | | |
| | | 2i | | | 2i + 1 | |
| Uplink subslot pattern (symbol number) | 0, 1, 2 | 3, 4 | 5, 6 | 0, 1 | 2, 3 | 4, 5, 6 |
| Downlink subslot pattern 1 (symbol number) | 0, 1, 2 | 3, 4 | 5, 6 | 0, 1 | 2, 3 | 4, 5, 6 |

TABLE A1-continued

| | Subslot number | | | | | |
|---|---|---|---|---|---|---|
| | 0 | 1 | 2 | 3 | 4 | 5 |
| | | | Slot number | | | |
| | | 2i | | | 2i + 1 | |
| Downlink subslot pattern 2 (symbol number) | 0, 1 | 2, 3, 4 | 5, 6 | 0, 1 | 2, 3 | 4, 5, 6 |

FIG. 7(b) exemplifies frame type 2. Frame type 2 consists of two half frames. The half frame includes 4 (or 5) general subframes and 1 (or 0) special subframes. The general subframe is used for uplink or downlink according to UL-DL configuration (Uplink-Downlink Configuration). The subframe consists of two slots.

Table A2 exemplifies a subframe configuration within a radio frame according to a UL-DL configuration.

TABLE A2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Here, D represents a DL subframe, U represents a UL subframe, and S represents a special subframe. The special subframe includes a Downlink Pilot TimeSlot (DwPTS), a Guard Period (GP), and an Uplink Pilot TimeSlot (UpPTS). The DwPTS is used for initial cell search, synchronization, or channel estimation in the terminal. The UpPTS is used for channel estimation at the base station and synchronization for uplink transmission of the terminal. The guard period is a period for removing interference occurring in the uplink due to the multipath delay of the downlink signal between the uplink and the downlink.

Table A3 exemplifies the configuration of a special subframe.

TABLE A3

| | Normal cyclic prefix in downlink | | | Extended cyclic prefix in downlink | | |
|---|---|---|---|---|---|---|
| Special subframe configuration | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | | | $7680 \cdot T_s$ | | |
| 1 | $19760 \cdot T_s$ | $(1 + X) \cdot$ | $(1 + X) \cdot$ | $20480 \cdot T_s$ | $(1 + X) \cdot$ | $(1 + X) \cdot$ |
| 2 | $21952 \cdot T_s$ | $2192 \cdot T_s$ | $2560 \cdot T_s$ | $23040 \cdot T_s$ | $2192 \cdot T_s$ | $2560 \cdot T_s$ |
| 3 | $24144 \cdot T_s$ | | | $25600 \cdot T_s$ | | |
| 4 | $26336 \cdot T_s$ | | | $7680 \cdot T_s$ | $(2 + X) \cdot$ | $(2 + X) \cdot$ |
| 5 | $6592 \cdot T_s$ | $(2 + X) \cdot$ | $(2 + X) \cdot$ | $20480 \cdot T_s$ | $2192 \cdot T_s$ | $2560 \cdot T_s$ |
| 6 | $19760 \cdot T_s$ | $2192 \cdot T_s$ | $2560 \cdot T_s$ | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Here, X is configured by an upper layer (e.g., RRC) signal or is given as 0.

Figure 8:
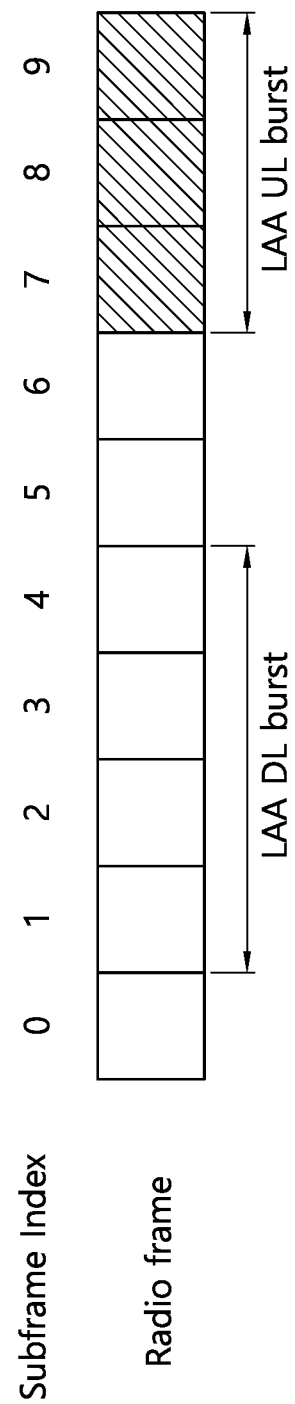
FIG. 8 illustrates frame type 3.

FIG. 8 illustrates frame type 3. Frame type 3 can be applied to UCell operation. Although not limited thereto, frame type 3 can be applied only to the operation of a licensed assisted access (LAA) SCell having a normal CP. The frame has a length of 10 ms and is defined as ten 1 ms subframes. Subframe #i is defined as two consecutive slots #2i and #2i+1. Each subframe in the frame may be used for downlink or uplink transmission, or may be empty. Downlink transmission occupies one or more contiguous subframes, and starts from an arbitrary point in the subframe and ends at a subframe boundary or DwPTS of Table A3. Uplink transmission occupies one or more consecutive subframes.

Figure 9:
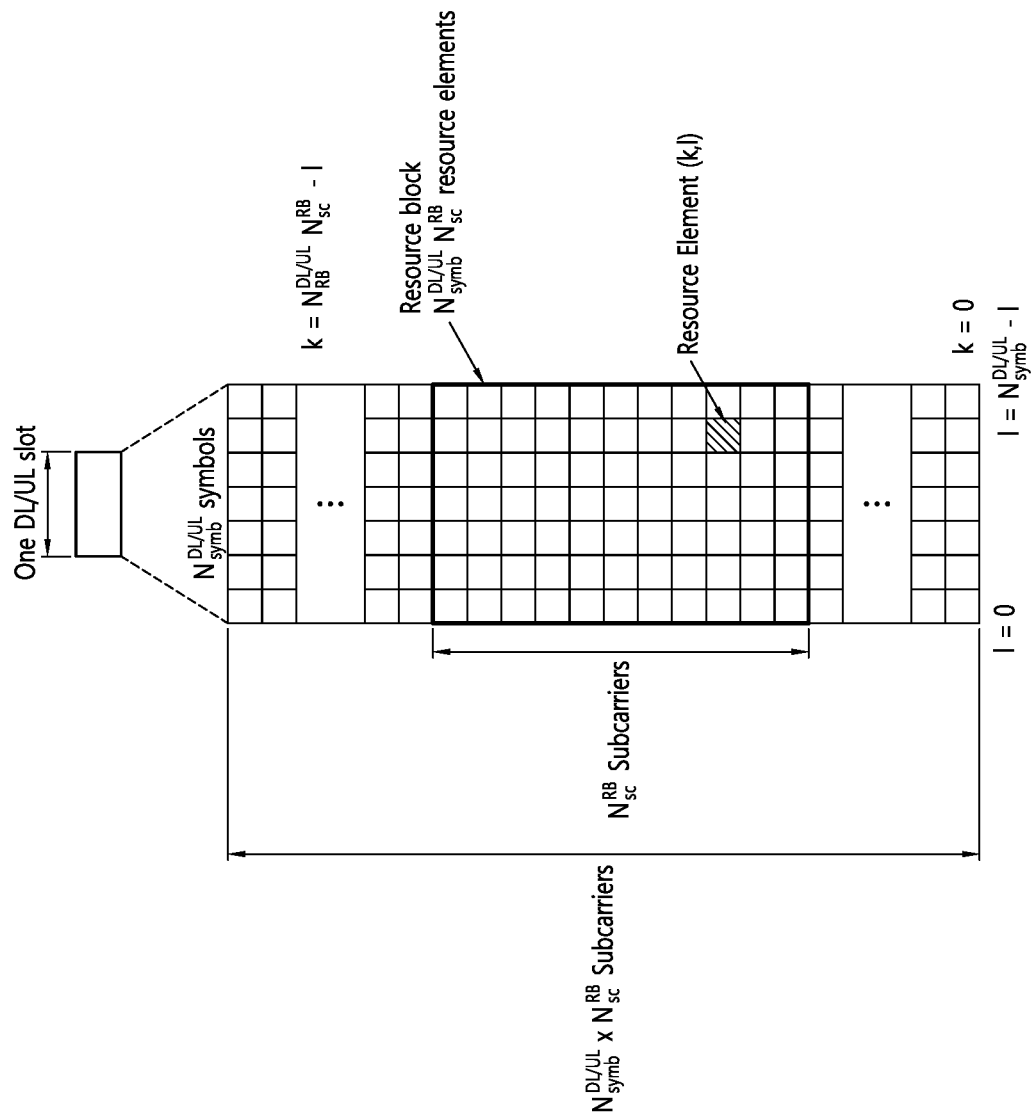
FIG. 9 illustrates a slot structure of an LTE frame.

FIG. 9 illustrates a slot structure of an LTE frame.

Referring to FIG. 9, a slot includes a plurality of symbols in the time domain, and includes a plurality of resource blocks (RBs) in the frequency domain. The symbol also means a symbol duration. The structure of the slot may be expressed as a resource grid consisting of $N^{DL/UL}_{RB} \times N^{RB}_{sc}$ subcarriers and $N^{DL/UL}_{symb}$ symbols. Here, $N^{DL}_{RB}$ represents the number of RBs in the downlink slot, and $N^{UL}_{RB}$ represents the number of RBs in the UL slot. $N^{DL}_{RB}$ and $N^{DL}_{RB}$ depend on the DL bandwidth and the UL bandwidth, respectively. $N^{DL}_{symb}$ represents the number of symbols in the DL slot, and $N^{UL}_{symb}$ represents the number of symbols in the UL slot. $N^{RB}_{sc}$ represents the number of subcarriers constituting the RB. The number of symbols in the slot can be variously changed according to the length of the SCS and CP. For example, in the case of a normal CP, one slot includes 7 symbols, but in the case of an extended CP, one slot includes 6 symbols.

RB is defined as $N^{DL/UL}_{symb}$ (e.g., 7) consecutive symbols in the time domain, and $N^{RB}_{sc}$ (e.g., 12) consecutive subcarriers in the frequency domain. Here, RB may mean a physical resource block (PRB) or a virtual resource block (VRB), and the PRB and VRB may be mapped 1:1. Two RBs positioned one in each of two slots of a subframe are referred to as RB pairs. Two RBs constituting an RB pair have the same RB number (or, also referred to as an RB index). A resource composed of one symbol and one subcarrier is called a resource element (RE) or tone. Each RE in the resource grid may be uniquely defined by an index pair (k, 1) in the slot. k is an index assigned from 0 to $N^{DL/UL}_{RB} \times N^{RB}_{sc} - 1$ in the frequency domain, and 1 is an index assigned from 0 to $N^{DL/UL}_{symb} - 1$ in the time domain.

Figure 10:
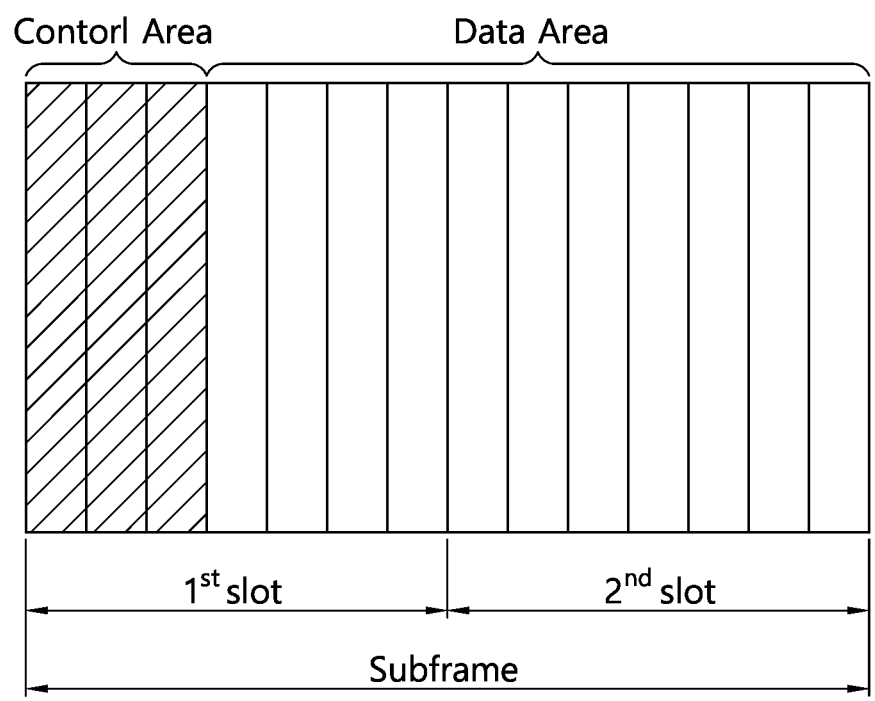
FIG. 10 illustrates the structure of a downlink subframe of an LTE system.

FIG. 10 illustrates the structure of a downlink subframe of an LTE system.

Referring to FIG. 10, a maximum of 3 (or 4) OFDM(A) symbols located in front of a first slot in a subframe correspond to a control region to which a downlink control channel is allocated. The remaining OFDM(A) symbols correspond to the data region to which the PDSCH is allocated, and the basic resource unit of the data region is RB. The downlink control channel includes PCFICH (Physical Control Format Indicator Channel), PDCCH (Physical Downlink Control Channel), PHICH (Physical Hybrid ARQ Indicator Channel), and the like. The PCFICH is transmitted in the first OFDM symbol of a subframe and carries information on the number of OFDM symbols used for transmission of a control channel within the subframe. The PHICH is a response to uplink transmission and carries a HARQ ACK/NACK (acknowledgment/negative-acknowledgment) signal. Control information transmitted through the PDCCH is referred to as DCI (Downlink Control Information). The DCI includes uplink or downlink scheduling information or an uplink transmit power control command for an arbitrary terminal group.

Figure 11:
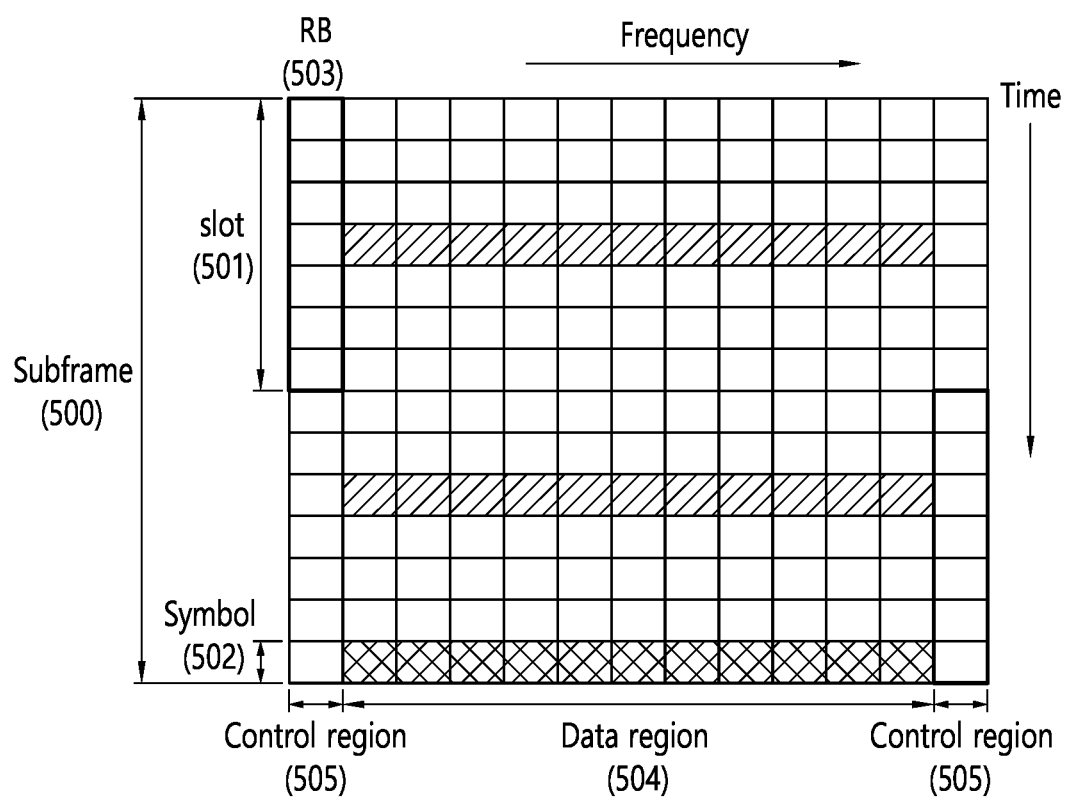
FIG. 11 illustrates the structure of an uplink subframe used in LTE.

FIG. 11 illustrates the structure of an uplink subframe used in LTE.

Referring to FIG. 11, the subframe 500 is composed of two 0.5 ms slots 501. Each slot is composed of a plurality of symbols 502, and one symbol corresponds to one SC-TDMA symbol. The RB 503 is a resource allocation unit corresponding to 12 subcarriers in the frequency domain and one slot in the time domain. The structure of an uplink subframe of LTE is largely divided into a data region 504 and a control region 505. The data area refers to a communication resource used to transmit data such as voice, packet, etc. transmitted to each terminal, and it includes PUSCH (Physical Uplink Shared Channel). The control region refers to a communication resource used to transmit an uplink control signal, for example, a reception ACK/NACK for a downlink signal, an uplink scheduling request, a downlink channel quality report from each terminal, etc., and it includes PUCCH (Physical Uplink Control Channel). SRS (Sounding Reference Signal) is transmitted through the last SC-FDMA symbol on the time axis in one subframe.

Figure 12:
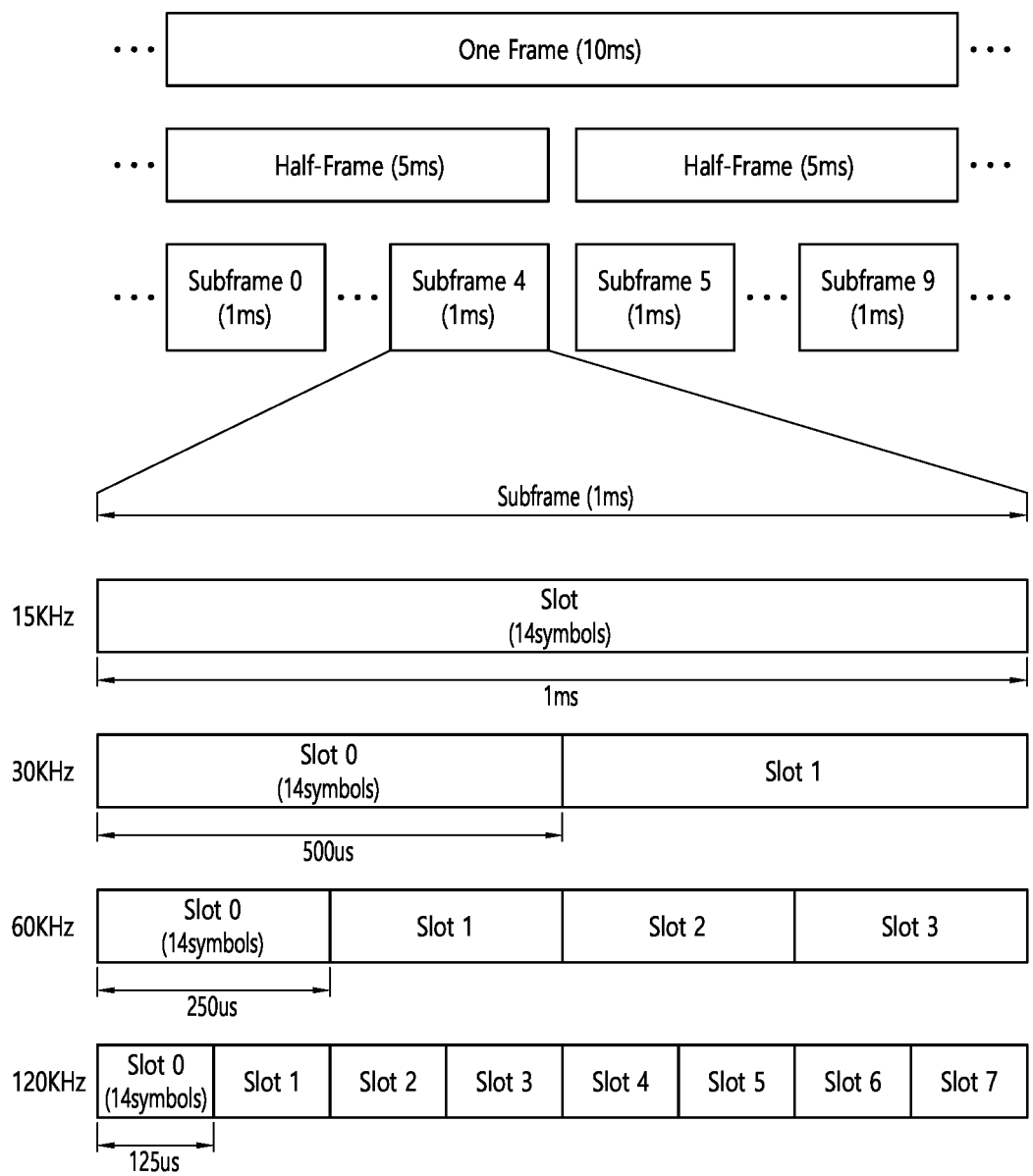
FIG. 12 illustrates a frame structure that can be applied in NR.

FIG. 12 illustrates an example of a frame structure that may be applied in NR.

Referring to FIG. 12, a frame may be composed of 10 milliseconds (ms) and include 10 subframes each composed of 1 ms.

In NR, uplink and downlink transmission may include frames. A radio frame has a length of 10 ms and may be defined as two 5 ms half-frames (HF). The half-frame may be defined as five 1 ms subframes (SFs). The subframe is divided into one or more slots, and the number of slots in the subframe depends on subcarrier spacing (SCS). Each slot includes 12 or 14 OFDM(A) symbols according to a cyclic prefix (CP). When normal CP is used, each slot includes 14 symbols. When an extended CP is used, each slot includes 12 symbols. Here, the symbol may include an OFDM symbol (or a CP-OFDM symbol), an SC-TDMA symbol (or DFT-s-OFDM symbol).

One or a plurality of slots may be included in a subframe according to subcarrier spacings.

The following table 1 illustrates a subcarrier spacing configuration

TABLE 1

| μ | Δf = $2^μ$ · 15 [kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,μ}_{slot}$), the number of slots in a subframe ($N^{subframe,μ}_{slot}$), the number of symbols in a slot ($N^{slot}_{symb}$), and the like, according to subcarrier spacing configurations μ.

TABLE 2

| μ | $N^{slot}_{symb}$ | $N^{frame,μ}_{slot}$ | $N^{subframe,μ}_{slot}$ |
|---|---|---|---|
| 0 | 14 | 10 | 1 |
| 1 | 14 | 20 | 2 |
| 2 | 14 | 40 | 4 |

TABLE 2-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

Table 2-1 illustrates the number of symbols per slot, the number of slots per frame, and the number of slots per subframe (SF) according to the SCS when the extended CP is used.

TABLE 2-1

| SCS (15*2^ μ) | $N_{symb}^{slot}$ | $N_{slot}^{frame,\mu}$ | $N_{slot}^{subframe,\mu}$ |
|---|---|---|---|
| 60 KHz (μ = 2) | 12 | 40 | 4 |

In the NR system, OFDM(A) numerology (e.g., SCS, CP length, etc.) may be set to be different between a plurality of cells merged into one UE. Accordingly, an (absolute time) interval of a time resource (e.g., SF, slot or TTI) (for convenience, collectively referred to as time unit (TU)) including the same number of symbols may be set to be different between the merged cells.

Figure 13:
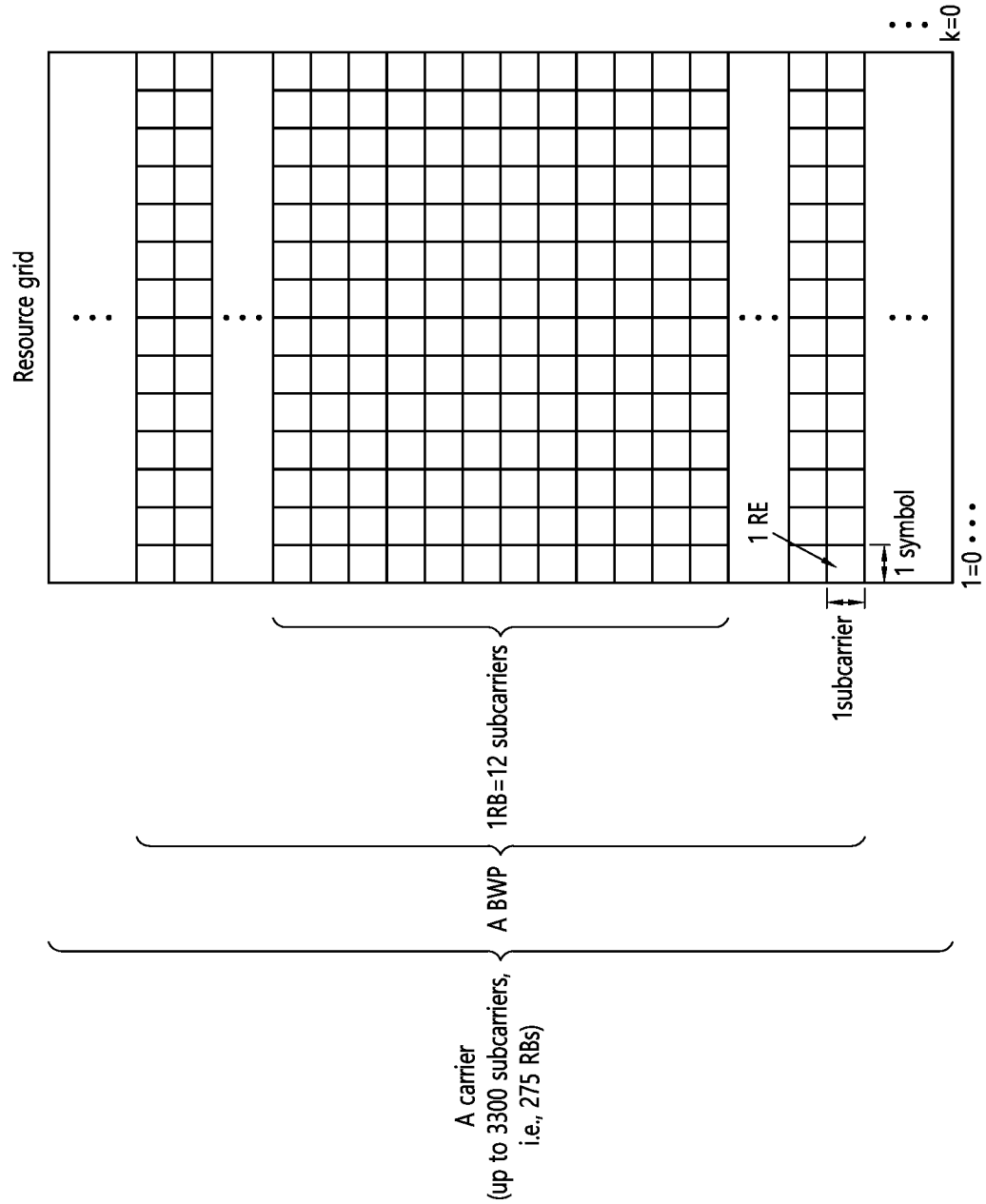
FIG. 13 illustrates a slot structure.

FIG. 13 illustrates a slot structure.

Referring to FIG. 13, a slot includes a plurality of symbols in the time domain. For example, when a normal CP is used, one slot may include 14 symbols; when an extended CP is used, one slot may include 12 symbols. Alternatively, when a normal CP is used, one slot may include 7 symbols; when an extended CP is used, one slot may include 6 symbols.

A carrier includes a plurality of subcarriers in the frequency domain. A resource block (RB) may be defined as a plurality of (e.g., 12) contiguous subcarriers in the frequency domain. A bandwidth part (BWP) may be defined as a plurality of contiguous (P)RBs in the frequency domain and may correspond to one numerology (e.g., SCS, CP length, or the like). A carrier may include up to N (e.g., 5) BWPs. Data communication may be performed through an activated BWP. Each element in a resource grid may be referred to as a resource element (RE) and may be mapped to one complex symbol.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 14:
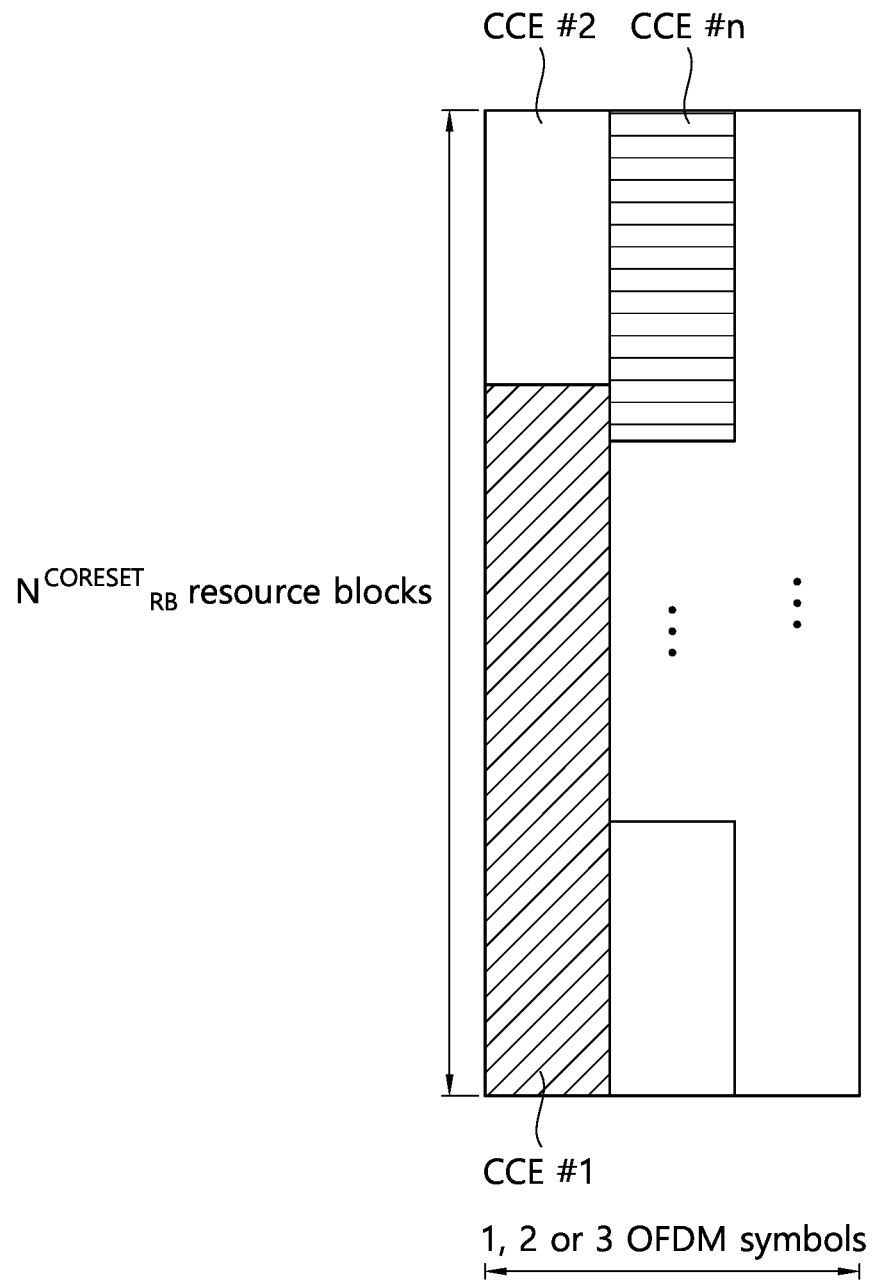
FIG. 14 illustrates CORESET.

FIG. 14 illustrates CORESET.

Referring to FIG. 14, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 14, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 15:
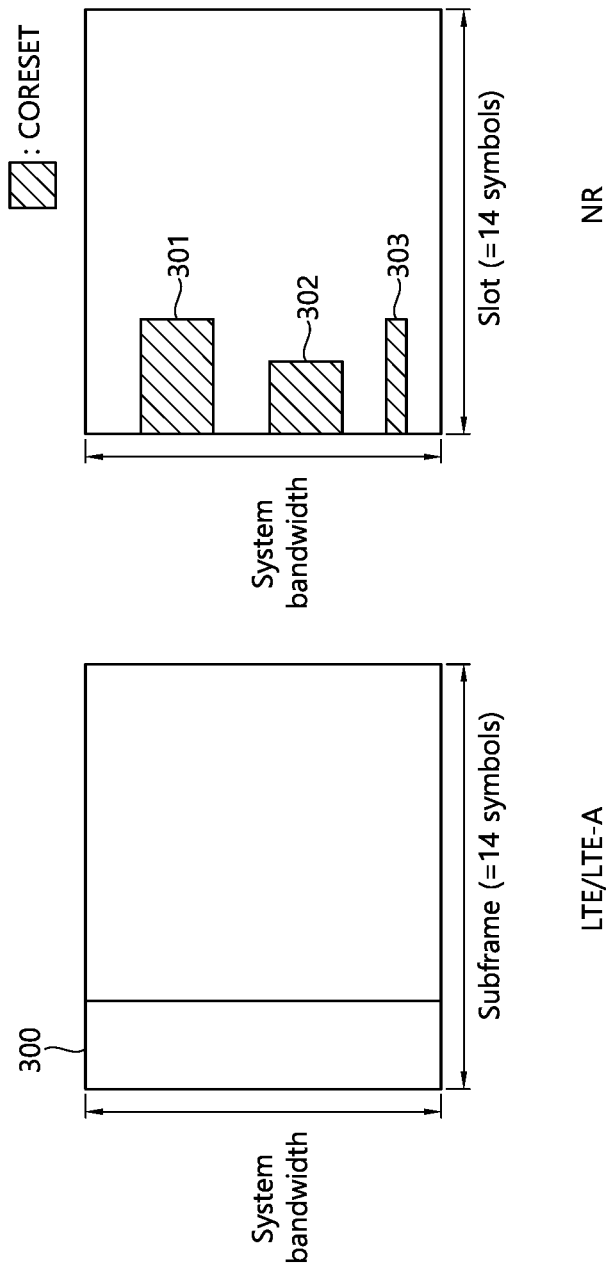
FIG. 15 is a diagram illustrating a difference between a related art control region and the CORESET in NR.

FIG. 15 is a diagram illustrating a difference between a related art control region and the CORESET in NR.

Referring to FIG. 15, a control region 300 in the related art wireless communication system (e.g., LTE/LTE-A) is configured over the entire system band used by a base station (BS).

All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 15, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 16:
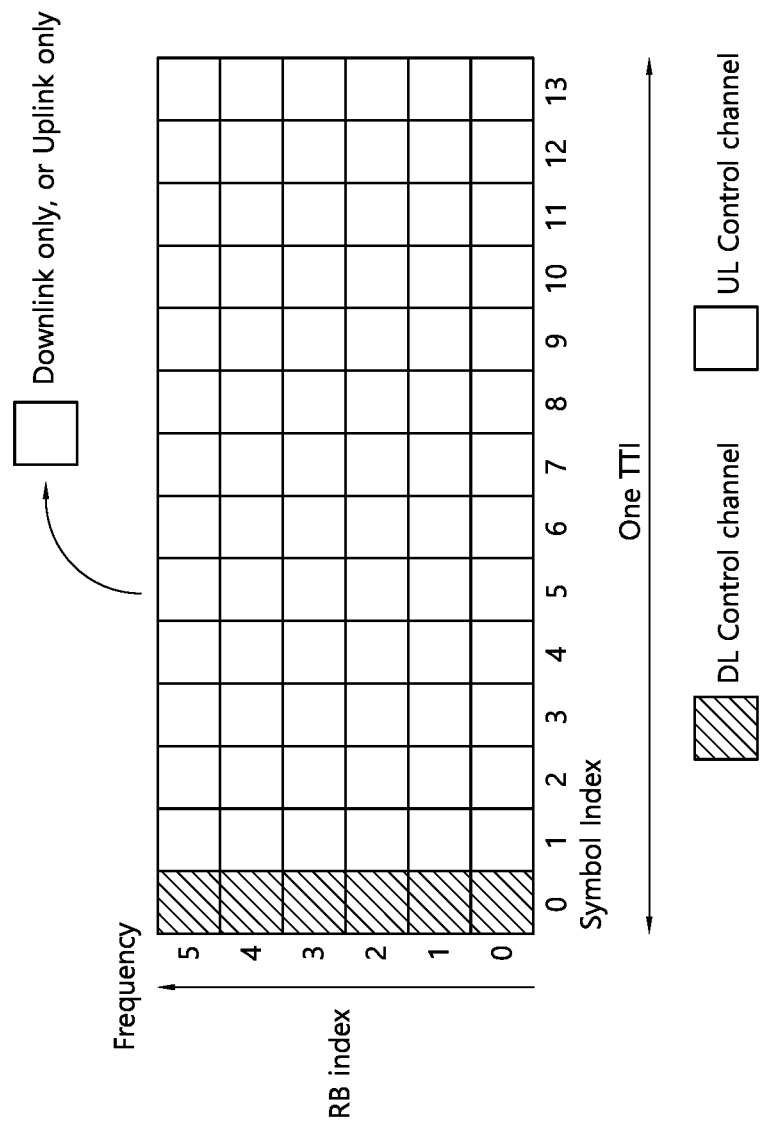
FIG. 16 illustrates an example of a frame structure for new radio access technology.

FIG. 16 illustrates an example of a frame structure for new radio access technology.

In NR, a structure in which a control channel and a data channel are time-division-multiplexed within one TTI, as shown in FIG. 16, can be considered as a frame structure in order to minimize latency.

In FIG. 16, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 17:
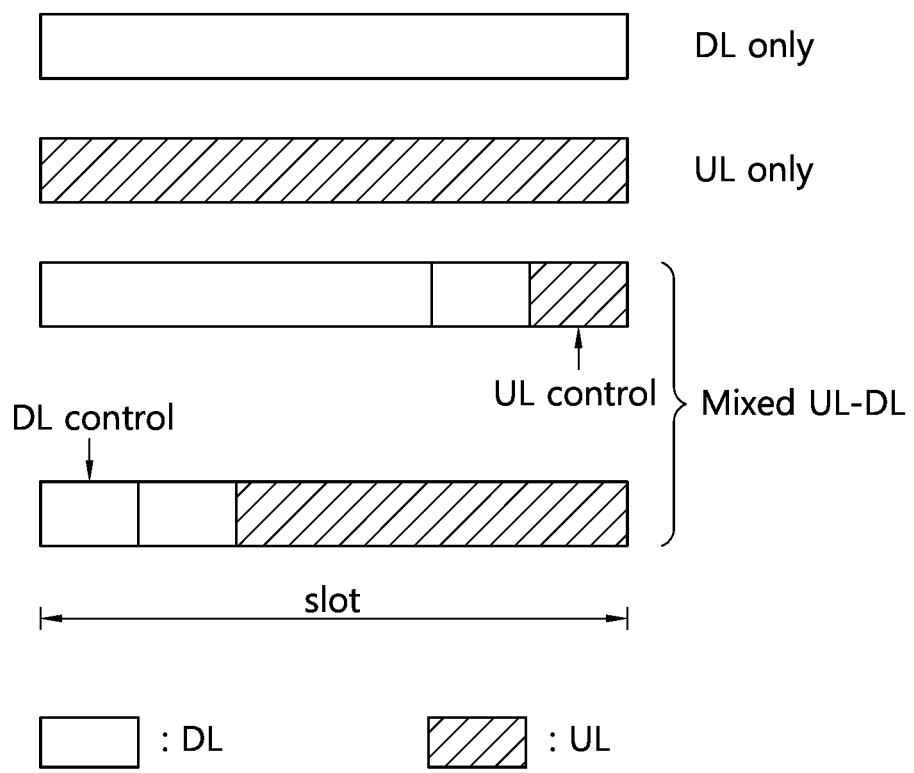
FIG. 17 illustrates an example of a self-contained slot structure.

FIG. 17 illustrates an example of a self-contained slot structure.

Referring to FIG. 17, one slot may have a self-contained structure in which all of a DL control channel, DL or UL data, and a UL control channel may be included. For example, first N symbols in a slot may be used to transmit a DL control channel (hereinafter, a DL control region), and the last M symbols in a slot may be used to transmit a UL control channel (hereinafter, a UL control region). N and M are each an integer of 0 or greater. A resource region (hereinafter, a data region) between the DL control region and the UL control region may be used for DL data transmission or UL data transmission. As an example, the following configuration may be considered. Each interval is listed in chronological order.

1. DL only configuration
2. UL only configuration
3. Mixed UL-DL configuration
DL region+GP (Guard Period)+UL control region
DL control region+GP+UL region Here, the DL region may be (i) a DL data region, (ii) a DL control area+a DL data region. The UL region may be (i) a UL data region, (ii) a UL data region+a UL control region.

A PDCCH may be transmitted in the DL control region, and a PDSCH may be transmitted in the DL data region. A PUCCH may be transmitted in the UL control region, and a PUSCH may be transmitted in the UL data region. On the PDCCH, downlink control information (DCI), for example, DL data scheduling information, UL data scheduling information, and the like may be transmitted. On the PUCCH, uplink control information (UCI), for example, positive acknowledgment/negative acknowledgment (ACK/NACK) information for DL data, channel state information (CSI), scheduling request (SR), and the like may be transmitted. The GP provides a time gap when the BS (or gNB) and the UE switch from a transmission mode to a reception mode or from the reception mode to the transmission mode. Some symbols at a time point at which the DL is switched to UL within a subframe may be set as a GP.

Figure 18:
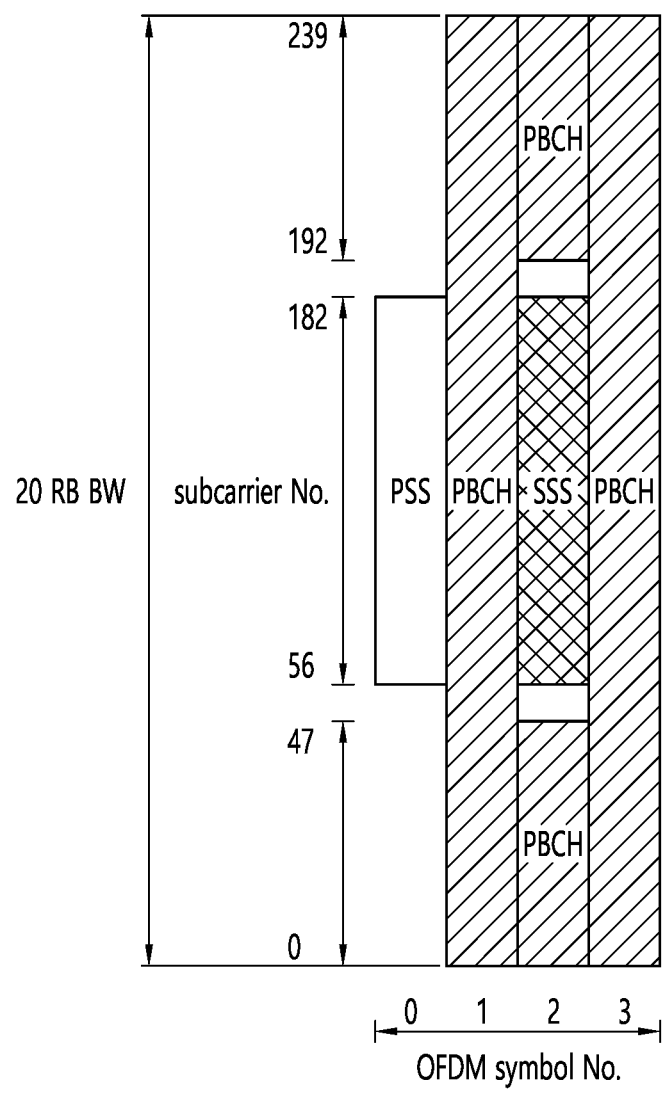
FIG. 18 schematically illustrates a synchronization signal/PBCH (SS/PBCH) block.

FIG. 18 schematically illustrates a synchronization signal/PBCH (SS/PBCH) block.

Referring to FIG. 18, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

System information (SI) is divided into a master information block (MIB) and a plurality of system information blocks (SIBs) where:
- the MIB is transmitted always on a BCH according to a period of 40 ms, is repeated within 80 ms, and includes parameters necessary to obtain system information block type1 (SIB1) from a cell;
- SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;
- SIBs other than SIB1 are carried via system information (SI) messages transmitted on the DL-SCH. Each SI message is transmitted within a time-domain window (referred to as an SI window) periodically occurring;
- For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Meanwhile, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with(=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

Hereinafter, a wireless communication system supporting an unlicensed band will be described in detail.

With demands for greater communication capacity from a growing number of communication devices, the efficient utilization of a limited frequency band is becoming an increasingly important requirement for future wireless communication systems. Cellular communication systems, such as LTE/NR systems, are also considering using an unlicensed band, for example a 2.4 GHz band generally used by an existing Wi-Fi system or 5 GHz and 60 GHz bands newly emerging, for traffic offloading.

FIG. 19 illustrates an example of a wireless communication system supporting an unlicensed band.

Referring to FIG. 19, a cell operating in a license band (hereinafter, also referred to as an L-band) may be defined as an L-cell, and a carrier of the L-cell may be referred to as a (DL/UL) LCC. Further, a cell operating in an unlicensed band (hereinafter, also referred to as a U-band) may be defined as a U-cell, and a carrier of the U-cell may be referred to as a (DL/UL) UCC. A carrier/carrier-frequency of a cell may refer to an operating frequency (e.g., center frequency) of the cell. A cell/carrier (e.g., component carrier (CC)) may be collectively referred to as a cell.

As illustrated in FIG. 19(a), when a UE and a base station transmit and receive signals through an LCC and a UCC which are subjected to carrier aggregation, the LCC may be set as a primary CC (PCC) and the UCC may be set as a secondary CC (SCC). Alternatively, as illustrated in FIG. 19(b), the UE and the base station may transmit and receive signals through a single UCC or a plurality of UCCs subjected to carrier aggregation. That is, the UE and the base station may transmit and receive signals only through a UCC(s) without any LCC. In the unlicensed band of the NR system, both the NSA mode and the SA mode may be supported.

Hereinafter, a signal transmission/reception operation in an unlicensed band described above in the present disclosure may be performed based on all the above-described deployment scenarios (unless specified otherwise).

<Radio Frame Structure for Unlicensed Band>

For operation in an unlicensed band, an LTE frame type 3 or NR frame structure may be used. The configuration of OFDM symbols occupied for uplink/downlink signal transmission in the frame structure for the unlicensed band may be configured by the base station. Here, the OFDM symbol may be replaced with an SC-FDM(A) symbol.

For downlink signal transmission through the unlicensed band, the base station may inform the terminal of the configuration of OFDM symbols used in subframe #n through signaling. Here, the subframe may be replaced with a slot or a time unit (TU).

Specifically, in the case of an LTE system supporting an unlicensed band, the terminal may assume (or identify) the configuration of an OFDM symbol occupied in subframe #n through a specific field (example, subframe configuration for LAA field, etc.) in DCI received from the base station in subframe #n−1 or subframe #n.

Table B1 exemplifies a method in which the subframe configuration for LAA field in the LTE system indicates the configuration of OFDM symbols used for transmission of a downlink physical channel and/or a physical signal in a current subframe and/or a next subframe.

TABLE B1

| Value of 'Subframe configuration for LAA' field in current subframe | Configuration of occupied OFDM symbols (Current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means that the UE can assume that the first Y symbols are occupied in the next subframe and other symbols are not occupied in the next subframe.
(X, —) means that the UE can assume that the first X symbols are occupied in the current subframe and that other symbols are not occupied in the current subframe.
(X, *) means that the UE can assume that the first X symbols are occupied in the current subframe and that at least the first OFDM symbol of the next subframe is not occupied.

In order to transmit an uplink signal through an unlicensed band, the base station may inform the terminal of information on the uplink transmission period through signaling.

Specifically, in the case of an LTE system supporting an unlicensed band, the terminal may obtain 'UL duration' and 'UL offset' information for subframe #n through the 'UL duration and offset' field in the detected DCI.

Table B2 exemplifies a method in which the 'UL duration and offset' field indicates the configuration of UL offset and UL duration in the LTE system.

TABLE B2

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |

TABLE B2-continued

| Value of 'UL duration and offset' field | UL offset, l (in subframes) | UL duration, d (in subframes) |
|---|---|---|
| 11101 | 6 | 5 |
| 11110 | 6 | 6 |
| 11111 | reserved | reserved |

As an example, when the UL duration and offset field configures (or indicates) UL offset 1 and UL duration d for subframe #n, the terminal does not need to receive a downlink physical channel and/or a physical signal within subframe #n+1+i (i=0, 1, . . . , d−1).

<Method of Transmitting Downlink Signals Through Unlicensed Band>

In an unlicensed band, a method of performing wireless transmission and reception through contention between communication nodes may be assumed. Therefore, it is required that each communication node performs channel sensing before transmitting a signal to verify that a different communication node is not performing signal transmission. For convenience, this operation is referred to as a listen-before-talk (LBT) or a channel access procedure (CAP).

In particular, an operation of verifying whether the different communication node is performing signal transmission may be referred to as carrier sensing (CS), and a case where it is determined that the different communication node is not performing signal transmission may be referred to as a clear channel assessment (CCA) having been verified.

A base station (eNB) or a UE of an LTE/NR system also needs to perform an LBT for signal transmission in an unlicensed band (U-band). When the base station or the UE of the LTE/NR system transmits a signal, other communication nodes, such as a Wi-Fi node, also need to perform an LBT so as not to cause interference. For example, in the Wi-Fi standard (801.11ac), a CCA threshold is defined as −62 dBm for a non-Wi-Fi signal and as −82 dBm for a Wi-Fi signal. That is, a station (STA, UE) or an access point (AP) does not transmit a signal so as not to cause interference when a signal other than a Wi-Fi signal is received with a power of −62 dBm or more for example.

For the UE to transmit uplink data in the unlicensed band, first, the base station needs to succeed in an LBT for UL grant transmission in the unlicensed band, and the UE also needs to succeed in an LBT for UL data transmission. That is, the UE can attempt UL data transmission only when both LBTs of the base station and the UE are successful.

The base station may perform one of the following unlicensed band access procedures (e.g., Channel Access Procedure, CAP) for downlink signal transmission in the unlicensed band.

Figure 20:
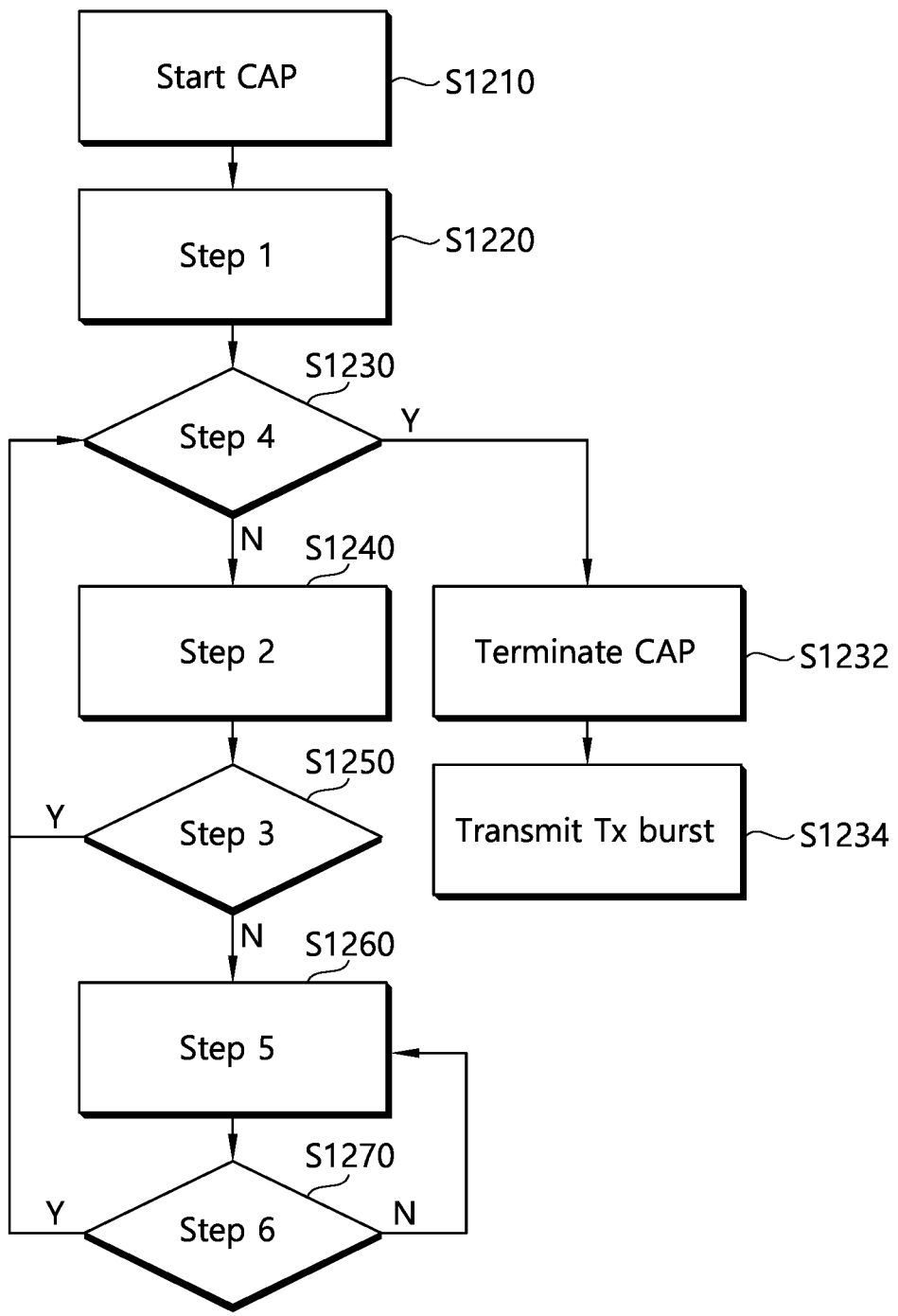
FIG. 20 is a flowchart of a first downlink CAP operation for transmitting a downlink signal through an unlicensed band of a BS.

FIG. 20 is a flowchart of a first downlink CAP operation for transmitting a downlink signal through an unlicensed band of a BS.

Referring to FIG. 20, the BS may initiate a channel access procedure (CAP) for downlink signal transmission (e.g., signal transmission including PDSCH/PDCCH) through an unlicensed band (S1210). The BS may randomly select a backoff counter N in a contention window (CW) according to step 1. Here, the value N is set to the initial value $N_{init}$ (S1220). Nina is selected as a random value among values between 0 and $CW_p$. Subsequently, if the backoff counter value N is 0 according to step 4 (S1230; Y), the BS terminates the CAP process (S1232). Subsequently, the BS may perform Tx burst transmission including the PDSCH/PDCCH (S1234). Meanwhile, if the backoff counter value is not 0 (S1230; N), the BS decreases the backoff counter value by 1 according to step 2 (S1240). Subsequently, the BS determines whether the channel of U-cell(s) (the cell in the unlicensed band) is idle (S1250). If the channel is idle (S1250; Y), the BS determines whether a backoff counter value is 0 (S1230). If the channel is not idle in step S1250, that is, if the channel is busy (S1250; N), the BS determines whether the corresponding channel is idle for a deter duration $T_d$ (25 usec or more) longer than a slot time (e.g., 9 usec) according to step 5 (S1260). If the channel is idle in the deter duration (S1270; Y), the BS may resume the CAP process again. Here, the deter duration may consist of 16 usec interval and mp consecutive slot times which immediately follow (e.g., 9 usec). Meanwhile, if the channel is busy in the deter duration (S1270; N), the BS performs step S1260 again to determine whether the channel of the U-cell(s) is idle in a new deter duration.

Table B3 illustrates $m_p$, minimum CW, maximum CW, maximum channel occupancy time (MCOT), and allowed CW sizes applied to the CAP according to the channel access priority class.

TABLE B3

| Channel Access Priority Class (p) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A size of a contention window applied to the first downlink CAP may be determined based on various methods. For example, the size of the contention window may be adjusted based on a probability that HARQ-ACK values corresponding to PDSCH transmission(s) within a certain time period (e.g., a reference TU) are determined as NACK. When the BS transmits a downlink signal including a PDSCH related to a channel access priority class p on a carrier, if a probability that HARQ-ACK values corresponding to the PDSCH transmission(s) within a reference time interval/opportunity k (or reference slot k) are determined as NACK is at least Z=80%, the BS increases the CW values set for each priority class to a next higher allowed order. Alternatively, the BS maintains the CW values set for each priority class as initial values. The reference time interval/opportunity (or reference slot) may be defined as a start time interval/opportunity (or start slot) in which the most recent signal transmission on a corresponding carrier in which at least some of the HARQ-ACK feedback is available is performed.

Meanwhile, the BS may perform downlink signal transmission (e.g., signal transmission including discovery signal transmission and not including PDSCH) through an unlicensed band based on the second downlink CAP method to be described later.

When a length of the signal transmission period of the BS is less than 1 ms, the BS may transmit a downlink signal (e.g., including discovery signal transmission and not including PDSCH) through the unlicensed band immediately after the corresponding channel is sensed to be idle during at least a sensing period ($T_{drs}$=25 us). Here, $T_{drs}$ includes an interval $T_f$(=16 us) immediately following one slot section $T_{sl}$=9 us.

A third downlink CAP method is as follows.

The BS may perform the following CAP to transmit a downlink signal through multiple carriers in an unlicensed band.

1) Type A: The BS performs CAP on multiple carriers based on a counter N (counter N considered in CAP) defined for each carrier, and performs downlink signal transmission based thereon.

Type A1: Counter N for each carrier is determined independently of each other, and downlink signal transmission through each carrier is performed based on the counter N for each carrier.

Type A2: Counter N for each carrier is determined as a value N for a carrier having the largest contention window size, and downlink signal transmission through a carrier is performed based on a counter N for each carrier.

2) Type B: The BS performs a CAP based on the counter N only on a specific carrier among a plurality of carriers, determines whether a channel for the other remaining carrier is idle before signal transmission on the specific carrier, and performs downlink signal transmission.

Type B1: A single contention window size is defined for a plurality of carriers, and the BS uses the single contention window size when performing a CAP based on the counter N for a specific carrier.

Type B2: The contention window size is defined for each carrier, and the largest contention window size among the contention window sizes is used when determining the $N_{init}$ value for a specific carrier.

<Method of Transmitting an Uplink Signal Through an Unlicensed Band>

The UE performs contention-based CAP for uplink signal transmission in the unlicensed band. The UE performs a type 1 or type 2 CAP to transmit an uplink signal in the unlicensed band. In general, the UE may perform the CAP (e.g., type 1 or type 2) configured by the BS for uplink signal transmission.

Figure 21:
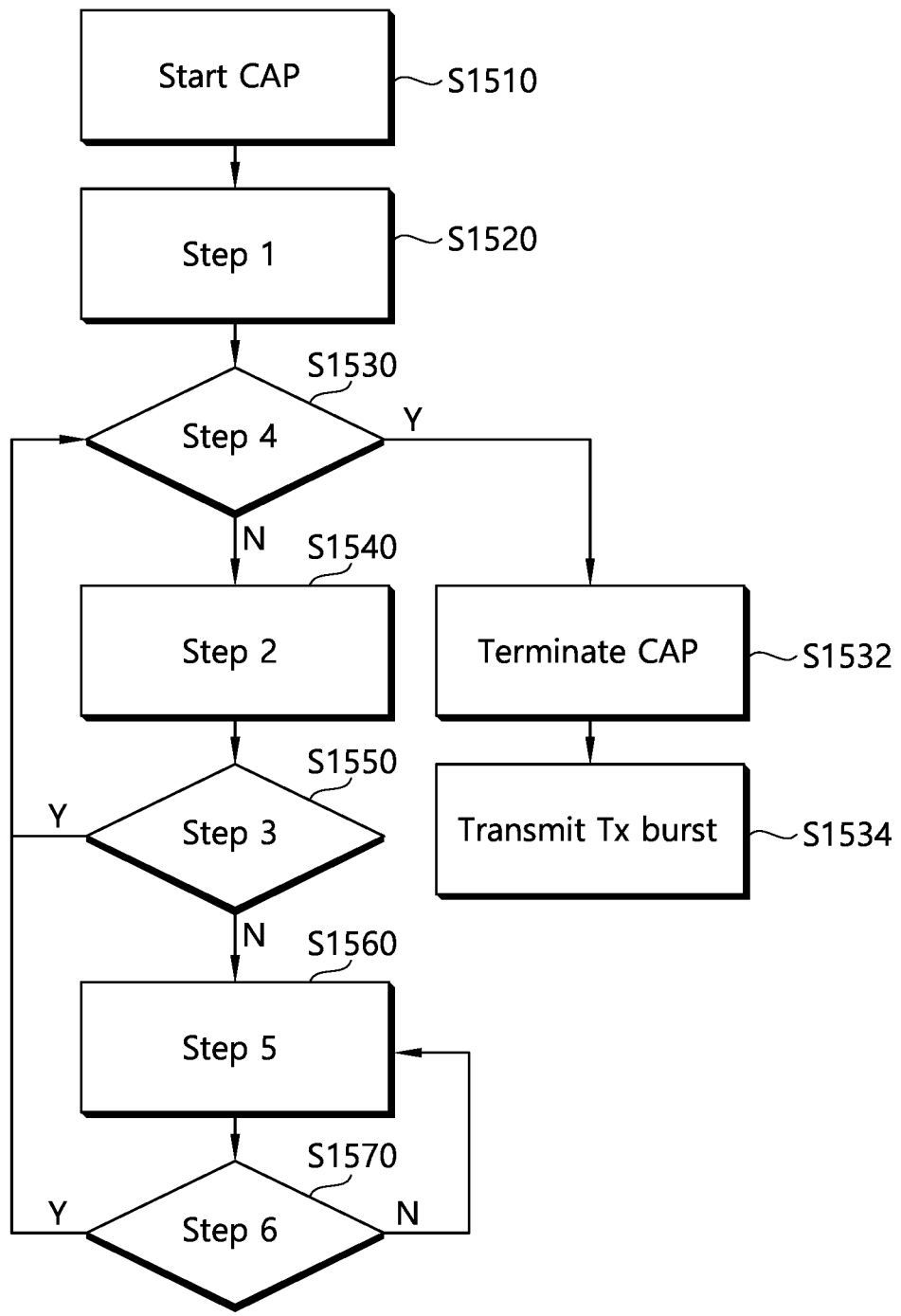
FIG. 21 is a flowchart of a type 1 CAP operation of a UE for transmitting an uplink signal.

FIG. 21 is a flowchart of a type 1 CAP operation of a UE for transmitting an uplink signal.

The UE may initiate a channel access procedure (CAP) for signal transmission through an unlicensed band (S1510). The UE may randomly select a backoff counter N within a contention window (CW) according to step 1. Here, the Value N is set to an initial value $N_{init}$ (S1520). $N_{init}$ is selected as an arbitrary value from 0 to $CW_p$. Subsequently, if the backoff counter value N is 0 according to step 4 (S1530; Y), the UE terminates the CAP process (S1532). Subsequently, the UE may perform Tx burst transmission (S1534). Meanwhile, if the backoff counter value is not 0 (S1530; N), the UE decreases the backoff counter value by 1 according to step 2 (S1540). Subsequently, the UE determines whether the channel of the U-cell(s) (the cell in the unlicensed band) is idle (S1550). If the channel is idle (S1550; Y), the UE determines whether the backoff counter value is 0 (S1530). If, however, the channel is not idle in step S1550, that is, if the channel is busy (S1550; N), the UE determines whether the corresponding channel is idle in a defer duration $T_d$ (25 usec or more) longer than a slot time (e.g., 9 usec) according to step 5 (S1560). If the channel is idle in the deter duration (S1570; Y), the UE may resume the CAP process again. Here, the deter duration may consist of 16 usec intervals and mp consecutive slot times that immediately follow (e.g., 9 usec). Meanwhile, if the channel is busy in the deter duration (S1570; N), the UE performs step S1560 again and determines whether the channel is idle in a new deter duration.

Table B4 illustrates $m_p$, minimum CW, maximum CW, maximum channel occupancy time (MCOT), and allowed CW sizes applied to the CAP according to the channel access priority class.

TABLE B4

| Channel Access Priority Class (p) | $m_p$ | $CW_{min,p}$ | $CW_{max,p}$ | $T_{ulm\,cot,p}$ | Allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

Note 1:
$T_{ulmcot,p}$ = 10 ms if higher layer parameter 'absenceOfAnyOtherTechnology-r 14' indicates TRUE for p = 3, 4 and $T_{ulmcot,p}$ = 6 ms if not.

Note 2:
When $T_{ulmcot,p}$ = 6 ms, this can be increased to 8 ms by inserting one or more gaps. A minimum gap duration shall be 100 μs. A maximum duration before including any such gap shall be 6 ms.

The contention window size applied to the type 1 uplink CAP may be determined based on various methods. As an example, the contention window size may be adjusted based on whether to toggle a new data indicator (NDI) value for at least one HARQ processor related to HARQ_ID_ref, which is a HARQ process ID of UL-SCH within a certain time period (e.g., a reference TU). In a case in which the UE performs signal transmission using the type 1 channel access procedure related to the channel access priority class p on the carrier, when the NDI value for at least one HARQ process related to HARQ_ID_ref is toggled, the UE sets $CW_p$ to $CW_{min,p}$ ($CW_p=CW_{min,p}$) for all priority classes p∈{1, 2, 3, 4}, or otherwise, the UE increases $CW_p$ for all priority classes p∈{1, 2, 3, 4} to a next highest allowed value.

The reference time interval/opportunity $n_{ref}$ (or reference slot $n_{ref}$) may be determined as follows.

In a case in which the UE receives UL grant in the time interval/opportunity (or slot) $n_g$, starts from the time interval/opportunity (or slot) no within a time interval/opportunity (or slot) $n_0$, $n_1$, ... , $n_w$, and performs transmission including a gap-free UL-SCH (here, a time interval/opportunity (or slot) $n_w$ is the latest time interval/opportunity (or slot) before a time interval/opportunity (or slot) $n_g$-3 in which the UE transmitted UL-SCH based on the type 1 CAP), the reference time interval/opportunity (or slot) $n_{ref}$ is a time interval/opportunity (or slot) $n_0$.

(2) Type 2 Uplink CAP Method

When the UE uses type 2 CAP to transmit an uplink signal (e.g., a signal including a PUSCH) through an unlicensed band, the UE may transmit the uplink signal (e.g., the signal including a PUSCH) through the unlicensed band immediate after sensing that a channel is idle for at least a sensing interval $T_{short\_ul}$=25 us. $T_{short\_ul}$ may include an interval $T_f$=16 us immediately after one slot interval $T_{sl}$=9 us. $T_f$ includes an idle slot period $T_{sl}$ at a start point of the $T_f$.

<Structure of Uplink and Downlink Channels>

1. Downlink Channel Structure

The BS transmits a related signal to the UE through a downlink channel to be described later, and the UE receives the related signal from the BS through a downlink channel to be described later.

(1) Physical Downlink Shared Channel (PDSCH)

The PDSCH carries downlink data (e.g., DL-shared channel transport block (DL-SCH TB)), and a modulation scheme such as quadrature phase shift keying (QPSK), quadrature amplitude modulation (QAM), 64 QAM, 256 QAM, etc. is applied thereto. A codeword is generated by encoding a TB. The PDSCH may carry up to two codewords. Scrambling and modulation mapping are performed on each codeword, and modulation symbols generated from each codeword are mapped to one or more layers (layer mapping). Each layer is mapped to a resource along with a demodulation reference signal (DMRS) to generate an OFDM symbol signal, and the OFDM symbol signal is transmitted through a corresponding antenna port.

(2) Physical Downlink Control Channel (PDCCH)

The PDCCH carries downlink control information (DCI), and a QPSK modulation method is applied thereto. One PDCCH includes 1, 2, 4, 8, and 16 control channel elements (CCEs) according to an aggregation level (AL). One CCE includes six resource element groups (REGs). One REG is defined by one OFDM symbol and one (P)RB. FIG. C1 illustrates one REG structure. In FIG. C1, D denotes a resource element (RE) to which DCI is mapped, and R denotes an RE to which DMRS is mapped. The DMRS is mapped to the 1st, 5th, and 9th REs in the frequency domain direction within one symbol.

Figure 22:
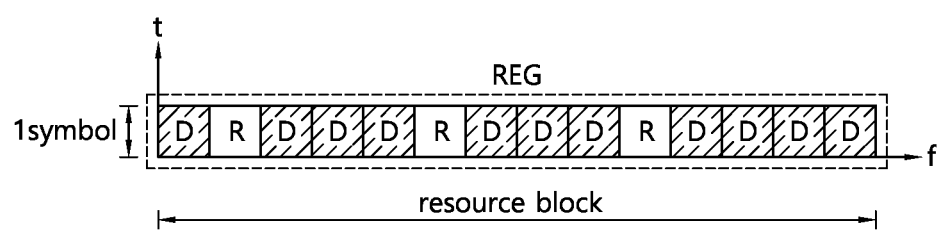
FIG. 22 illustrates one REG structure.

FIG. 22 illustrates the structure of REG.

The PDCCH is transmitted through a control resource set (CORESET). The CORESET is defined as a REG set having a given numerology (e.g., SCS, CP length, etc.). A plurality of OCRESETs for one UE may overlap in the time/frequency domain. The CORESET may be set through system information (e.g., MIB) or UE-specific higher layer (e.g., radio resource control, RRC, layer) signaling. Specifically, the number of RBs constituting the CORESET and the number of symbols (maximum 3) may be set by higher layer signaling.

Precoder granularity in the frequency domain for each CORESET may be set to one of the following by higher layer signaling:

sameAsREG-bundle: Same as a REG bundle size in the frequency domain.

allContiguousRBs: Same as the number of consecutive RBs in the frequency domain inside the CORESET.

REGs in the CORESET are numbered in a time-first mapping manner That is, the REGs are numbered sequentially from 0, starting from a first OFDM symbol in the lowest-numbered resource block inside the CORESET.

A mapping type from the CCE to the REG is set to one of a non-interleaved CCE-REG mapping type or an interleaved CCE-REG mapping type.

Figure 23:
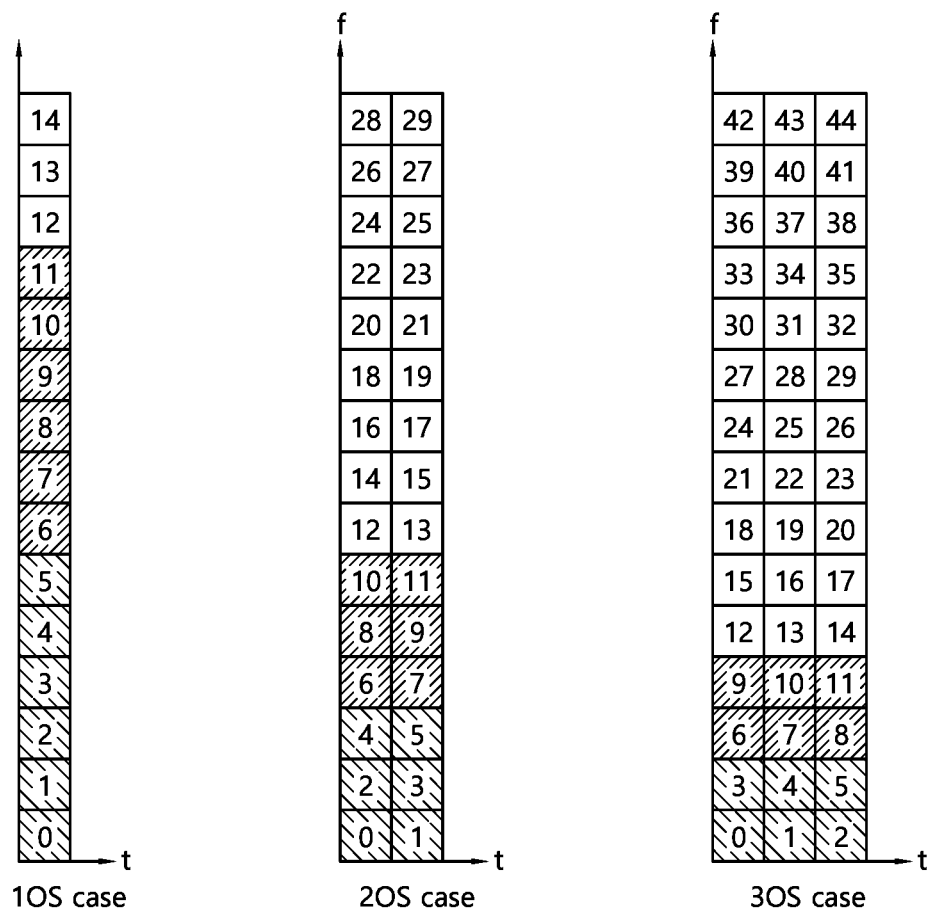
FIG. 23 illustrates a non-interleaved CCE-REG mapping type.
Figure 24:
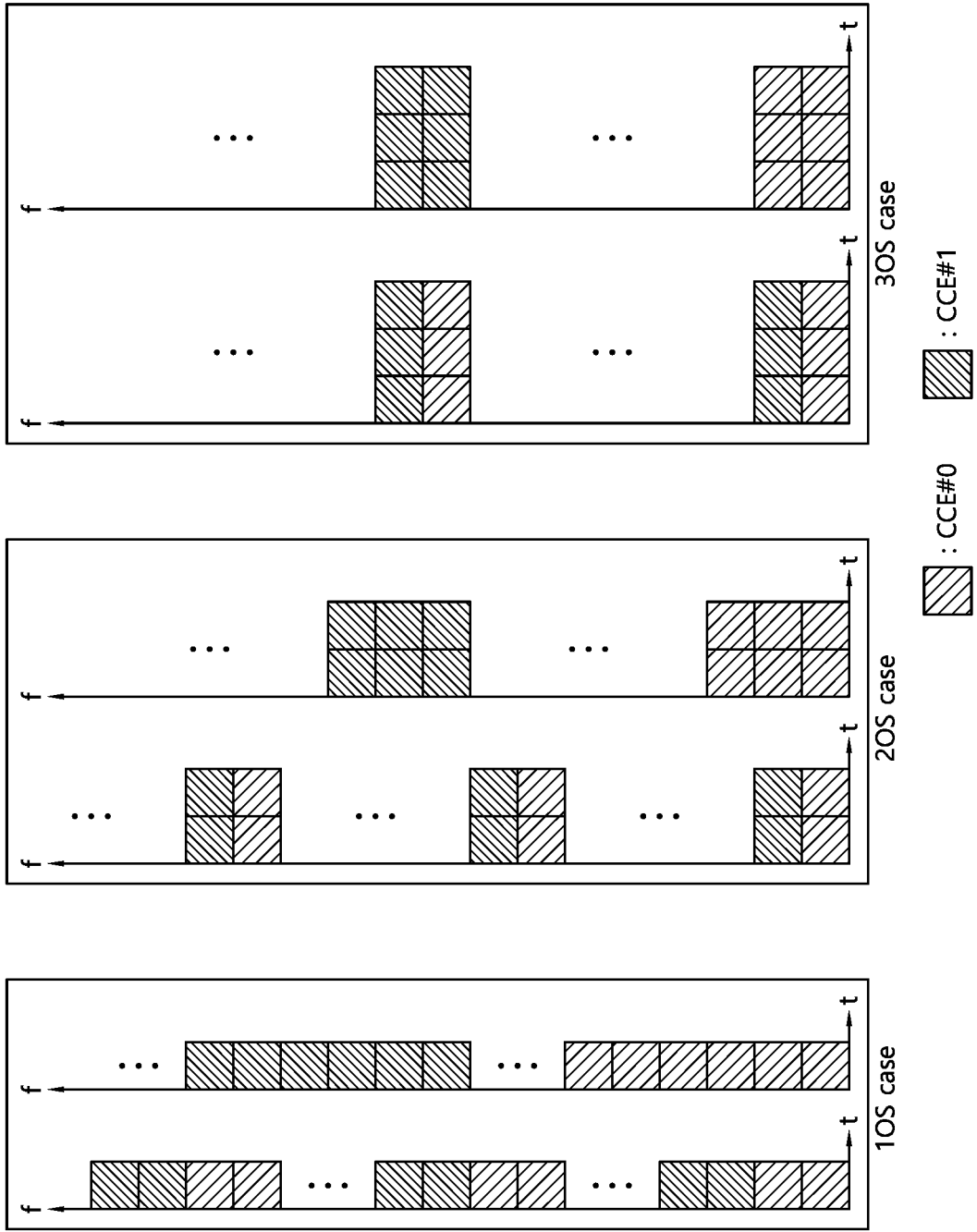
FIG. 24 illustrates an interleaved CCE-REG mapping type.

FIG. 23 illustrates a non-interleaved CCE-REG mapping type, and FIG. 24 illustrates an interleaved CCE-REG mapping type.

Referring to FIG. 23, in non-interleaved CCE-REG mapping type (or localized mapping type), 6 REGs for a given CCE constitute one REG bundle, and all REGs for a given CCE are contiguous. One REG bundle corresponds to one CCE.

Referring to FIG. 24, in interleaved CCE-REG mapping type (or distributed mapping type), 2, 3 or 6 REGs for a given CCE constitute one REG bundle, and the REG bundle is interleaved in the CORESET. The REG bundle in the CORESET including 1 OFDM symbol or 2 OFDM symbols includes 2 or 6 REGs, and the REG bundle in the CORESET including 3 OFDM symbols includes 3 or 6 REGs. A size of the REG bundle may be set for each CORESET.

Figure 25:
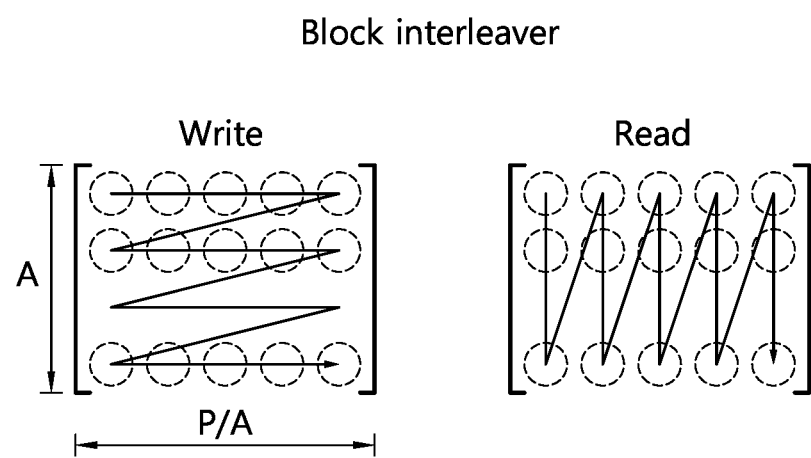
FIG. 25 illustrates a block interleaver.

FIG. 25 illustrates a block interleaver.

The number (A) of rows of a (block) interleaver for an interleaving operation is set to one of 2, 3, and 6. When the number of interleaving units for a given CORESET is P, the number of columns of the block interleaver is equal to P/A. As shown in FIG. 25, a write operation for the block interleaver is performed in a row-first direction, and a read operation is performed in a column-first direction. A cyclic shift (CS) in an interleaving unit may be applied based on an ID that may be set independently for an ID that may be set for the DMRS.

The UE acquires DCI transmitted through the PDCCH by performing decoding (or blind decoding) on a set of PDCCH candidates. The set of PDCCH candidates decoded by the UE is defined as a set of PDCCH search spaces. The search space set may be a common search space or a UE-specific search space. The UE may acquire DCI by monitoring PDCCH candidates in one or more search space sets configured by MIB or higher layer signaling. Each CORESET setting is related to one or more sets of search spaces, and each set of search spaces is related to one COREST setting. One set of search spaces is determined based on the following parameters.

controlResourceSetId: It represents a control resource set related to the search space set.

monitoringSlotPeriodicityAndOffset: It indicates PDCCH monitoring period interval (slot unit) and PDCCH monitoring interval offset (slot unit)

monitoringSymbolsWithinSlot: It indicates the PDCCH monitoring pattern in a slot for PDCCH monitoring (e.g., indicates first symbol(s) of the control resource set)

nrofCandidates: It indicates the number of PDCCH candidates per AL={1, 2, 4, 8, 16} (value of one of 0, 1, 2, 3, 4, 5, 6, 8)

Table C1 illustrates features of each search space type.

TABLE C1

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table C2 illustrates DCI formats transmitted through the PDCCH.

TABLE C2

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |

TABLE C2-continued

| DCI format | Usage |
| --- | --- |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs) |

DCI format 0_0 may be used to schedule a TB-based (or TB-level) PUSCH, DCI format 0_1 may be used to schedule a TB-based (or TB-level) PUSCH or code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or CBG-based (or CBG-level) PDSCH. DCI format 2_0 may be used to deliver a dynamic slot format information (e.g., dynamic SFI) to a UE, and DCI format 2_1 may be used to deliver downlink pre-emption information to the UE. DCI format 2_0 and/or DCI format 2_1 may be delivered to UEs in a corresponding group through a group-common PDCCH, which is a PDCCH delivered to UEs defined as one group.

2. Uplink Channel Structure

The UE transmits a related signal to the BS through an uplink channel to be described later, and the BS receives the related signal from the UE through an uplink channel to be described later.

(1) Physical Uplink Shared Channel (PUSCH)

The PUSCH carries uplink data (e.g., UL-shared channel transport block (UL-SCH TB)) and/or uplink control information (UCI), and may be transmitted based on a cyclic prefix-orthogonal frequency division multiplexing (CP-OFDM) waveform or a discrete Fourier transform-spread-orthogonal frequency division multiplexing (DFT-s-OFDM) waveform. When the PUSCH is transmitted based on the DFT-s-OFDM waveform, the UE transmits the PUSCH by applying transform precoding. For example, when transform precoding is not available (e.g., transform precoding is disabled), the UE transmits the PUSCH based on the CP-OFDM waveform, and when transform precoding is available (e.g., transform precoding is enabled), the UE may transmit the PUSCH based on the CP-OFDM waveform or the DFT-s-OFDM waveform. PUSCH transmission is dynamically scheduled by a UL grant in DCI, or may be semi-statically scheduled based on higher layer (e.g., RRC) signaling (and/or Layer 1 (L1) signaling (e.g., PDCCH)). PUSCH transmission may be performed based on a codebook or a non-codebook.

(2) Physical Uplink Control Channel (PUCCH)

The PUCCH carries uplink control information, HARQ-ACK, and/or scheduling request (SR), and may be classified as a short PUCCH and a long PUCCH according to a PUCCH transmission length.

Table C3 illustrates PUCCH formats.

TABLE C3

| PUCCH format | Length of OFDM symbols $N_{symb}^{PUCCH}$ | Number of bits | Usage | Etc. |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of a maximum size of 2 bits, and is mapped and transmitted on a sequence basis. Specifically, the UE transmits a specific UCI to the BS by transmitting one of the plurality of sequences through the PUCCH of PUCCH format 0. The UE transmits a PUCCH of PUCCH format 0 within a PUCCH resource for corresponding SR configuration only when transmitting a positive SR.

PUCCH format 1 carries UCI having a maximum size of 2 bits, and modulation symbols are spread by an orthogonal cover code (OCC) (set to be different according to frequency hopping) in the time domain. The DMRS is transmitted in a symbol in which a modulation symbol is not transmitted (that is, it is transmitted after undergoing time division multiplexing (TDM)).

PUCCH format 2 carries UCI having a bit size larger than 2 bits, and a modulation symbol is transmitted after undergoing frequency division multiplexing (FDM) with the DMRS. The DM-RS is located at symbol indexes #1, #4, #7, and #10 in a resource block given with a density of ⅓. A pseudo noise (PN) sequence is used for a DM_RS sequence. Frequency hopping may be activated for 2-symbol PUCCH format 2.

PUCCH format 3 is not UE-multiplexed in the same physical resource blocks, and carries UCI having a bit size greater than 2 bits. In other words, the PUCCH resource of PUCCH format 3 does not include an orthogonal cover code. The modulation symbol is time division multiplexed (TMDed) with the DMRS and transmitted.

PUCCH format 4 supports multiplexing of up to 4 UEs in the same physical resource block, and carries UCI having a bit size larger than 2 bits. In other words, the PUCCH resource of PUCCH format 3 includes an orthogonal cover code. The modulation symbol is transmitted after undergoing TDM (Time Division Multiplexing) with the DMRS.

Hereinafter, an LBT method and a CWS control method that may be performed for transmission for each DL channel/signal or UL channel/signal in a wireless communication system composed of a base station and a terminal in an unlicensed band are proposed.

As more communication devices increasingly require larger communication capacity, efficient use of a limited frequency band in the next wireless communication system is becoming more important. It is considered that cellular communication systems such as LTE/NR systems also utilize unlicensed bands such as the 2.4 GHz band mainly used by existing WiFi systems or unlicensed bands such as the 5 GHz and 60 GHz bands that are newly attracting attention for traffic offloading. Basically, the unlicensed band is based on the assumption of a method of wireless transmission/reception through contention between communication nodes. Therefore, it is required for each communication node to perform channel sensing before transmitting a signal to determine that another communication node does not transmit a signal. For convenience, this operation is called listen before talk (LBT) or a channel access procedure. In particular, an operation of determining whether another communication node transmits a signal may be defined as carrier sensing (CS), and a case in which it is determined that another communication node does not transmit a signal is defined as that a clear channel assessment (CCA) is checked.

A BS (eNB or gNB) or a UE of the LTE/NR system should also perform LBT for signal transmission in an unlicensed band (which may be referred to as a U-band for convenience). In addition, when the BS or the UE of the LTE/NR system transmits a signal, other communication nodes such as WiFi should also perform LBT and do not cause interference. For example, in the WiFi standard (801.11ac), a CCA threshold is defined as −62 dBm for non-WiFi signals and −82 dBm for WiFi signals. This may mean that, for example, when a signal other than WiFi is received with a power of −62 dBm or more, a station (STA) or an access point (AP) does not transmit a signal so as not to cause interference.

In one of the LBT methods, a counter value named as a back-off counter is (arbitrarily) configured in a range named as a contention window (CW) size, and the backoff counter value is decreased by one when a specific time slot is determined to be channel idle by performing CCA in a plurality of time slots, and then, a random back-off based LBT that allows signal transmission when the backoff counter value becomes 0 may be applied.

For example, as a DL LBT operation, a random backoff-based LBT scheme named as Category 4 (hereinafter, Cat. 4) may be introduced. LBT parameters for the 'Cat. 4 DL LBT' may refer to Table B3 described above.

The base station performs random backoff using LBT parameters determined according to the channel access priority class (CAPC), and when accessing the channel after completing the random backoff, the base station can perform signal transmission within the MCOT. In the DL LBT process, the CW size may also be adjusted. For example, the first subframe in the latest DL TX burst (i.e., it means a series of DL transmissions) available for HARQ-ACK is used as the reference subframe, and the CW size may be adjusted based on the HARQ-ACK result in the reference subframe.

For example, if the HARQ-ACK of 80% or more is NACK as a result of decoding the first transmitted subframe in the latest DL TX burst transmitted by the base station, it is determined that a collision has occurred, so, it increase the CW size to the next largest CW size after the currently applied CW size within the set of previously promised CW sizes, otherwise, it is determined that there is no collision, and the CW size can be initialized to the minimum value (e.g., $CW_{min}$). This is, when transmitting the TX burst after successfully performing the LBT operation, the occurrence of NACK (more than a certain rate) in the transmitted first subframe is based on the assumption that it can be determined that the CW size is insufficient and that different nodes perform simultaneous transmission.

With UL LBT operation, a single CCA slot-based LBT (hereinafter referred to as One-shot LBT) performing UL signal (e.g., PUSCH) transmission by looking at only the 25 us length CCA slot and Category 4 LBT (hereinafter Cat. 4 LBT) using LBT parameters defined by four LBT priority classes may be applied. Table B4 described above exemplifies LBT parameters for each CAPC.

There is no separate channel of PHICH, etc. for informing the terminal of HARQ-ACK information for the PUSCH due to the introduction of an asynchronous HARQ procedure in the LAA UL, and accurate HARQ-ACK information cannot be used for CW size adjustment in the UL LBT process. Therefore, in the UL LBT process, when the UL grant is received in the nth subframe, the first subframe of the most recent UL TX burst before the (n−3)th subframe is configured as a reference subframe, and the CW size may be adjusted based on the NDI for the HARQ process ID corresponding to the reference subframe.

That is, assuming that the base station toggles one or more (per TB) NDIs (or instructs retransmission for one or more TBs), the PUSCH collides with another signal in the reference subframe and thus transmission fails, it increase the CW size to the next largest CW size after the currently applied CW size within the set of previously promised CW sizes, otherwise, assuming that the PUSCH in the reference subframe has been successfully transmitted (without collision with other signals), the CW size is initialized to the minimum value (e.g., CWmin).

In the NR system, up to 400 MHz per component carrier (CC) may be supported. If the UE operating in such a broadband CC always operates with a radio frequency (RF) unit which is for the entire CC turned on, battery consumption of the UE may increase. Or, when considering several use cases (e.g., eMBB, URLLC, mMTC, etc.) operating within one broadband CC, different numerology (e.g., sub-carrier spacing) for each frequency band within the CC may be supported. Alternatively, each UE may have different capabilities for a maximum bandwidth.

In consideration of this, the base station can instruct the terminal to operate only in a portion of the bandwidth, not the entire bandwidth of the broadband CC, for convenience, the partial bandwidth may be defined as a bandwidth portion (BWP). BWP can be composed of continuous resource blocks (RBs) on the frequency axis, it may correspond to one numerology (e.g., sub-carrier spacing, CP length, slot/mini-slot duration).

Meanwhile, the BS may set multiple BWPs even within one CC configured to the UE. For example, in a PDCCH monitoring slot, a BWP occupying a relatively small frequency domain may be configured, and a PDSCH indicated by the PDCCH may be scheduled on a larger BWP. Alternatively, when the UEs are concentrated on a specific BWP, some UEs may be configured in other BWPs for load balancing.

Alternatively, in consideration of frequency domain inter-cell interference cancellation between neighboring cells, some spectrum of the total bandwidth may be excluded and both BWPs may be configured within the same slot. That is, the BS may configure at least one DL/UL BWP for the UE associated with the broadband CC, and may activate at least one of the DL/UL BWP(s) configured at a specific time point (by L1 signaling or MAC CE or RRC signaling). In addition, when switching to another configured DL/UL BWP may be indicated (by L1 signaling or MAC CE or RRC signaling, etc.) or when a timer value based on a timer expires, switching to the designated DL/UL BWP may be made. In this case, the activated DL/UL BWP may be defined as an activated DL/UL BWP. However, in situations such as when the terminal is in the process of initial access or before RRC connection is set up, the configuration for DL/UL BWP may not be received. In this situation, the DL/UL BWP assumed by the terminal is defined as an initial active DL/UL BWP.

In NR-U, for fair coexistence with Wi-Fi when the BW of the BWP allocated to the base station or the terminal is 20 MHz or more, LBT of 20 MHz unit is respectively performed and transmitted by dividing the corresponding BWP by an integer multiple of 20 MHz, here, this is called an LBT sub-band.

Because the LAA deployment scenario always has a licensed carrier(s) as a PCell in the LTE system and the LAA cell always operated only as a SCell, DL/UL channels and signals such as PRACH for initial access or PUCCH for HARQ-ACK transmission did not exist, therefore, a channel access procedure for the corresponding channel and signals is also not defined.

However, since the NR-U system based on the NR supports a standalone mode, it is necessary to consider a channel access procedure for each of all channels and signals of the NR. The present disclosure proposes a channel access procedure for each DL channel/signal or UL channel/signal and a CWS adjustment method in a wireless communication system composed of a base station and a terminal in an unlicensed band.

Figure 26:
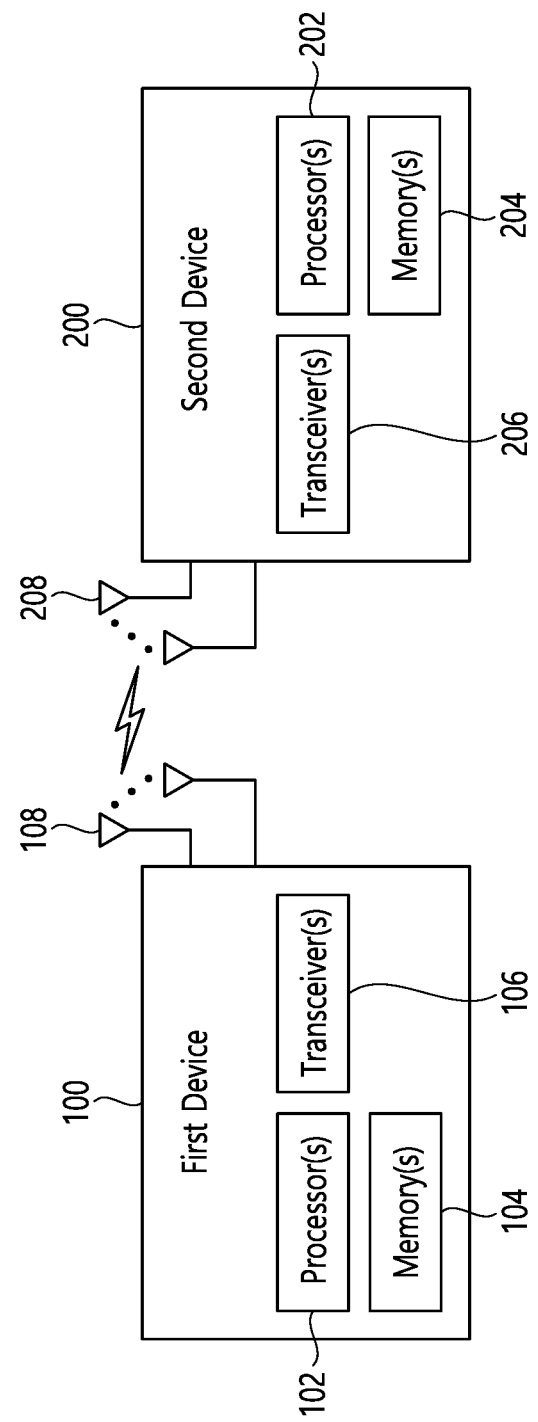
FIG. 26 illustrates a wireless device applicable to the present disclosure.

FIG. 26 illustrates a wireless device applicable to the present disclosure.

Referring to FIG. 26, the first wireless device 100 and the second wireless device 200 may transmit and receive wireless signals through various wireless access technologies (e.g., LTE and NR).

The first wireless device 100 may be, for example, a terminal. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods, and/or operational flowcharts disclosed herein. For example, the processor 102 may process information in the memory 104 to determine a contention window size (CWS), and perform a channel access procedure for the first channel based on the determined contention window size. When there is no transmission history of the second channel to be reflected in determining the contention window size, a minimum CWS value in a specific channel access priority class (CAPC) may be determined as the contention window size. The first channel may be a channel in which the base station does not provide explicit feedback on whether or not the first channel is successfully received, and the second channel may be a channel in which the base station provides explicit feedback on whether or not the second channel is successfully received. The second channel may be a physical uplink shared channel (PUSCH), and a plurality of contention window size values may be included in the channel access priority class of the second channel. This process will be described in detail later.

The memory 104 may store the software code including instructions for performing some or all of the processes controlled by the processor 102, or for performing the descriptions, functions, procedures, suggestions, methods, and/or operational flow charts disclosed herein. Here, the processor 102 and the memory 104 may be part of a communication modem/circuit/chip designed to implement a wireless communication technology (e.g., LTE, NR). The transceiver 106 may be coupled with the processor 102 and may transmit and/or receive radio signals through one or more antennas 108. The transceiver 106 may include a transmitter and/or a receiver. The transceiver 106 may be used interchangeably with an RF unit. In the present disclosure, a wireless device may mean a communication modem/circuit/chip.

The second wireless device 200 may be a base station. The second wireless device 200 includes one or more processors 202 and one or more memories 204, and may further include one or more transceivers 206 and/or one or more antennas 208. The processor 202 controls the memory 204 and/or the transceiver 206 and may be configured to implement the descriptions, functions, procedures, suggestions, methods, and/or operational flowcharts disclosed herein. For example, the processor 202 may receive a signal from the terminal through the first channel. At this time, the signal may be a signal transmitted through the first channel after the terminal determines a contention window size (CWS) and performs a channel access procedure for the first channel based on the determined contention window size. In addition, when there is no transmission history of the second channel to be reflected in determining the contention window size, the contention window size may be determined as a minimum CWS value within a specific channel access priority class (CAPC). The memory 204 may perform some or all of the processes controlled by the processor 202 or store software codes including commands for performing the descriptions, functions, procedures, proposals, methods, and/or operational flowcharts disclosed herein. Here, the processor 202 and the memory 204 may be part of a communication modem/circuit/chip designed to implement wireless communication technology (e.g., LTE, NR). The transceiver 206 may be connected to the processor 202 and may transmit and/or receive wireless signals through one or more antennas 208. The transceiver 206 may include a transmitter and/or a receiver. The transceiver 206 may be mixed with a radio frequency (RF) unit. In the present disclosure, a wireless device may refer to a communication modem/circuit/chip.

Hereinafter, hardware elements of the wireless devices 100 and 200 will be described in more detail. Although not limited thereto, one or more protocol layers may be implemented by one or more processors 102, 202. For example, one or more processors 102 and 202 may implement one or more layers (e.g., functional layers such as PHY, MAC, RLC, PDCP, RRC, or SDAP). One or more processors 102 and 202 may generate one or more protocol data units (PDUs) and/or one or more service data units (SDUs) according to the descriptions, functions, procedures, proposals, methods, and/or operational flowcharts disclosed in this document. One or more processors 102 and 202 may generate messages, control information, data, or information according to the descriptions, functions, procedures proposals, methods, and/or operational flowcharts disclosed herein. One or more processors 102 and 202 generate signals (e.g., baseband signals) including PDUs, SDUs, messages, control information, data or information according to the functions, procedures, proposals and/or methods disclosed herein and provide the generated signal to one or more transceivers 106 and 206. One or more processors 102 and 202 may receive signals (e.g., baseband signals) from one or more transceivers 106 and 206 and acquire PDUs, SDUs, messages, control information, data or information according to the descriptions, functions, procedures, proposals, methods, and/or operational flowcharts disclosed herein.

The one or more processors 102 and 202 may be referred to as a controller, a microcontroller, a microprocessor, or a microcomputer. One of processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The descriptions, functions, procedures, proposals, methods, and/or operational flowcharts disclosed in this document may be implemented using firmware or software, and firmware or software may be implemented to include modules, procedures, functions, and the like. Firmware or software set to perform the descriptions, functions, procedures, proposals, methods and/or operational flowcharts disclosed in this document may be included in one or more processors 102 and 202 or may be stored in one or more memories 104 and 204 and driven by one or more processors 102 and 202. The descriptions, functions, procedures, proposals, methods, and/or operational flowcharts disclosed in this document may be implemented using firmware or software in the form of codes, instructions, and/or sets of commands One or more memories 104, 204 may be connected to one or more processors 102 and 202 and may store various types of data, signals, messages, information, programs, codes, instructions, and/or commands. One or more memories 104 and 204 may include ROM, RAM, EPROM, flash memory, hard drive, register, cache memory, computer readable storage medium, and/or combinations thereof. One or more memories 104 and 204 may be located inside and/or outside one or more processors 102 and 202. In addition, one or more memories 104, 204 may be connected to one or more processors 102, 202 through various technologies such as wired or wireless connection.

The one or more transceivers 106 and 206 may transmit user data, control information, wireless signals/channels, and the like mentioned in the methods and/or operational flowcharts of this document to one or more other devices. One or more transceivers 106 and 206 may receive user data, control information, wireless signals/channels, etc. mentioned in the descriptions, functions, procedures, proposals, methods and/or operational flowcharts disclosed in this document from one or more other devices. For example, one or more transceivers 106 and 206 may be connected to one or more processors 102 and 202 and may transmit and receive wireless signals. For example, one or more processors 102 and 202 may control one or more transceivers 106 and 206 to transmit user data, control information, or wireless signals to one or more other devices. In addition, one or more processors 102, 202 may control one or more transceivers 106 and 206 to receive user data, control information, or wireless signals from one or more other devices. In addition, one or more transceivers 106 and 206 may be connected to one or more antennas 108 and 208, and one or more transceivers 106 and 206 may be configured to transmit and receive user data, control information, wireless signals/channels, and the like mentioned in the descriptions, functions, procedures, proposals, methods and/or operational flowcharts disclosed in this document through one or more antennas 108 and 208. In this document, one or more antennas may be a plurality of physical antennas or a plurality of logical antennas (e.g., antenna ports). One or more transceivers 106 and 206 may convert received wireless signals/channels, etc. from RF band signals to baseband signals to process received user data, control information, wireless signal/channels, etc. using one or more processors 102 and 202. One or more transceivers 106 and 206 may convert the user data, control information, wireless signals/channels, etc. processed using one or more processors 102 and 202 from baseband signals to RF band signals. To this end, one or more of the transceivers 106 and 206 may include (analog) oscillators and/or filters.

The present disclosure may be implemented as a CRM (Computer-Readable Medium) or a chipset.

For example, when implemented as a CRM, instructions based on being executed by at least one processor may be included in a medium that can be recognized by a computer. The operation performed by the commands may include determining a contention window size (CWS), and performing a channel access procedure for the first channel based on the determined contention window size. When there is no transmission history of the second channel to be reflected in determining the contention window size, an operation of determining a minimum CWS value in a specific channel access priority class (CAPC) as the contention window size is included.

As another example, the present disclosure may be implemented with a chipset, that is, a processor.

Figure 27:
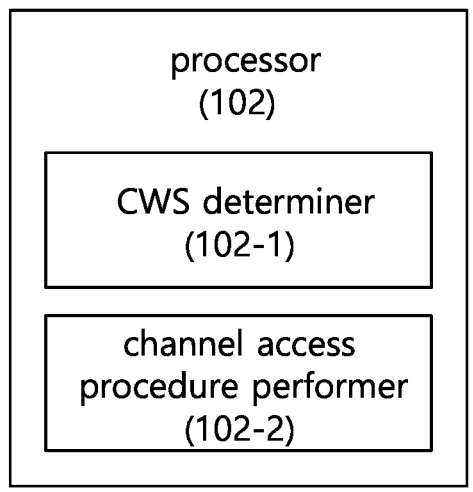
FIG. 27 shows an example of the processor 102.

FIG. 27 shows an example of the processor 102.

Referring to FIG. 27, the processor 102 may include a CWS determiner 102-1 and a channel access procedure performer 102-2. The CWS determiner 102-1 determines a contention window size (CWS). For example, if there is a transmission history of the second channel to be reflected in determining the contention window size, the CWS of the first channel may be determined by using the most recent CWS used for the second channel, and if there is no transmission history of the second channel to be reflected in determining the contention window size, a minimum CWS value in a specific channel access priority class—for example, channel access priority class of the second channel—may be determined as the contention window size. The processor 102 may be included in the terminal 100 or may be included in the base station 200. The processor 102 may further include at least one of a scrambler, a modulator, a layer mapper, a precoder, a resource mapper, and a signal generator. A specific example of this will be described later.

The methods described below may be implemented by the above-described device.

In the following, the device may transmit a signal through a channel. For example, the terminal may transmit a signal (e.g., data) to the base station through the PUSCH, which may be expressed as the terminal transmitting the PUSCH to the base station. As another example, the terminal may transmit a signal (e.g., control information) to the base station through the PUCCH, which may be expressed as the terminal transmitting the PUCCH to the base station.

Basically, for channels and signals that existed at the time of licensed assisted access (LAA), the channel access procedures defined in LAA become basic and may be inherited as they are or may be slightly modified. For channels and signals that did not exist during the LAA, a new channel access procedure and a contention window size (CWS) adjustment method may be required.

For example, it is possible to provide flexibility by defining feedback for each channel and adjusting CWS based on the feedback. It may be difficult to say that the probability of channel accessibility is uniformly increased, but at least the advantage of providing scheduling flexibility is clear.

Prior to the proposed method, an NR-based channel access scheme for an unlicensed band used in the present disclosure may be classified as follows.

Category 1 (Cat-1): This is a channel access scheme in which the next transmission is performed immediately after a short switching gap immediately after the previous transmission ends within the Channel Occupancy Time (COT). The switching gap may be shorter than 16 us and may include a transceiver turnaround time.

Category 2 (Cat-2): This is a channel access scheme that can be transmitted immediately when it is confirmed that the channel is idle during a specific time just before transmission by a listen before talk (LBT) method without back-off.

Category 3 (Cat-3): As an LBT method of back-off with a fixed CWS, this is a channel access scheme on which the transmitting entity may select a random number N from 0 to the maximum CWS value (which may be a fixed value) and transmit when the counter value becomes 0 after decreasing the counter value from N (or a value derived from N) each time it is confirmed that the channel is idle.

Category 4 (Cat-4): As an LBT method of back-off with variable CWS, this is a channel access scheme on which the transmitting entity may select a random number N from 0 to the maximum CWS value (which may be a variable value) and transmit when the counter value becomes 0 after decreasing the counter value from N (or a value derived from N) each time it is confirmed that the channel is idle. In this channel access scheme, when a feedback (e.g., NACK) that the corresponding transmission was not properly received is received from the receiving side, the maximum CWS value is increased to one level higher value, and the above-described LBT procedure may be performed again by selecting a random number again within the increased CWS value.

Meanwhile, in an existing LTE system or an NR system, in general, a random access procedure may follow the following procedure.

Step 0) The base station (eNB) may instruct a specific terminal to transmit a random access preamble (PRACH) using a specific timing and a specific sequence on a specific carrier through a PDCCH order (however, in the case of contention based random access, this process may be omitted).

Step 1) The terminal transmits the corresponding PRACH (or referred to as message 1 (Msg1)).

Step 2) When the base station receives the corresponding PRACH, it transmits a random access response (RAR, which may be referred to as message 2 (Msg2)) within a specific time duration (RAR may include UL power control information, scheduling information for the PUSCH that the terminal will transmit in response to the RAR, and UL transmission timing control information for the corresponding terminal).

Step 3) When the terminal receives the RAR, it transmits a PUSCH (which may be referred to as message 3 (Msg3)) according to scheduling information included in the RAR at a specific time associated with the RAR reception time.

Step 4) The base station receiving the message 3 (Msg3) transmits a PDSCH (which may be referred to as message 4 (Msg4)) including contention resolution information such as a terminal ID.

As described above, in order to attempt uplink data transmission after the terminal has aligned uplink synchronization with the base station, at least 4-way handshaking may be preceded.

In the case of a random back-off-based Cat-4 LBT used for PDSCH or PUSCH transmission, an operation of increasing or initializing CWS by detecting whether there is a collision of a signal through feedback information such as HARQ-ACK or a new data indicator (NDI) is possible. However, in the case of transmission of Msg1 (PRACH), Msg2 (RAR), Msg3 (PUSCH) and DRS alone transmitted in the initial access process, there is no direct feedback such as HARQ-ACK or NDI from the receiving side. If there is a feedback on whether transmission collision or successful reception for these channels and signals, the information can be used to apply the CWS adjustment. Alternatively, each channel and signal does not have a separate CWS value depending on the situation, but has a different priority class (PC, means the aforementioned CAPC), it is also possible to adjust the CWS value based on the transmission history of the PDSCH or PUSCH. It will be described in more detail below.

[Proposed method #1] When the terminal transmits the PRACH or PUCCH alone, the channel access procedure and the CWS adjustment method may be performed by at least one of the following examples.

Method-(1) It is based on Cat-3 LBT, but one CWS value or set of CWS values, or priority class may be configured as SIB1.

Method-(2) It is based on Cat-4 LBT, but CWS values defined as priority class 1 can be used. Alternatively, the terminal may randomly select one of a minimum CWS value or a maximum CWS value within a specific priority class (CAPC) and use it for the LBT.

Method-(3) It is based on the Cat-4 LBT, but the CWS value may be updated using whether detecting PDCCH masked with RA-RNTI (random access-Radio Network Temporary Identity) within the RAR window or not.

Method-(4) It is based on Cat-4 LBT, but the CWS value may be updated using the presence or absence of RAPID (Random Access Preamble IDentifier) transmitted by the terminal in the RAR PDSCH.

However, in the case of PRACH transmission based on a single LBT sub-band, the method of (3) is applied, and in the case of PRACH transmission based on a plurality of LBT subbands, a channel (e.g., PDCCH or PDSCH) indicating a subband index in which the PRACH is actually transmitted may be detected and information of the channel may be used.

However, the proposed method is applicable to the channel access procedure and CWS adjustment when transmitting MsgA in the case of a 2-step RACH procedure in which PRACH and Msg3 are bundled and transmitted as MsgA.

The terminal may receive the RMSI broadcasted by the base station to obtain cell access information and RACH configuration, which are information necessary for initial access. When the terminal selects and transmits a PRACH having a specific preamble ID based on the received RACH configuration, if it is based on Cat-3 LBT as in Method-(1), a set of possible fixed CWS values or a priority class can be configured from SIB1.

The terminal may select one of a plurality of CWS values in a set of configured fixed CWS values arbitrarily or according to a specific rule. The specific rule may be a method in which the terminal randomly selects one between the minimum CWS value and the maximum CWS value. For example, the terminal may arbitrarily select 5 among values between 3 and 7.

Alternatively, a priority class can be configured and the minimum CWS or maximum CWS value defined in the corresponding priority class can be used for the LBT. The terminal selects one random number N between 0 and the CWS value when the CWS value is determined, and, the counter value is decreased from N whenever the channel is idle, and then transmission can be started at the moment when it reaches zero.

The PRACH needs to be transmitted by quickly accessing the channel at a time when the transmission length is relatively short and transmission is required (or RACH occasion). Therefore, even if transmission based on Cat-4 LBT as in Method-(2), the LBT is always performed based on the CWS value corresponding to the priority class 1 so that a relatively fast channel access may be possible. In addition, method-(3) or method-(4) can be applied to adjust the CWS value according to whether or not there is a collision or reception.

When the base station detects the PRACH transmitted by the terminal, the base station may schedule an Msg2 RAR message including a temporary cell (TC)-RNTI, a timing advanced (TA) command, a UL-grant and RAPID as a PDCCH masked with RA-RNTI. When the terminal receives the PDCCH masked with RA-RNTI within the RAR window, it can know that the base station has successfully received the PRACH transmitted by the terminal. Therefore, in case of transmitting the PRACH based on Cat-4 LBT as in Method-(3), the CWS value may be reset upon receiving the PDCCH masked with RA-RNTI. When the PDCCH masked with RA-RNTI is not received, the current CWS value may be maintained or increased to a one step larger value.

In addition, if the RAPID in the Msg2 RAR (PDSCH) scheduled through the DCI scrambled with the RA-RNTI corresponding to the RO (RACH Occasion) transmitted by itself as in Method-(4) matches the preamble index sent by itself, it is regarded that PRACH transmission is successful, and the CWS value can be reset. Alternatively, if the RAPID is different from that transmitted by itself, the current CWS value may be maintained or increased to a one level larger value. Specifically, if, by transmitting the PRACH N times (N is a natural number), the PDCCH masked with RA-RNTI cannot be received N times, or if the RAPID in the RAR does not match the one sent by itself N times, the CWS value can be configured to increase to one level larger value.

In addition, the BW is divided into LBT subbands in units of 20 MHz when the bandwidth (BW) of the bandwidth part (BWP) is 20 MHz or more, and the PRACH can be transmitted to the successful LBT subband after performing LBT in each of the above methods. Therefore, the CWS is adjusted by applying the methods of method-(3) and method-(4) in the case of PRACH transmission based on a single LBT subband, and it adjusts the CWS to one step larger value when there is no subband index by using the detection information of the channel (PDCCH or PDSCH) indicating the index of the subband in which the actual PRACH is transmitted in the case of PRACH transmission based on a plurality of LBT subbands, and the CWS can be reset and used for CWS adjustment when the sub-band index is detected.

[Proposed method #2] Channel access procedure and CWS adjustment method when the terminal transmits Msg3 PUSCH.

Method-(1) It is based on Cat-3 LBT, but a specific single CWS value or set of CWS values can be configured from SIB1, RAR or a combination of SIB1 and RAR, or priority class information can be configured. From the network standpoint, when configuring a CWS value with a combination of SIB1 and RAR, a plurality of CWS values may be configured through SIB1 and a specific one CWS value among them may be selected through RAR.

Method-(2) It is based on Cat-4 LBT, but the CWS value can be updated using whether or not a PDCCH masked with TC-RNTI or C(cell)-RNTI is detected.

Method-(3) It is based on the Cat-4 LBT, but the CWS value can be updated using whether or not the terminal ID in the Msg4 PDSCH is included.

However, in the case of Msg3 transmission based on a single LBT subband and a single transmission timing (Tx timing), the method-(2) or method-(3) is applied, and, in the case of Msg3 transmission based on multiple LBT subbands or multiple transmission timings, the actual Msg3 transmission subband index or detection and information of a channel indicating transmission timing can be used for CWS adjustment.

When the terminal receives the scheduled Msg2 RAR (PDSCH) through DCI scrambled with RA-RNTI corresponding to the RO (RACH Occasion) transmitted by itself within the RAR window after PRACH transmission during the initial access process, Msg3 may be transmitted based on UL grant information in Msg2 RAR. The Msg2 RAR basically includes UL transmission timing control information, UL power control information, and scheduling information for a PUSCH to be transmitted by the terminal in response to the RAR.

If Msg3 PUSCH is transmitted based on Cat-3 LBT as in Method-(1), the base station includes information on the set of fixed CWS values to be used for Msg3 PUSCH transmission in the SIB1, Msg2 RAR or the combination of SIB1 and RAR. The terminal may randomly select one CWS value from among a plurality of CWS values based on the corresponding information or select according to a predetermined rule, and the terminal transmit the Msg3 PUSCH by performing Cat-3 LBT using the corresponding CWS value. When the priority class information is received, one of the minimum CWS value or the maximum CWS value of the corresponding priority class can be selected as the CWS value to be used when performing Cat-3 LBT.

On the other hand, in the case in which the Msg3 PUSCH is transmitted based on the Cat-4 LBT, if the base station successfully receives the corresponding Msg3 PUSCH, the base station transmits a TC-RNTI or C-RNTI (in case of contention-free random access) masked PDCCH to the terminal. The corresponding PDCCH contains information for scheduling a PDSCH including contention resolution information such as a terminal ID. Therefore, when the terminal receives the PDCCH masked with TC-RNTI or C-RNTI as in Method-(2), it is deemed that the Msg3 PUSCH has been successfully transmitted and may reset the CWS value. Alternatively, when the PDCCH is not received, the current CWS value may be maintained or increased to a one level higher value.

In addition, as in Method-(3), if the terminal ID included in the Msg4 PDSCH matches its own, it is possible to reset the CWS value because it is possible to know that Msg3 PUSCH transmission has been successfully performed. Alternatively, if the terminal ID does not match with its own, the current CWS value may be maintained or increased to a one level higher value. The CWS value adjusted in Method-(3) and Method-(4) may be the CWS value adjusted by PRACH transmission in [Proposed method #1]. In this case, the PRACH and Msg3 use and update the common CWS value. Alternatively, it may be a CWS value that is adjusted only for Msg3 transmission, independent of the CWS value used for PRACH transmission.

In addition, in the case of a single LBT subband and transmission timing-based Msg3 transmission, according to whether the subband index is detected, the CWS is reset when the subband index is detected, and the CWS can be increased to one level higher value or the current CWS value can be maintained when the subband is not detected.

[Proposed method #3] A method where Uplink (UL) channels (e.g., PRACH, PUCCH, SRS, PUSCH in which only UCI is transmitted, PUSCH) and signals transmitted alone have different priority classes (different maximum CWS values) but the CWS value is adjusted based on feedback information (e.g., NDI in UL grant) on a unicast PUSCH.

The method can be applied when there is a unicast PUSCH transmission history between transmission of each UL channel and signals.

In the LTE LAA system, CWS values are not separately provided according to channels and signals, and when a transmission collision situation occurs, CWS values corresponding to all priority classes are increased to one level larger value. In addition, the CWS value is updated while resetting the CWS values to the minimum value when the transmission is successfully performed, and when transmitting a specific channel or signal in a certain situation, the CWS value corresponding to the priority class of the corresponding channel or signal is directly used to transmit.

Specifically, since the Cat-4 LBT parameter for SRS transmission is fixed to priority class 1 but the CWS value would have been updated according to the previous PUSCH transmission history in the case of SRS alone transmission, if a collision occurs in the previous PUSCH transmission and the CWS values for all priority classes are increased to one level larger value, Cat-4 LBT is performed using the CWS value increased by one step among the CWS values of the predetermined priority class 1 even when transmitting the SRS alone.

Therefore, in the case of single transmission {PRACH, PUCCH, SRS, UCI only PUSCH, PUSCH}, each channel and signals have different priority classes, but the CWS value can be adjusted based on the transmission history of the unicast PUSCH existing between each channel and signal transmission. That is, in the method, if there is a lot of collision in previous PUSCH transmissions, the CWS value for each of all priority classes is increased, otherwise, the CWS value is adjusted by resetting the CWS value for each of the all priority classes, and LBT is performed and transmitted using the corresponding CWS value when transmitting a specific channel and signal.

In [Proposed method #1] and [Proposed method #2], the channel access procedure and the CWS adjustment method by PRACH or Msg3 transmission may lead to CWS update based on the transmission history of the unicast PUSCH as shown in [Proposed method #3] after the initial access procedure is terminated. That is, CWS update through PRACH or Msg3 transmission is applied to CWS control of other UL channels and signals, and after that, CWS is adjusted through whether or not PUSCH collides.

Or, if each UL channel and signal has a CWS value and is adjusted separately, the CWS value of PRACH may be adjusted by the method of [Proposed method #1], the CWS value of Msg3 may be adjusted by the method of [Proposed method #2], and the remaining channels and signals may be adjusted by the method of [Proposed method #3], respectively.

In addition, even if the CWS value is adjusted based on the transmission history of the PUSCH without having a separate CWS value for each UL channel and signal in [proposed method #3], if the terminal is in an idle mode or there is no PUSCH transmission history to be reflected in the CWS value update because only the SRS is transmitted alone for a considerable period without unicast PUSCH transmission for a considerable period of time, the CWS value is adjusted like [proposed method #1] or [proposed method #2], and after the RACH process is finished, the CWS values of all channels and signals are adjusted again with the transmission history of the PUSCH, or CWS values may be respectively adjusted for each channel and signal even after the RACH process according to the base station configuration. About this, it will be described in detail with reference to FIG. 28.

The following drawings are prepared to describe a specific example of the present specification. Since the names of specific devices or names of specific signals/messages/fields described in the drawings are provided by way of example, the technical features of the present specification are not limited to the specific names used in the following drawings.

Figure 28:
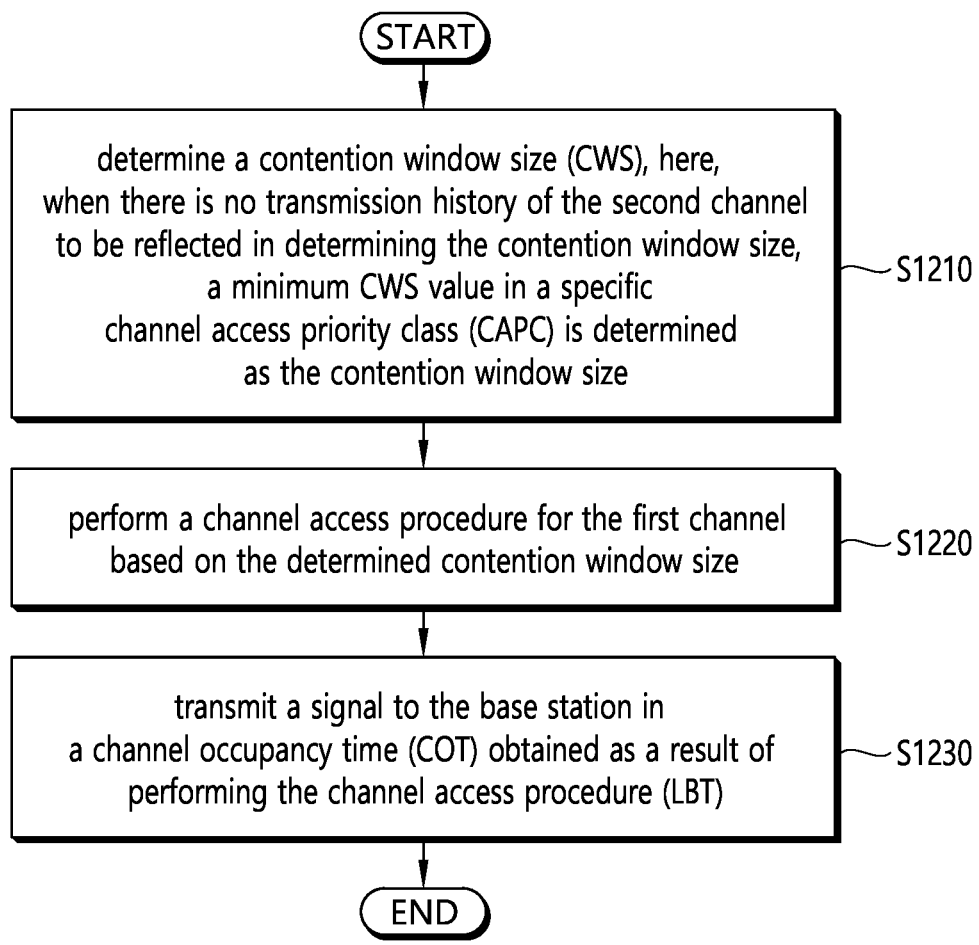
FIG. 28 illustrates a method of performing a channel access procedure of a terminal in an unlicensed band.

FIG. 28 illustrates a method of performing a channel access procedure of a terminal in an unlicensed band.

Referring to FIG. 28, the terminal determines a contention window size (CWS) (S1210). In this case, when there is no transmission history of the second channel to be reflected in determining the contention window size, a minimum CWS value in a specific channel access priority class (CAPC) may be determined as the contention window size. The minimum CWS value may be the smallest contention window size specified for CAPC of the second channel.

The first channel may be a channel in which the base station does not provide explicit feedback on whether or not the first channel is successfully received. For example, the first channel may be a channel for transmitting PRACH, PUCCH, and SRS. For these channels, the base station does not provide acknowledgment, e.g., ACK/NACK. The first channel may also be referred to as a channel without explicit feedback.

The second channel may be a channel through which the base station provides explicit feedback on whether or not the second channel is successfully received. For example, the second channel may be a PUSCH transmitted by a specific terminal. The second channel may also be referred to as a channel with explicit feedback.

For example, if there is a second channel transmission history with explicit feedback (if the second channel exists), the first channel without explicit feedback may use the most recently updated CWS based on the second channel and use the channel access priority class (CAPC) same as the second channel Otherwise, that is, if the second channel does not exist (that is, if there is no transmission history of the second channel to be reflected in determining the contention window size), a minimum CWS value (e.g., a minimum CWS corresponding to the CAPC of the second channel) within a specific channel access priority class (CAPC) may be used.

A plurality of contention window size values may be included in the channel access priority class of the second channel The terminal performs a channel access procedure for the first channel based on the determined contention window size (S1220).

The terminal transmits a signal to the base station in a channel occupancy time (COT) obtained as a result of performing the channel access procedure (LBT) (S1230).

More specifically, for example, it is assumed that the first channel has a channel access priority class p and is a channel (that is, a channel in which the base station does not provide explicit or implicit ACK/NACK feedback even if it receives a signal through the first channel, for example, when a base station receives a signal through a channel that transmits PRACH, PUCCH, and SRS, it does not provide explicit feedback on the signal, in this case, the channel for transmitting the PRACH, PUCCH or SRS may be referred to as the first channel) not related to explicit or implicit HARQ-ACK feedback.

In this case, if there is a transmission history of the second channel (that is, a channel that provides explicit feedback on it when the base station receives a signal through the second channel, for example, the base station receiving data through the PUSCH provides ACK/NACK for the data to the terminal, in this case, the PUSCH may be referred to as a second channel) associated with explicit feedback (ACK/NACK, NDI, etc.) having the same channel access priority class p (as the first channel), the terminal may use/adjust the most recent contention window size (CWp) used for the second channel as the contention window size for the first channel.

However, in some cases, the transmission history of the second channel may not exist (for a specific time interval). In this case, in the present disclosure, a minimum contention window size corresponding to a specific channel access priority class, for example, the channel access priority class p, may be used.

The following table exemplifies the contention window size corresponding to the channel access priority class p.

TABLE 4

| Channel Access Priority Class ( p) | $CW_{min,p}$ | $CW_{max,p}$ | Allowed $CW_p$ sizes (CWS) |
|---|---|---|---|
| 1 | 3 | 7 | {3, 7} |
| 2 | 7 | 15 | {7, 15} |
| 3 | 15 | 1023 | {15, 31, 63, 127, 255, 511, 1023} |
| 4 | 15 | 1023 | {15, 31, 63, 127, 255, 511, 1023} |

For example, in determining the contention window size of a first channel that is a channel access priority class p=3 and is not associated with explicit or implicit HARQ-ACK feedback, if the channel access priority class p=3 and (for a certain period) there is no transmission history of the second channel associated with explicit feedback (ACK/NACK, NDI, etc.), the contention window size (CWS) of the first channel may be the smallest 15 (=$CW_{min,3}$) among CWSs {15,31,63,127,255,511,1023} allowed for the channel access priority class p=3.

After the terminal randomly selects the initial value of the backoff counter value from 0 to 15, it decreases the backoff counter value by 1 when the channel is in an idle state, through this process, it transmits a signal through the first channel when the backoff counter value becomes 0. If the channel is not in an idle state (i.e., in a busy state), it checks whether the channel is in an idle state again for a delay time (Td).

According to this method, for a channel or signal (non-unicast DL/UL signal/channel) without explicit feedback, a feedback channel or method to be used for adjusting the contention window size of the base station/terminal in addition to HARQ-ACK is provided. Even if there is no unicast PDSCH/PUSCH, it is possible to effectively update the contention window size.

Figure 29:
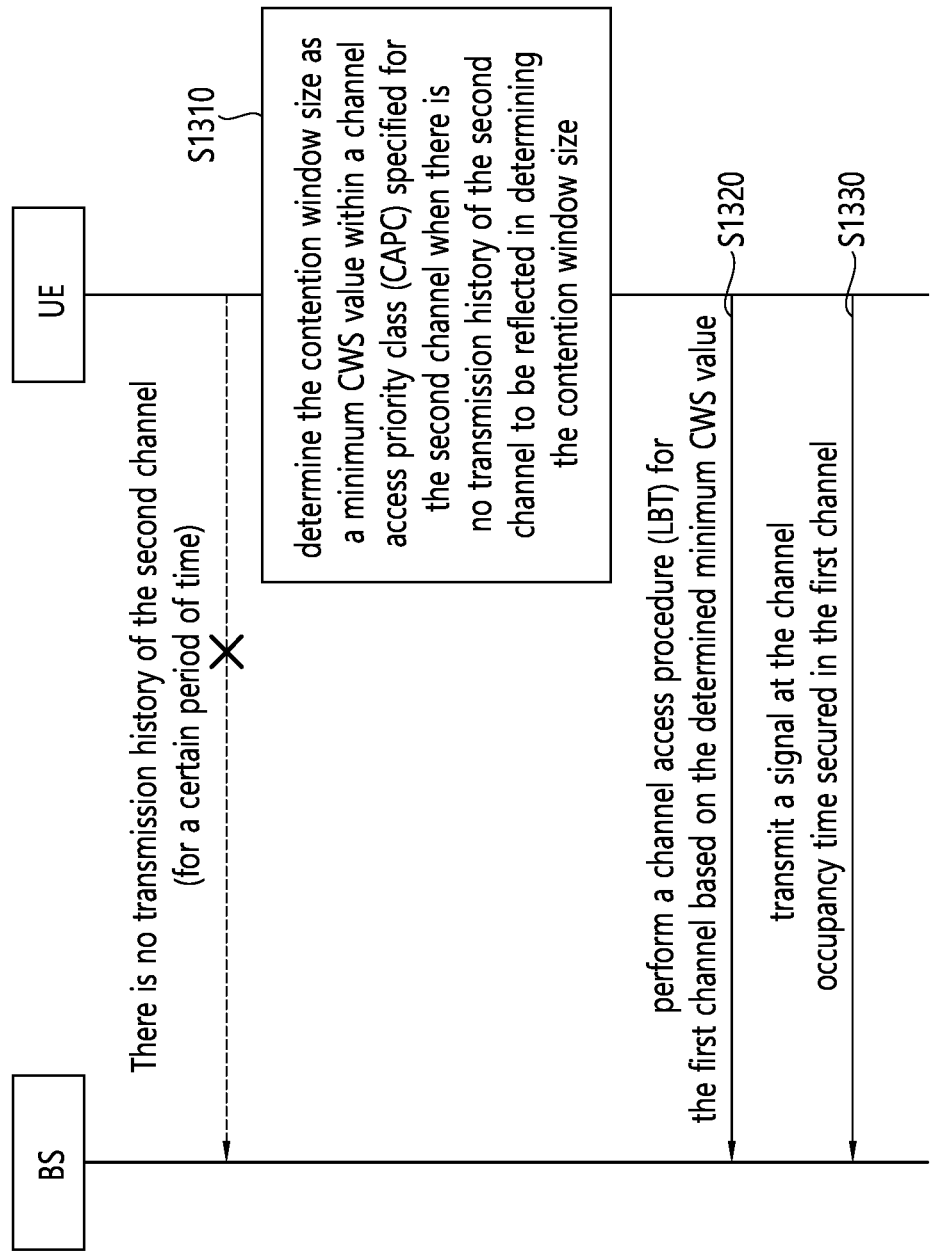
FIG. 29 illustrates a method for the base station to communicate with the terminal.

FIG. 29 illustrates a method for the base station to communicate with the terminal.

Referring to FIG. 29, the terminal is in a state in which the terminal does not transmit the second channel to the base station. the terminal determines the contention window size as a minimum CWS value within a channel access priority class (CAPC) specified for the second channel when there is no transmission history of the second channel to be reflected in determining the contention window size (S1310), and a channel access procedure (LBT) for the first channel is performed based on the determined minimum CWS value (S1320).

Through this procedure, the base station receives a signal from the terminal at the channel occupancy time secured in the first channel (S1330).

In the LTE-LAA system, DRS (discovery reference signal) is transmitted for cell detection, synchronization, and RSRP(reference signal received power)/RSRQ(Reference Signal Received Quality) measurement. The DRS may include PSS(primary synchronization signal)/SSS(secondary synchronization signal)/CRS(cell-specific reference signal)/CSI-RS(channel state information reference signal) and may be transmitted through a maximum of 12 symbols. DRS can be transmitted if LBT is successful in DMTC (DRS measurement time configuration). The DMTC may be configured in a 40/80/160 ms cycle. DRS without PDSCH can be transmitted after performing Cat-2 LBT immediately before transmission, and the corresponding DRS has a duty cycle less than 1/20 and has the total length equal to or less than 1 ms.

Meanwhile, in the NR-U system, similarly to LAA, the DRS may be periodically transmitted in one continuous burst for synchronization and measurement. This may include an SS/PBCH block burst set including the minimum PSS/SSS/PBCH. In addition, rather than satisfying OCB (Occupied Channel Bandwidth) requirements and performing individual channel access procedures for transmission of multiple signals, in order to minimize the number of LBT attempts and to transmit signals in a compact manner at a single COT, in addition to the SS/PBCH burst set, the CSI-RS and RMSI-CORSET(s)+PDSCH(s) (RMSI) associated with the corresponding SS/PBCH block may be transmitted together. In addition, additional signals such as other system information (OSI) or paging may also be multiplexed together with the NR-U DRS and transmitted.

[Proposed method #4] The channel access procedure and CWS control method, when the base station transmits RAR alone or DRS alone or DRS is multiplexed with non-unicast data (e.g., OSI, paging, RAR) to transmit.

Method-(1) It transmits based on Cat-3 LBT, but a fixed CWS value can be proportionally configured according to the transmission length or duty cycle of non-unicast data.

Method-(2) It transmits based on the Cat-4 LBT, but the CWS value may be updated using HARQ-ACK feedback statistics for the PDSCH scheduled/transmitted in a specific reference slot of the terminals.

Method-(3) It transmits based on the Cat-4 LBT, but the CWS value can be updated using the presence or absence of detection of the PRACH preamble or detection statistics of the PRACH preamble transmitted in response to paging.

Method-(4) It transmits based on Cat-4 LBT, but the minimum CWS value and/or the maximum CWS value may be proportionally configured according to the transmission length or duty cycle of the non-unicast data.

Method-(5) It transmits based on Cat-4 LBT, but the CWS value can be adjusted based on the following Msg3.

A. The presence or absence of detection of the Msg3 signal corresponding to at least one of the RAPIDs included in the RAR may be used.

B. The presence or absence of Msg3 signal detection corresponding to a specific one of the RAPIDs included in the RAR can be used.

C. Statistics for the presence or absence of Msg3 signal detection corresponding to all RAPIDs included in the RAR can be used.

However, in the above, the terminal may perform RACH preamble transmission based on the RACH configuration acquired through the corresponding DRS. In addition, the channel access procedure for the DRS may be applicable to a DRS having a duty cycle greater than X (e.g., X=1/20) or a total duration greater than Y ms (e.g., Y=1 ms).

Here, the transmission time of the RAR in Method-(5) may be based on a specific DL reference subframe which is transmitted n slots (e.g., n=4) earlier from Msg3.

In LTE LAA, a DRS having no PDSCH, a duty cycle of 1/20 or less, and a total transmission length of 1 ms or less may be transmitted after performing Cat-2 LBT. However, for DRS transmission with a duty cycle greater than 1/20, a total transmission length exceeding 1 ms or including a PDSCH, it may need to perform a Cat-4 LBT.

Therefore, even in the case of NR-U DRS, when DRS alone is transmitted or DRS and non-unicast data are multiplexed and transmitted, when the duty cycle is less than or equal to X (e.g., X=1/20), and the total transmission length is less than or equal to Y ms (e.g., Y=1 ms), the base station can perform DRS transmission after Cat-2 LBT.

However, when the duty cycle is greater than 1/20 and the total transmission length is 1 ms or more, Cat-2 LBT cannot be applied. In the case of such NR-U DRS, Cat-3 LBT is applied as in the proposed method-(1), but a fixed CWS value can be proportionally configured according to the duty cycle or the total transmission length.

For example, assuming that the NR-U DRS has the CWS value of priority class 1 as an initial value, if the CWS value is 3 when the total transmission length is 1 ms, the CWS value used for Cat-3 can be configured to 7 when the total transmission length reaches 2 ms. Also, it applies Cat-4 LBT as in Method-(4), but it is also possible to proportionally configure the minimum CWS value or the maximum CWS value in the priority class corresponding to the Cat-4 LBT according to the duty cycle or the total transmission length.

The NR-U DRS is basically a signal including an SS/PBCH block burst set, and is information broadcast mainly for use in synchronization and measurement. In addition, non-unicast data such as OSI, paging and RAR are multiplexed and transmitted, however, it is a signal without direct feedback from the terminal basically. Therefore, for CWS adjustment when applying Cat-4 LBT to NR-U DRS transmission, as a response to paging when DRS and paging are multiplexed and transmitted as in method-(3) or HARQ-ACK transmitted by terminals accessing the base station as feedback for PDSCH as in method-(2), feedbacks such as the presence or absence of detection of the PRACH preamble transmitted by the terminal may be utilized. For example, when the slot referred to by the base station for CWS adjustment is referred to as a reference slot, the collision is determined by the ACK (or NACK) ratio of the HARQ-ACK feedbacks for the scheduled/transmitted PDSCH in the corresponding slot (e.g., if NACK/(ACK+ NACK)*100=80 or more, it is determined as collision), if there is a collision, the CWS value of the DRS is increased to one level larger value, and if there is no collision, the CWS value may be reset.

Or, when data to be sent to a specific terminal occurs and paging is transmitted along with DRS, it may be used depending on whether the PRACH preamble transmitted by the terminals receiving the paging is detected in the RO, alternatively, PRACH preamble detection statistics such as (number of PRACH preamble discovery ROs)/(total number of ROs) may be used. For example, if a PRACH preamble is found in RO or if the statistic value is more than or equal to 20%, the CWS value is reset, if the PRACH preamble is not detected in the RO or the statistic value is less than or equal to 20%, the CWS value may be increased to a one level larger value or the current CWS value may be maintained.

When the NR-U DRS is multiplexed with the RAR and transmitted, the CWS value can be adjusted according to the presence or absence of Msg3 transmission of the terminal as in method-(5). The RAR includes scheduling information for the Msg3 PUSCH to be transmitted by the terminal in response to the RAR, as well as the index of the preamble received by the base station (RAPID). Therefore, the base station resets the CWS value when Msg3 corresponding to at least one or a specific one among the RAPIDs included in the RAR is detected, and, the CWS value can be increased when it is not detected. Alternatively, based on the statistics of the presence or absence of Msg3 signal detection corresponding to all RAPIDs included in the RAR, if at least one is ACK, the CWS value may be reset, and if all RAPIDs are NACK, the CWS value may be increased to a one step larger value.

The proposed method can be used for channel access procedure and CWS control when transmitting control messages related to initial/random access, mobility, paging, reference signals-only and PDCCH-only transmission (e.g. in case of transmission for "Msg4", handover command, GC(group common)-PDDCH, or short paging message alone or multiplexed with DRS).

[Proposed method #5] A method of adjusting the CWS value based on feedback information on the unicast PDSCH (e.g., HARQ-ACK PUCCH, etc.), where DL channels and signals (e.g., DRS, RAR, OSI, paging, PDSCH) transmitted independently have different priority classes (different maximum CWS values).

The method can be applied when there is a unicast PDSCH transmission history between transmission of each DL channel and signals.

In the LTE LAA system, CWS values corresponding to all priority classes are increased to one level larger value when a transmission collision situation occurs without having a separate CWS value depending on the channel and signal, the CWS value is updated while resetting the CWS values to the minimum value when the transmission is successfully performed, and the CWS value corresponding to the priority class of the corresponding channel or signal is directly used for transmission when transmitting a specific channel or signal under certain circumstances. Specifically, since the Cat-4 LBT parameter for SRS transmission is fixed as priority class 1 but CWS value update according to the previous PUSCH transmission history would have existed in the case of SRS alone transmission, if a collision occurs in the previous PUSCH transmission and the CWS values each of all priority classes are increased to one level larger value, Cat-4 LBT is performed using the CWS value increased by one step among the CWS values of the predetermined priority class 1 even when transmitting the SRS alone.

Therefore, each channel and signal have different priority classes even in the case of {DRS, RAR, OSI, paging, unicast PDSCH} alone transmission, but the CWS value can be adjusted based on the transmission history of the unicast PDSCH existing between each channel and signal transmission.

Meanwhile, in [Proposed method #4], the RAR alone transmission, the DRS transmission alone, or the channel access procedure and CWS adjustment method of DRS and non-unicast data (e.g., OSI, paging, RAR) may lead to CWS update by the transmission history of unicast PDSCH in [Proposed method #5]. That is, RAR alone transmission, DRS transmission alone or CWS update through DRS and non-unicast data (e.g., OSI, paging, RAR) transmission is also applied to CWS adjust of other DL channels and signals. After that, it is possible to adjust the CWS through whether the PDSCH collides.

Or, if each DL channel and signal has a CWS value and is adjusted, RAR alone transmission or DRS transmission alone, or DRS and non-unicast data (e.g., OSI, paging, RAR) may be respectively adjusted by the method of [proposed method #4] in addition to the unicast PDSCH transmission history.

In addition, even if the CWS value is adjusted based on the transmission history of the PDSCH without having a separate CWS value for each DL channel and signal in [proposed method #5], if the terminal is in an idle mode or there is no PDSCH transmission history to be reflected in the CWS value update because only the DRS is transmitted alone for a considerable period without unicast PDSCH transmission for a considerable period of time, it is also possible to adjust the CWS value as in [proposed method #4].

[Proposed method #6] A method for configuring the initial CWS value used for PRACH or Msg3 in case of the initial access, the process of switching from idle mode to connected mode or handover.

Method-(1) The base station may configure/instruct a set of CWS values or a single CWS value through broadcasting information (e.g., SIB1).

Method-(2) If the priority class is determined as indicated by pre-configured or broadcasted information (e.g., SIB1), the terminal may randomly select one of the possible CWS values in the corresponding priority class.

Method-(3) When accessing the base station once and having CWS control history, the previously updated CWS value is saved and then the saved value is used again or the CWS value can be configured with method-(1) or method-(2) again.

In the above, the initial CWS value or priority class broadcast or configured/instructed by the base station may be determined based on the PDSCH transmission history of the base station.

When the terminal first powers on and attempts an initial connection based on Cat-4 LBT, since there is no previous transmission history of other channels or signals, it may be necessary to configure an initial CWS value to be used for the PRACH and Msg3 channel access procedure. At this time, channel access may be attempted by using a set of initial CWS values or a single CWS value in information broadcast by the base station (e.g., SIB1). When a set of CWS values is given, it may select one of a plurality of CWS values according to the format or length of the preamble to be transmitted by the terminal, the single CWS value can be used when there is only a single CWS value.

Or, if the priority class of the corresponding channel and signal has been determined in advance, or the priority class is configured/instructed by broadcasting information. The terminal may randomly select one of the available CWS values of the corresponding priority class. In addition, as in Method-(1), terminal may select one of a plurality of CWS values according to the format or length of the preamble to be transmitted.

If the connection history to the base station already exists and the terminal wants to switch from the idle mode to the connected mode again, the CWS value used in the connected mode is saved and reused or the CWS value may be reconfigured and a channel access procedure may be performed as in method-(1) or method-(2).

When the terminal additionally receives a handover command and performs handover from a serving cell to a target cell, the CWS value of PRACH or Msg3 may use the CW value used in the connected mode in the serving cell and it may be configured as in method-(1) or method-(2) based on information broadcast by the target cell.

Meanwhile, in the LAA, due to the limitation of the processing time capability of the terminal, 1) when receiving the UL grant in the n-th subframe, it is impossible to transmit the PUSCH at a time earlier than the (n+3)-th subframe, 2) when receiving the PDSCH in the n-th subframe, it is impossible to feedback HARQ-ACK before the (n+3)-th subframe.

But, in the NR, the terminal reports its processing time capability (e.g., N1, N2, described below) to the base station, and the base station can dynamically indicate to the terminal the HARQ-ACK feedback timing (K1) or the PUSCH transmission timing (K2) based on the information. Here, N1 is the number of OFDM symbols taken from immediately after PDSCH reception by the terminal to the earliest HARQ-ACK transmission, N2 is the number of OFDM symbols taken from immediately after the terminal receives the PDCCH including the UL grant to the fastest PUSCH transmission. And, K1 is the number of slots up to the corresponding HARQ-ACK transmission slot after receiving the PDSCH slot, and K2 is the number of slots up to the corresponding PUSCH transmission slot after receiving the PDCCH slot including the UL grant.

Depending on the terminal, HARQ-ACK feedback or PUSCH transmission may be possible at a faster timing (e.g., K1=2 or K2=2) than a timeline of 1) UL grant reception and PUSCH transmission or 2) PDSCH reception and PUCCH transmission in LAA case. Of course, the base station may indicate PUSCH transmission or HARQ-ACK feedback transmission at a slower time point (e.g., K1=5, K2=6) based on the minimum HARQ-ACK timing of each terminal, flexibly.

In the [proposed method #7] below, a method of configuring a DL/UL reference resource to be referred for CWS adjustment of a base station and a terminal in consideration of flexible HARQ-ACK timing and terminal processing capability in NR-U is proposed.

[proposed method #7] In the case of a terminal capable of transmitting HARQ-ACK feedback corresponding to slot #n before slot #(n+k) on the processing time capability of the terminal (or on the configured HARQ-ACK feedback timing), at least one of the following methods may be applied.

Method-(1) If the base station instructs the HARQ-ACK feedback before slot # (n+k) (that is, if the base station instructs to feedback HARQ-ACK before slot # (n+k)), ACK/NACK(s) corresponding to slot #n received at the corresponding timing may be reflected in CWS adjustment.

Method-(2) If the base station does not indicate HARQ-ACK feedback before slot # (n+k), all HARQ-ACKs corresponding to slot #n may be processed as NACK and reflected in CWS adjustment.

In the case of a terminal in which HARQ-ACK feedback transmission corresponding to slot #n is not possible before slot #(n+k) due to the processing time capability of the terminal (or due to the configured HARQ-ACK feedback timing), at least one of the following methods may be applied.

Method-(3) Since HARQ-ACK feedback is initially impossible before slot #(n+k), all HARQ-ACKs corresponding to slot #n may be ignored and not reflected in CWS adjustment.

The base station may configure the minimum HARQ-ACK timing based on the processing time capability transmitted by the terminals. The base station does not always instruct the terminal to transmit PUCCH according to the minimum HARQ-ACK timing, configuring the minimum HARQ-ACK timing may mean that PUCCH transmission of the terminal is impossible at a time earlier than the minimum HARQ-ACK timing Since the processing time capability may be different for each configuring, the minimum HARQ-ACK feedback timing may also be different.

For the base station to transmit DL at a specific point in time, when trying to adjust CWS before transmission, with reference to the 'HARQ-ACK(s) for slot #n' before slot #(n+k), the CWS can be adjusted to a one level higher value or reset to a minimum value. By the way, until the base station adjusts the CWS, due to the minimum HARQ-ACK feedback timing of the terminal, some terminals may and may not transmit ACK/NACK(s) for PDSCH(s) corresponding to slot #n.

The base station may also indicate the PUCCH transmission after the CWS adjustment time according to scheduling to the terminal which is possible to feedback HARQ-ACK until its CWS adjustment time on the minimum HARQ-ACK feedback. Therefore, in the case of HARQ-ACK of these terminals, when performing CWS adjustment, even if available ACK/NACK is not transmitted, it is processed as NACK and reflected in the CWS adjustment by reflecting on the NACK rate, etc., and if there is an available ACK/NACK, the CWS is adjusted by reflecting it.

Conversely, in the case of HARQ-ACK of terminals in which HARQ-ACK feedback is initially impossible until the CWS adjustment time of the base station based on the minimum HARQ-ACK feedback timing, when performing CWS adjustment, even if ACK/NACK is not available, it is not processed as NACK and is ignored and is not reflected in CWS adjustment. Here, ignoring ACK/NACK may mean calculating with only other available ACK/NACKs excluding the corresponding ACK/NACK in the calculation, etc. of the NACK ratio for CWS adjustment.

Figure 30:
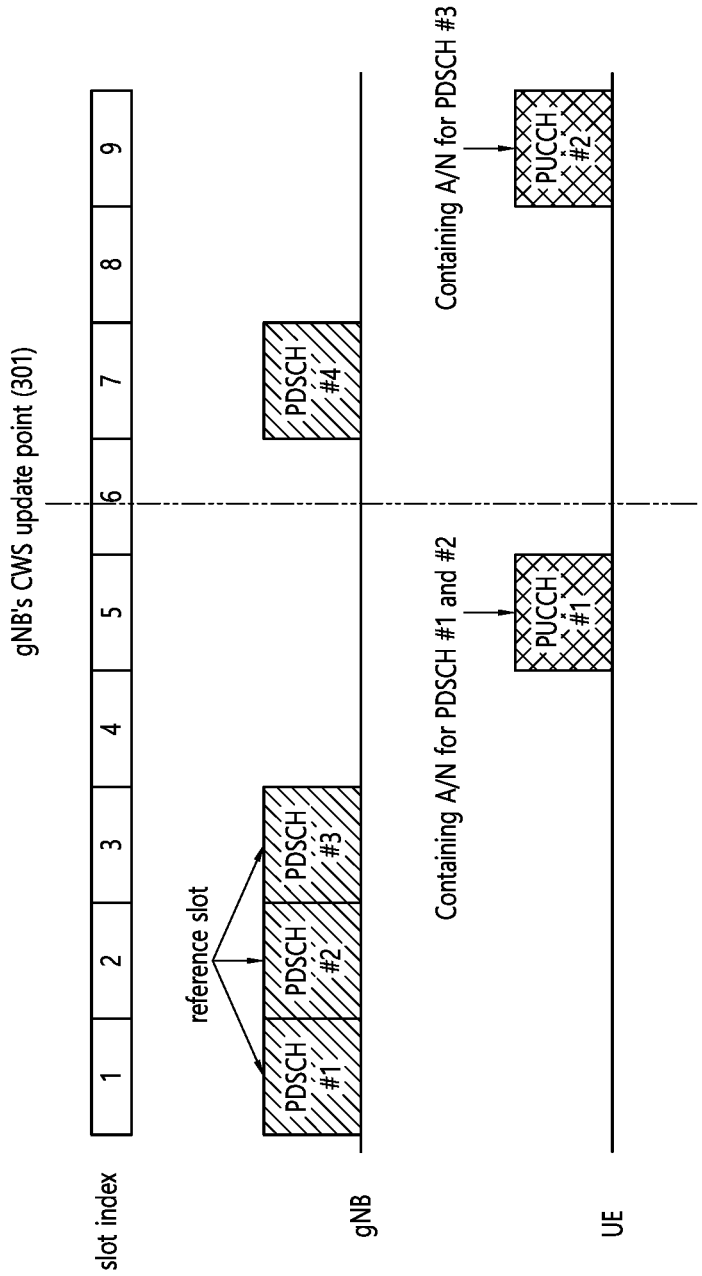
FIG. 30 illustrates PDSCH transmission by the base station and ACK/NACK transmission times by the terminal.

FIG. 30 illustrates PDSCH transmission by the base station and ACK/NACK transmission times by the terminal.

Referring to FIG. 30, slot #n may mean PDSCH #1, #2, #3 transmitted in a slot with slot index 1, 2, or 3, the PDSCH #1, #2, #3 are shown as one PDSCH for convenience, but may be a plurality of PDSCHs scheduled to a plurality of terminals on a frequency axis.

For convenience, it will be described from the standpoint of a single terminal. Suppose that the terminal is a terminal capable of transmitting PUCCH 2 slots after PDSCH reception due to processing time capability (or minimum HARQ-ACK feedback timing). In this case, all PDSCHs transmitted two slots before at the CWS adjustment time 301 of the base station indicated at the FIG. 30 are configured as a reference slot, as a result, HARQ-ACKs corresponding to PDSCH #1, #2, #3 are reflected in CWS adjustment.

If the base station instructs to transmit HARQ-ACK for PDSCH #1 and PDSCH #2 through PUCCH #1, and HARQ-ACK for PDSCH #3 to transmit through PUCCH #2, at the time of CWS adjustment, ACK/NACK for PDSCH #1 and #2 is available, but HARQ-ACK for PDSCH #3 is not available. In this case, the base station considers the ACK/NACK result for PDSCH #3 as NACK and reflects it in the NACK rate, depending on the calculation result based on this, the CWS can be reset to a one level higher value or a minimum value.

Suppose a terminal capable of PUCCH transmission five slots after PDSCH reception due to processing time capability (or minimum HARQ-ACK feedback timing). In the case of such a terminal, since the terminal is originally unable to transmit PUCCH at the time of CWS control of the base station in the above example, the HARQ-ACK corresponding to PDSCH #1, #2, #3 can be ignored and CWS can be adjusted based on the ACK/NACK of the DL burst transmitted earlier than PDSCH #1.

In the example of FIG. 30, a gap occurs between the PUCCH (PUCCH #1) transmitted in the slot index 5 and the CWS adjustment time point in the slot index 6. If the base station adjusts the CWS before the next PDSCH (PDSCH #4) transmission, after receiving and decoding the HARQ-ACK feedback of the terminal, in consideration of the base station's processing time until adjustment and determining whether to increase CWS by calculating the NACK rate, etc., the HARQ-ACK feedback of the terminal may require a spare time of X symbols (e.g., 3 symbols) from the first symbol or the last symbol of the PUCCH to the CWS adjustment time point of the base station.

Since examples of the above-described proposed method may also be included as one of the implementation methods of the present disclosure, it is clear that they may be regarded as a kind of proposed method. In addition, the above-described proposed schemes may be implemented independently, but may be implemented in the form of a combination (or merge) of some of the proposed schemes. The rules for information on whether to apply the proposed methods (or information on the rules of the proposed methods) may be defined to inform the base station to the terminal or the transmitting terminal to the receiving terminal through a predefined signal (e.g., a physical layer signal or a higher layer signal).

Figure 31:
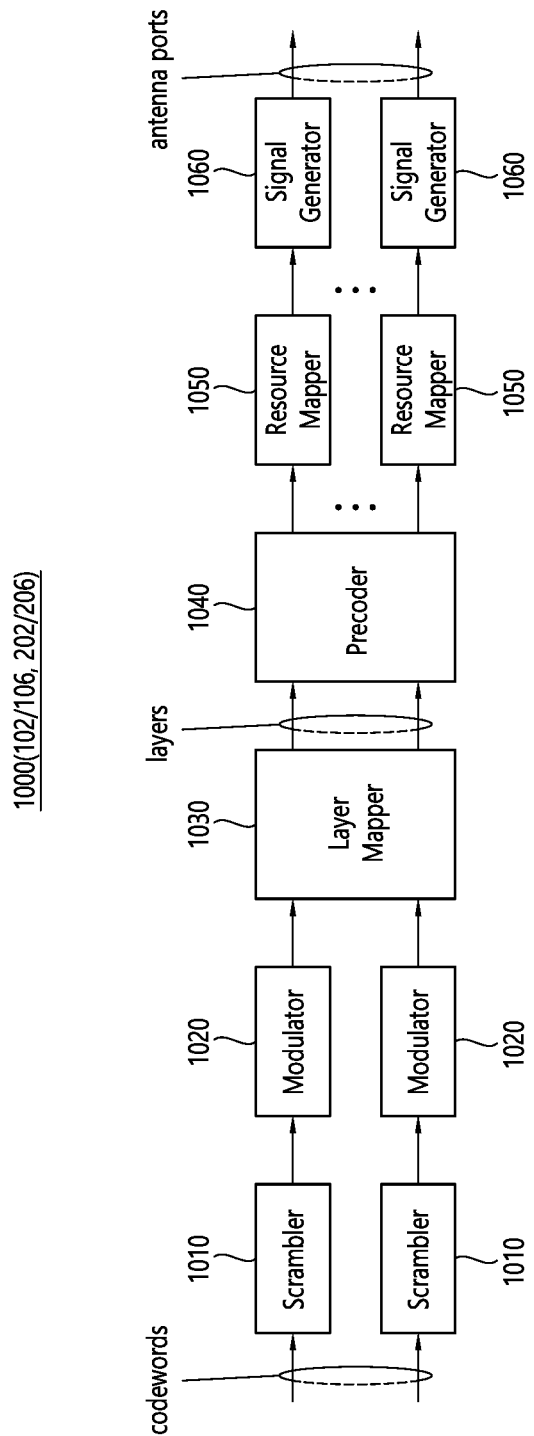
FIG. 31 exemplifies a signal processing circuit for a transmission signal.

FIG. 31 exemplifies a signal processing circuit for a transmission signal.

Referring to FIG. 31, a signal processing circuit 1000 includes a scrambler 1010, a modulator 1020, a layer mapper 1030, a precoder 1040, a resource mapper 1050, and a signal generator 1060. The operations/functions of FIG. 31 may be performed in the processors 102 and 202 and/or the transceivers 106 and 206 of FIG. 26 but are not limited thereto. The hardware elements of FIG. 31 may be implemented in the processors 102 and 202 and/or the transceivers 106 and 206 of FIG. 26. For example, blocks 1010 to 1060 may be implemented in the processors 102 and 202 of FIG. 26. In addition, blocks 1010 to 1050 may be implemented in the processors 102 and 202 of FIG. 26, and block 1060 may be implemented in the transceivers 106 and 206 of FIG. 26.

A codeword may be converted into a wireless signal through the signal processing circuit 1000 of FIG. 31. Here, the codeword is an encoded bit sequence of an information block. The information block may include a transport block (e.g., a UL-SCH transport block or a DL-SCH transport block). The wireless signal may be transmitted through various physical channels (e.g., PUSCH or PDSCH).

Specifically, the codeword may be converted into a scrambled bit sequence by the scrambler 1010. The scramble sequence used for scrambling is generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. The modulation symbols of each transport layer may be mapped to the corresponding antenna port(s) by the precoder 1040 (precoding). An output z of the precoder 1040 may be obtained by multiplying an output y of the layer mapper 1030 by an N*M precoding matrix W. Here, N is the number of antenna ports and M is the number of transmission layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols or DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an inverse fast Fourier transform (IFFT) module, a cyclic prefix (CP) inserter, a digital-to-analog converter (DAC), a frequency uplink converter, and the like.

A signal processing process for a received signal in the wireless device may be configured as the reverse of the signal processing process (1010 to 1060) of FIG. 31. For example, a wireless device (e.g., 100 or 200 in FIG. 26) may receive a wireless signal from the outside through an antenna port/transmitter. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be restored into a codeword through a resource de-mapper process, a postcoding process, a demodulation process, and a de-scramble process. The codeword may be restored to an original information block through decoding. Accordingly, a signal processing circuit (not shown) for a received signal may include a signal restorer, a resource demapper, a postcoder, a demodulator, a descrambler, and a decoder.

Figure 32:
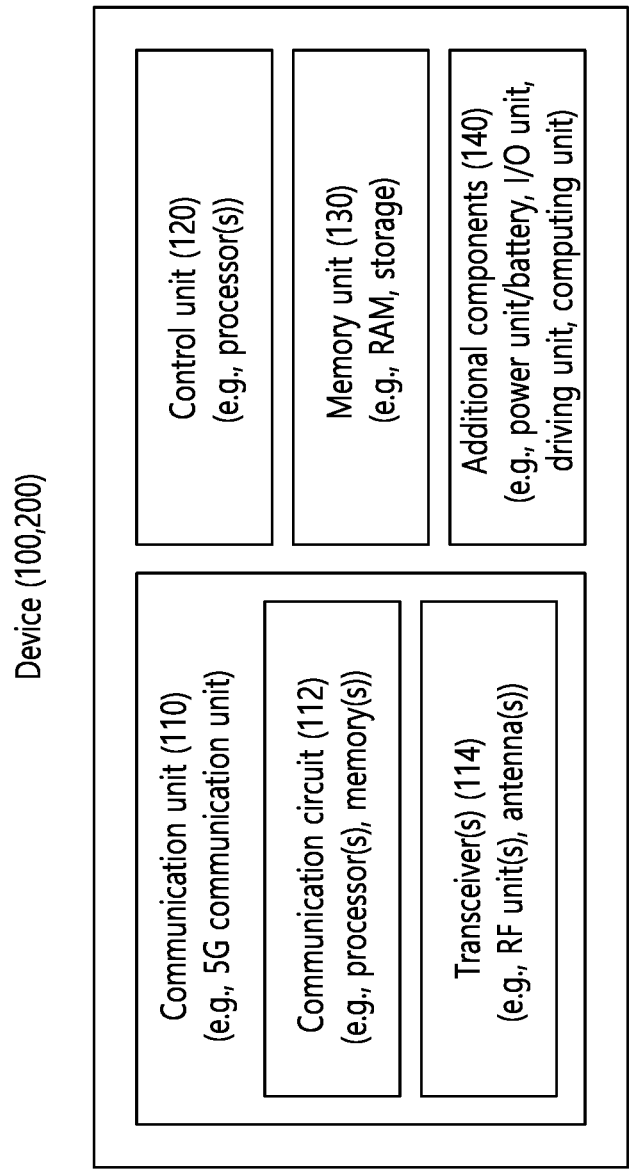
FIG. 32 shows another example of a wireless device applied to the present disclosure.

FIG. 32 shows another example of a wireless device applied to the present disclosure. The wireless device can be implemented in various forms according to use-examples/services.

Referring to FIG. 32, wireless devices (100, 200) may correspond to the wireless devices (100, 200) of FIG. 26 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 26. For example, the transceiver(s) (114) may include the one or more transceivers (106, 206) and/or the one or more antennas (108, 208) of FIG. 26. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 36), the vehicles (100b-1, 100b-2 of FIG. 36), the XR device (100c of FIG. 36), the hand-held device (100d of FIG. 36), the home appliance (100e of FIG. 36), the IoT device (100f of FIG. 36), a digital broadcast terminal, a hologram device, a public safety device, an MTC device, a medicine device, a fintech device (or a finance device), a security device, a climate/environment device, the AI server/device (400 of FIG. 36), the BSs (200 of FIG. 36), a network node, and so on. The wireless device may be used in a mobile or fixed place according to a usage-example/service.

In FIG. 32, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 32 will be described in detail with reference to the drawings.

Figure 33:
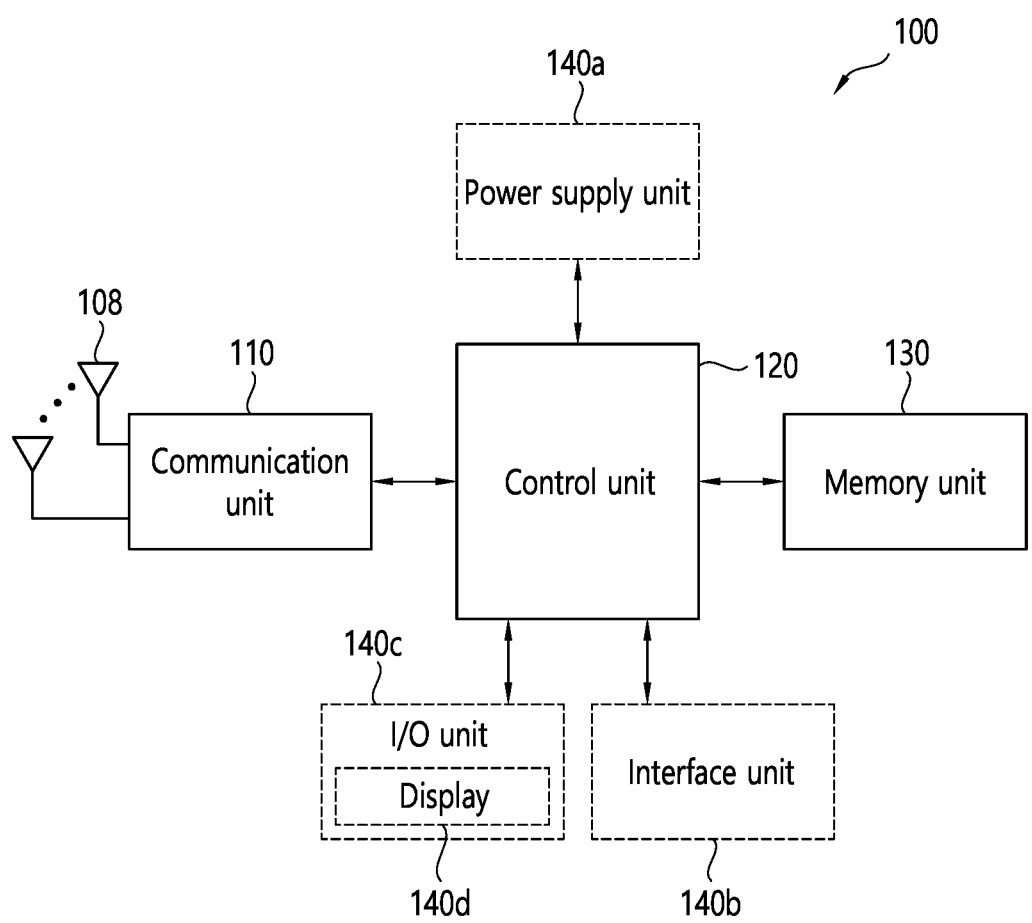
FIG. 33 illustrates a portable device applied to the present disclosure.

FIG. 33 illustrates a portable device applied to the present disclosure. The portable device may include a smartphone, a smart pad, a wearable device (e.g., smart watch or smart glasses), a portable computer (e.g., a notebook), etc. The portable device may be referred to as a mobile station (MS), a user terminal (UT), a mobile subscriber station (MSS), a subscriber station (SS), an advanced mobile station (AMS), or a wireless terminal (WT).

Referring to FIG. 33, the portable device 100 may include an antenna unit 108, a communication unit 110, a controller 120, a memory unit 130, a power supply unit 140a, an interface unit 140b, and input/output unit 140c. The antenna unit 108 may be configured as a part of the communication unit 110. Blocks 110 to 130/140a to 140c correspond to blocks 110 to 130/140 of FIG. 32, respectively.

The communication unit 110 may transmit and receive signals (e.g., data, control signals, etc.) with other wireless devices and BSs. The controller 120 may perform various operations by controlling components of the portable device 100. The controller 120 may include an application processor (AP). The memory unit 130 may store data/parameters/programs/codes/commands required for driving the portable device 100. Also, the memory unit 130 may store input/output data/information, and the like. The power supply unit 140a supplies power to the portable device 100 and may include a wired/wireless charging circuit, a battery, and the like. The interface unit 140b may support connection between the portable device 100 and other external devices. The interface unit 140b may include various ports (e.g., audio input/output ports or video input/output ports) for connection with external devices. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c acquires information/signals (e.g., touch, text, voice, image, or video) input from the user, and the acquired information/signals may be stored in the memory unit 130. The communication unit 110 may convert information/signals stored in the memory into wireless signals and may directly transmit the converted wireless signals to other wireless devices or to a BS. In addition, after receiving a wireless signal from another wireless device or a BS, the communication unit 110 may restore the received wireless signal to the original information/signal. The restored information/signal may be stored in the memory unit 130 and then output in various forms (e.g., text, voice, image, video, or haptic) through the input/output unit 140c.

The UE may perform a network access procedure to perform the procedures and/or methods described/suggested above. For example, while accessing a network (e.g., a BS), the UE may receive system information and configuration information required to perform the procedures and/or methods described/suggested above and store the same in a memory. The configuration information required for the present disclosure may be received through higher layer (e.g., RRC layer; medium access control (MAC), layer, etc.) signaling.

Figure 34:
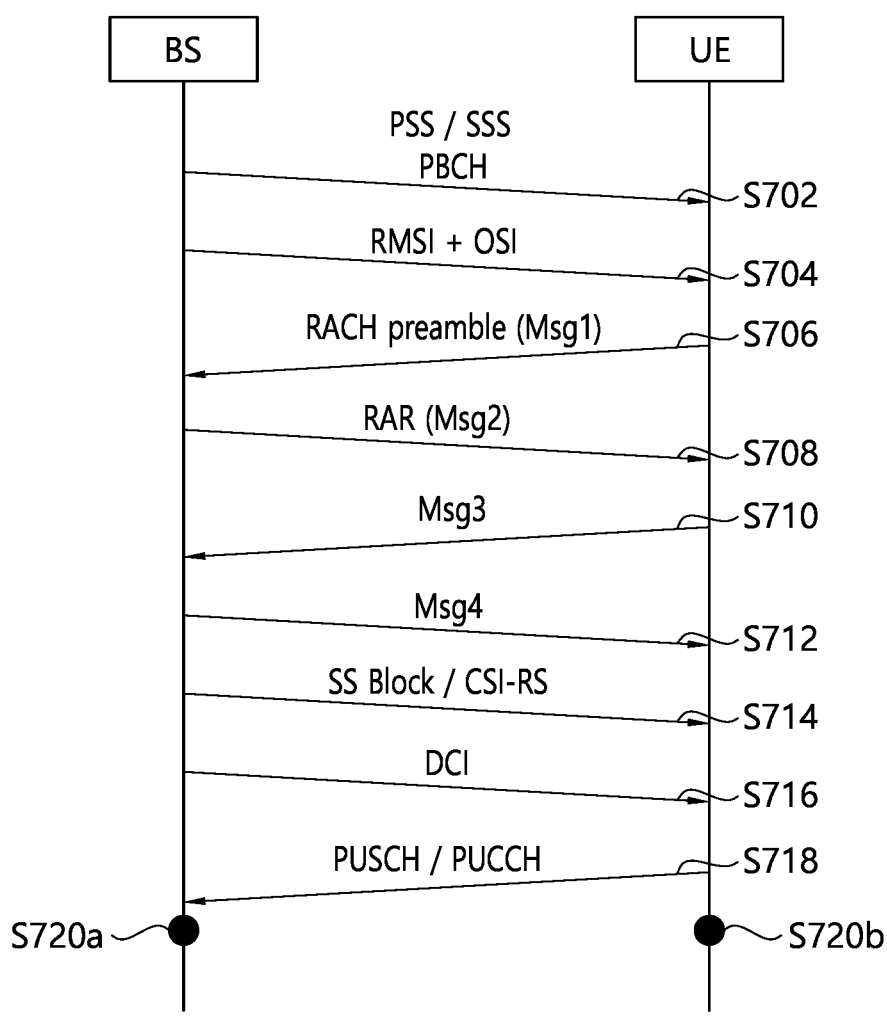
FIG. 34 illustrates an initial network connection and a subsequent communication process.

FIG. 34 illustrates an initial network connection and a subsequent communication process. In NR, a physical channel and a reference signal may be transmitted using beam-forming. Supporting beam-forming-based signal transmission may entail a beam-management process to align beams between the BS and the UE. In addition, a signal proposed in the present disclosure may be transmitted/received using beam-forming. In a radio resource control (RRC) IDLE mode, beam alignment may be performed based on SSB. Meanwhile, in an RRC CONNECTED mode, beam alignment may be performed based on CSI-RS (in DL) and SRS (in UL). Meanwhile, when beam-forming-based signal transmission is not supported, an operation related to a beam may be omitted in the following description.

Referring to FIG. 34, a BS may periodically transmit an SSB (S702). Here, the SSB includes a PSS/SSS/PBCH. The SSB may be transmitted using beam sweeping. Thereafter, the BS may transmit remaining minimum system information (RMSI) and other system information (OSI) (S704). The RMSI may include information (e.g., PRACH configuration information) necessary for the UE to initially access the BS. Meanwhile, after performing SSB detection, the UE identifies the best SSB. Thereafter, the UE may transmit the RACH preamble (Message 1, Msg1) to the BS using the PRACH resource linked/corresponding to an index (i.e., the beam) of the best SSB (S706). A beam direction of the RACH preamble is associated with the PRACH resource. The association between the PRACH resource (and/or the RACH preamble) and the SSB (index) may be set through system information (e.g., RMSI). Thereafter, as part of the RACH process, the BS may transmit a random access response (RAR) (Msg2) in response to the RACH preamble (S708), and the UE may transmit Msg3 (e.g., RRC connection request) using a UL grant in the RAR (S710), and the BS may transmit a contention resolution message Msg4 (S720). Msg4 may include RRC connection setup.

When an RRC connection is established between the BS and the UE through the RACH process, subsequent beam alignment may be performed based on SSB/CSI-RS (in DL) and SRS (in UL). For example, the UE may receive an SSB/CSI-RS (S714). The SSB/CSI-RS may be used for the UE to generate a beam/CSI report. Meanwhile, the BS may request a beam/CSI report from the UE through DCI (S716). In this case, the UE may generate a beam/CSI report based on the SSB/CSI-RS and transmit the generated beam/CSI report to the BS through a PUSCH/PUCCH (S718). The beam/CSI report may include a beam measurement result, information on a preferred beam, and the like. The BS and the UE may switch the beam based on the beam/CSI report (S720a, S720b).

Thereafter, the UE and the BS may perform the procedures and/or methods described/proposed above. For example, the UE and the BS may process the information in the memory according to the proposal of the present disclosure based on the configuration information obtained in the network access process (e.g., system information acquisition process, RRC connection process through RACH, etc.) and transmit a wireless signal, or may process a received wireless signal and store the processed signal in the memory. Here, the wireless signal may include at least one of a PDCCH, a PDSCH, and a reference signal (RS) in the case of downlink, and may include at least one of a PUCCH, a PUSCH, and an SRS in the case of uplink.

The UE may perform the DRX operation while performing the procedures and/or methods described/proposed above. The DRX configured UE may reduce power consumption by discontinuously receiving the DL signal. DRX may be performed in RRC (Radio Resource Control)_IDLE state, RRC_INACTIVE state, and RRC_CONNECTED state. In RRC_IDLE state and RRC_INACTIVE state, DRX is used to receive paging signal discontinuously. Hereinafter, DRX performed in the RRC_CONNECTED state will be described (RRC_CONNECTED DRX).

Figure 35:
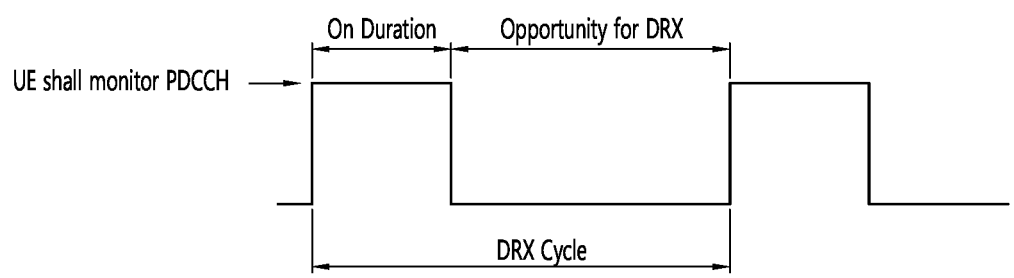
FIG. 35 illustrates a DRX cycle.

FIG. 35 illustrates a DRX cycle.

Referring to FIG. 35, a DRX cycle includes "On Duration" and "Opportunity for DRX". The DRX cycle defines a time interval in which "On Duration" is periodically repeated. "On Duration" represents a time period that the UE monitors to receive the PDCCH. When DRX is configured, the UE performs PDCCH monitoring during "On Duration". If there is a PDCCH successfully detected during PDCCH monitoring, the UE operates an inactivity timer and maintains an awake state. Meanwhile, if there is no PDCCH successfully detected during PDCCH monitoring, the UE enters a sleep state after the "On Duration" is over. Accordingly, when DRX is configured, PDCCH monitoring/reception may be discontinuously performed in the time domain in performing the procedures and/or methods described/suggested above. For example, when DRX is configured, in the present disclosure, a PDCCH reception opportunity (e.g., a slot having a PDCCH search space) may be set discontinuously according to the DRX configuration. Meanwhile, when DRX is not configured, PDCCH monitoring/reception may be continuously performed in the time domain in performing the procedure and/or method described/proposed above. For example, when DRX is not configured, a PDCCH reception opportunity (e.g., a slot having a PDCCH search space) may be continuously set in the present disclosure. Meanwhile, regardless of DRX configuration, PDCCH monitoring may be restricted in a time period set as a measurement gap.

Table 5 shows a UE procedure related to the DRX (RRC_CONNECTED state). Referring to Table 10, DRX configuration information is received through higher layer (e.g., RRC) signaling, and DRX ON/OFF is controlled by a DRX command of the MAC layer. When DRX is configured, the UE may discontinuously perform PDCCH monitoring in performing the procedure and/or method described/proposed in the present disclosure.

TABLE 5

|  | Type of signals | UE procedure |
|---|---|---|
| 1st step | RRC signalling (MAC-CellGroupConfig) | Reception of DRX configuration information |
| 2nd Step | MAC CE ((Long) DRX command MAC CE) | Reception of DRX command |
| 3rd Step | — | Monitor a PDCCH during an 'on-duration' of a DRX cycle |

MAC-CellGroupConfig may include configuration information required to set a medium access control (MAC) parameter for a cell group. MAC-CellGroupConfig may also include configuration information on DRX. For example, MAC-CellGroupConfig may include information as follows in defining DRX.

Value of drx-OnDurationTimer: It defines a length of a start interval of a DRX cycle.

Value of drx-InactivityTimer: It defines a length of a time interval in which the UE is awake after a PDCCH opportunity in which the PDCCH indicating initial UL or DL data is detected Value of drx-HARQ-RTT-TimerDL: It defines a length of a maximum time interval until DL retransmission is received, after initial DL transmission is received.

Value of drx-HARQ-RTT-TimerDL: It defines a length of a maximum time interval until a grant for UL retransmission is received, after a grant for UL initial transmission is received.

drx-LongCycleStartOffset: It defines a time length and a start point of a DRX cycle drx-ShortCycle (optional): It defines a time length of a short DRX cycle Here, if any one of drx-OnDurationTimer, drx-InactivityTimer, drx-HARQ-RTT-TimerDL, drx-HARQ-RTT-TimerDL is in operation, the UE performs PDCCH monitoring at every PDCCH opportunity while maintaining an awake state.

Figure 36:
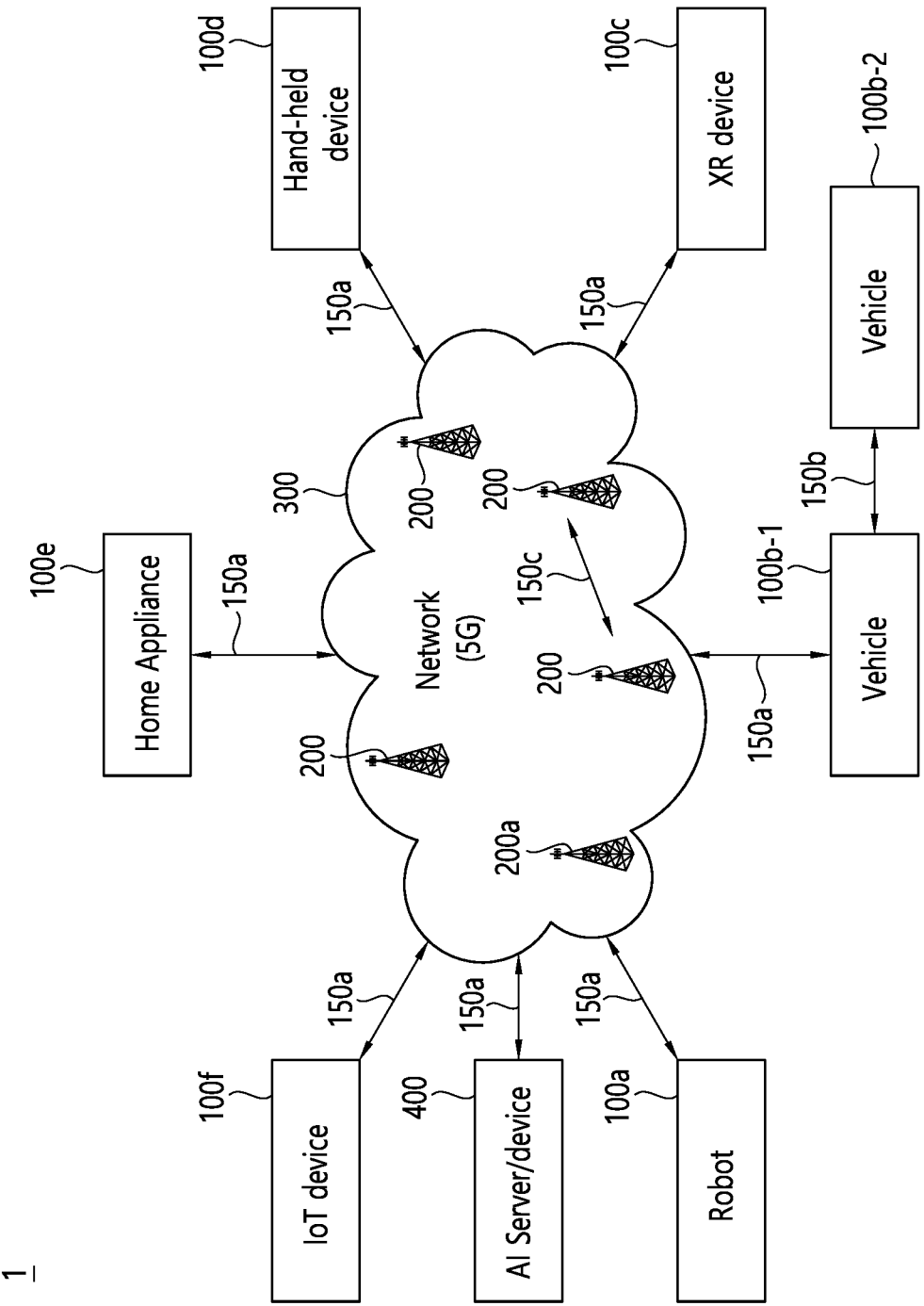
FIG. 36 illustrates a communication system 1 applied to the present disclosure.

FIG. 36 illustrates a communication system 1 applied to the present disclosure.

Referring to FIG. 36, a communication system 1 applied to the present disclosure includes a wireless device, a base station (BS), and a network. Here, the wireless device refers to a device that performs communication using a wireless access technology (e.g., 5G new RAT (NR), long term evolution (LTE)), and may be referred to as a communication/wireless/5G device. Wireless devices may include a robot 100a, vehicles 100b-1 and 100b-2, an eXtended reality (XR) device 100c, a hand-held device 100d, a home appliance 100e, an Internet of things (IoT) device 100f, and an AI device/server 400, but is not limited thereto. For example, the vehicle may include a vehicle equipped with a wireless communication function, an autonomous vehicle, a vehicle capable of performing inter-vehicle communication, and the like. Here, the vehicle may include an unmanned aerial vehicle (UAV) (e.g., a drone). The XR device includes augmented a reality (AR)/virtual reality (VR)/mixed reality (MR) device and may be implemented in the form of a head-mounted device (HMD), a head-up display (HUD) provided in a vehicle, a TV, a smartphone, a computer, a wearable device, a home appliance, a digital signage, a vehicle, a robot, and the like. The portable device may include a smartphone, a smart pad, a wearable device (e.g., smart watch or smart glasses), a computer (e.g., notebook computers, etc.), and the like. The home appliance may include a TV, a refrigerator, and a washing machine. The IoT device may include a sensor, a smart meter, and the like. For example, the BS and the network may be implemented as a wireless device, and a specific wireless device 200a may operate as a BS/network node for other wireless devices.

The wireless devices 100a to 100f may be connected to a network 300 through a BS 200. An artificial intelligence (AI) technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (e.g., NR) network. The wireless devices 100a to 100f may communicate with each other through the BS 200/network 300 or may communicate directly (e.g., sidelink communication) without the BS/network. For example, the vehicles 100b-1 and 100b-2 may perform direct communication (e.g. vehicle to vehicle (V2V)/vehicle to everything (V2X) communication). In addition, the IoT device (e.g., sensor) may directly communicate with other IoT devices (e.g., sensors) or other wireless devices 100a to 100f.

Wireless communication/connections 150a, 150b, and 150c may be established between the wireless devices 100a to 100f and BS 200 and between the BS 200 and the BS 200. Here, wireless communication/connection may be established through various wireless access technologies (e.g., 5G NR) such as uplink/downlink communication 150a, sidelink communication 150b (or D2D communication), and communication 150c between BSs (e.g., relay, integrated access backhaul). Through wireless communication/connections 150a, 150b, and 150c, the wireless devices and the BS/wireless device and the BS and the BS may transmit/receive wireless signals to each other. For example, the wireless communication/connections 150a, 150b, and 150c may transmit/receive signals through various physical channels. To this end, at least some of a process of setting various configuration information for transmission/reception of wireless signals, various signal processing processes (e.g., channel encoding/decoding, modulation/demodulation, resource mapping/demapping, etc.), and a resource allocation process may be performed based on various proposals of the present disclosure.

Figure 37:
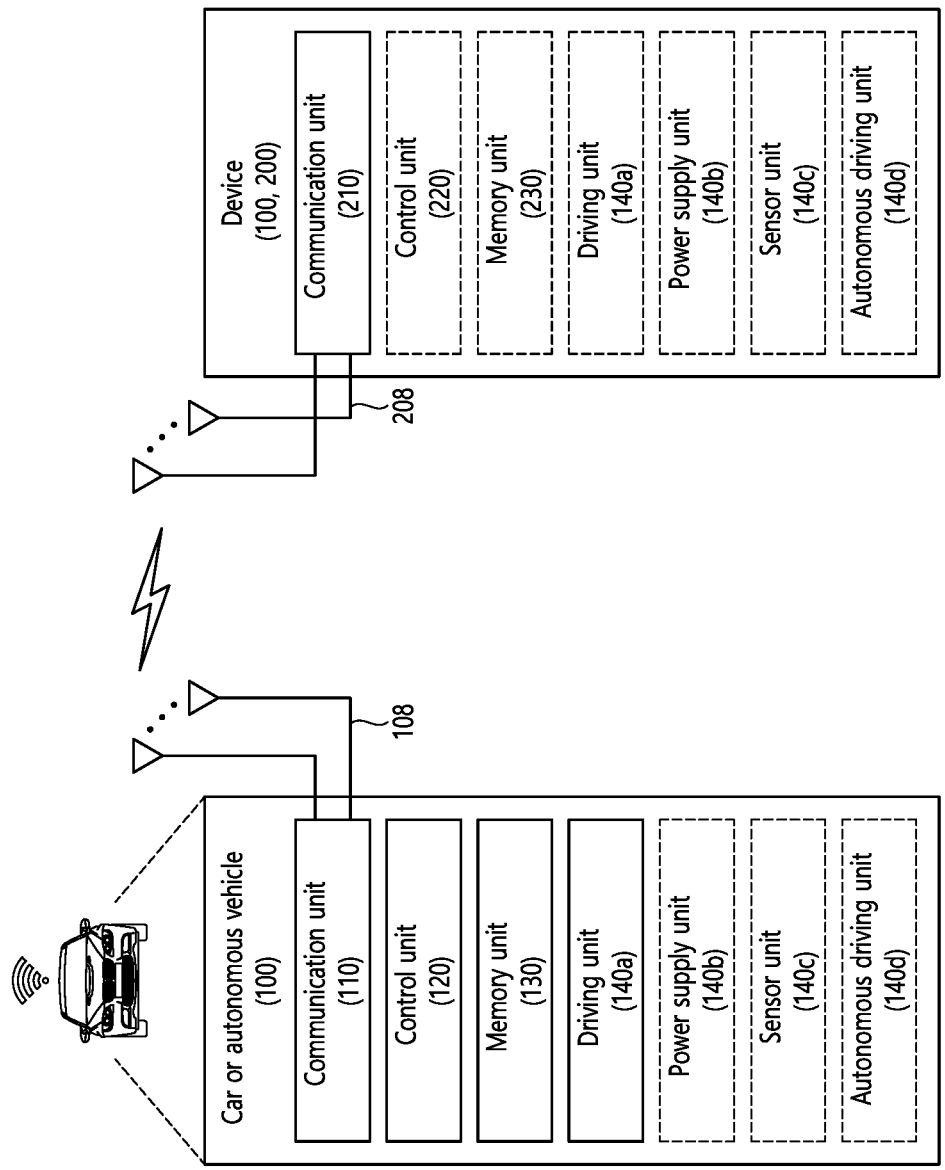
FIG. 37 illustrates a vehicle or an autonomous vehicle applied to the present disclosure.

FIG. 37 illustrates a vehicle or an autonomous vehicle applied to the present disclosure.

A vehicle or an autonomous vehicle may be implemented as a moving robot, a vehicle, a train, an aerial vehicle (AV), a ship, or the like.

Referring to FIG. 37, a vehicle or autonomous vehicle 100 includes an antenna unit 108, a communication unit 110, a control unit 120, a driving unit 140a, a power supply unit 140b, and a sensor unit 140c, and an autonomous driving unit 140d. The antenna unit 108 may be configured as a portion of the communication unit 110. Blocks 110/130/140a to 140d correspond to blocks 110/130/140 of FIG. 32, respectively.

The communication unit 110 may transmit and receive signals (e.g., data, control signals, etc.) with external devices such as other vehicles, base stations (BSs) (e.g. base station, roadside unit, etc.), and servers. The control unit 120 may perform various operations by controlling elements of the vehicle or the autonomous vehicle 100. The control unit 120 may include an electronic control unit (ECU). The driving unit 140a may cause the vehicle or the autonomous vehicle 100 to travel on the ground. The driving unit 140a may include an engine, a motor, a power train, a wheel, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c may include an inertial measurement unit (IMU) sensor, a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, a pedal position sensor, etc. The autonomous driving unit 140d may implement a technology of maintaining a driving lane, a technology of automatically adjusting a speed such as adaptive cruise control, a technology of automatically traveling along a predetermined route, and a technology of automatically setting a route and traveling when a destination is set.

For example, the communication unit 110 may receive map data, traffic information data, and the like from an external server. The autonomous driving unit 140d may generate an autonomous driving route and a driving plan based on the acquired data. The control unit 120 may control the driving unit 140a so that the vehicle or the autonomous vehicle 100 moves along the autonomous driving route according to the driving plan (e.g., speed/direction adjustment). During autonomous driving, the communication unit 110 may asynchronously/periodically acquire the latest traffic information data from an external server and may acquire surrounding traffic information data from surrounding vehicles. In addition, during autonomous driving, the sensor unit 140c may acquire vehicle state and surrounding environment information. The autonomous driving unit 140d may update the autonomous driving route and the driving plan based on newly acquired data/information. The communication unit 110 may transmit information on a vehicle location, an autonomous driving route, a driving plan, and the like to the external server. The external server may predict traffic information data in advance using AI technology or the like based on information collected from the vehicle or autonomous vehicles and may provide the predicted traffic information data to the vehicle or autonomous vehicles.

Figure 38:
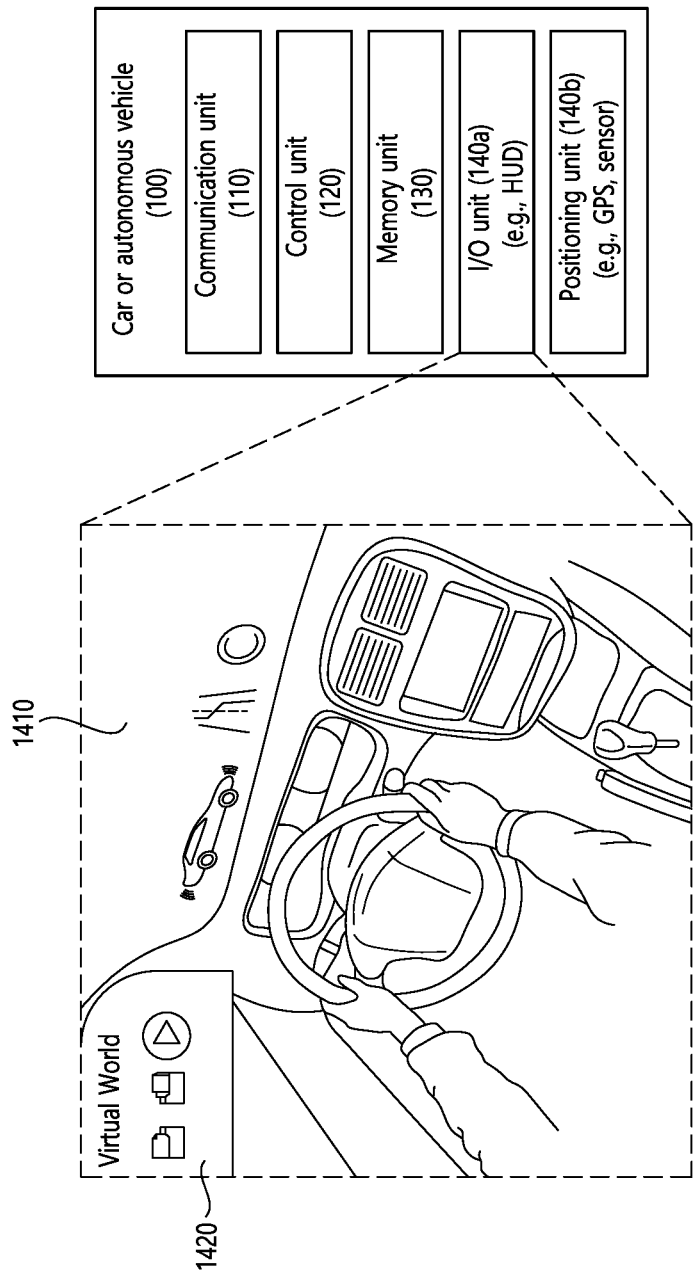
FIG. 38 illustrates a vehicle applied to the present disclosure.

FIG. 38 illustrates a vehicle applied to the present disclosure.

Vehicles may also be implemented as means of transportation, trains, aircraft, and ships.

Referring to FIG. 38, the vehicle 100 may include a communication unit 110, a control unit 120, a memory unit 130, an input/output unit 140a, and a position measurement unit 140b. Blocks 110 to 130/140a to 140d correspond to blocks 110 to 130/140 of FIG. 32, respectively.

The communication unit 110 may transmit and receive signals (e.g., data, control signals, etc.) with other vehicles or external devices such as a BS. The control unit 120 may perform various operations by controlling components of the vehicle 100. The memory unit 130 may store data/parameters/programs/codes/commands supporting various functions of the vehicle 100. The input/output unit 140a may output an AR/VR object based on information in the memory unit 130. The input/output unit 140a may include a HUD. The location measurement unit 140b may acquire location information of the vehicle 100. The location information may include absolute location information of the vehicle 100, location information within a driving line, acceleration information, location information with surrounding vehicles, and the like. The location measurement unit 140b may include a GPS and various sensors.

For example, the communication unit 110 of the vehicle 100 may receive map information, traffic information, etc., from an external server and store the information in the memory unit 130. The location measurement unit 140b may acquire vehicle location information through GPS and various sensors and store the vehicle location information in the memory unit 130. The control unit 120 may generate a virtual object based the on map information, the traffic information, the vehicle location information, and the like, and the input/output unit 140a may display the generated virtual object on a window of the vehicle (1410, 1420). In addition, the control unit 120 may determine whether the vehicle 100 is operating normally within a driving line based on vehicle location information. When the vehicle 100 deviates from the driving line abnormally, the control unit 120 may display a warning on a windshield of the vehicle through the input/output unit 140a. In addition, the control unit 120 may broadcast a warning message regarding a driving abnormality to nearby vehicles through the communication unit 110. Depending on a situation, the control unit 120 may transmit location information of the vehicle and information on driving/vehicle abnormalities to related organizations through the communication unit 110.

Figure 39:
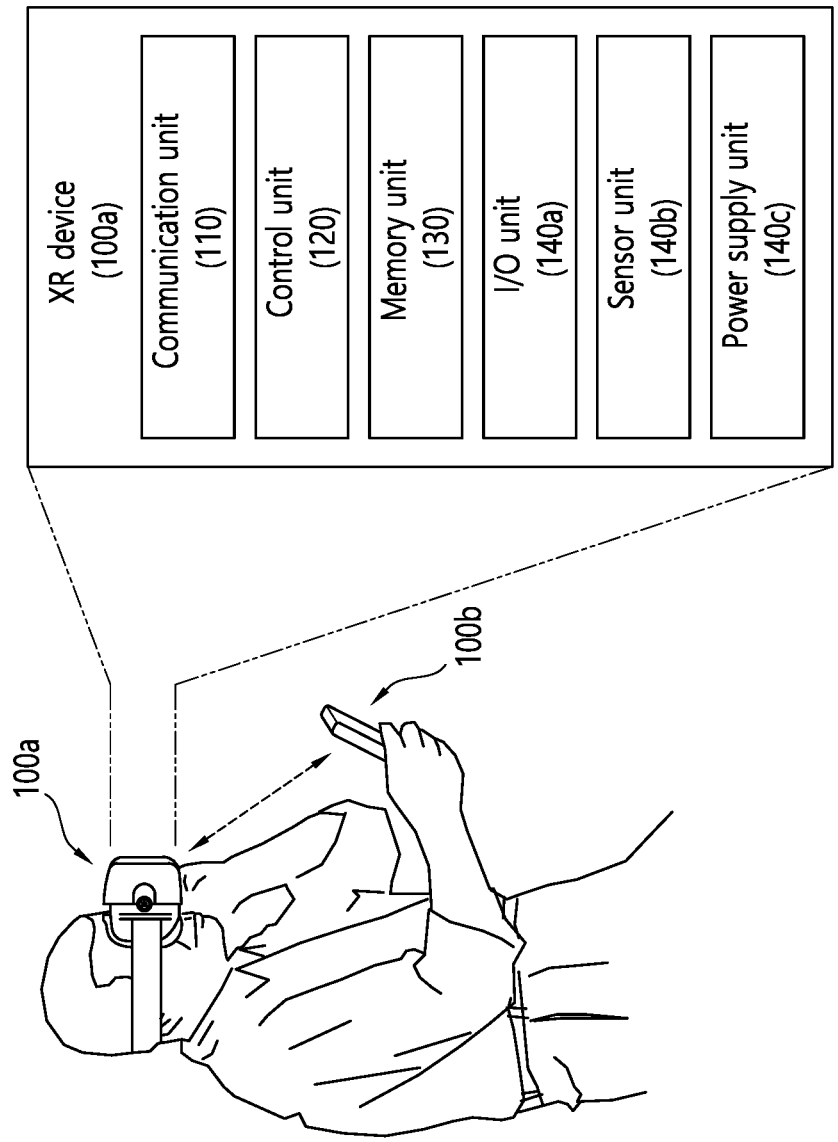
FIG. 39 illustrates an XR device applied to the present disclosure.

FIG. 39 illustrates an XR device applied to the present disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 39, the XR device 100a may include a communication unit 110, a control unit 120, a memory unit 130, an input/output unit 140a, a sensor unit 140b, and a power supply unit 140c. Here, blocks 110 to 130/140a to 140c correspond to blocks 110 to 130/140 of FIG. 32, respectively.

The communication unit 110 may transmit and receive signals (e.g., media data, control signals, etc.) with external devices such as other wireless devices, portable devices, media servers. Media data may include images, sounds, and the like. The control unit 120 may perform various operations by controlling components of the XR device 100a. For example, the control unit 120 may be configured to control and/or perform procedures such as video/image acquisition, (video/image) encoding, and metadata generating and processing. The memory unit 130 may store data/parameters/programs/codes/commands required for driving the XR device 100a/generating an XR object. The input/output unit 140a may obtain control information, data, etc. from the outside and may output the generated XR object. The input/output unit 140a may include a camera, a microphone, a user input unit, a display unit, a speaker, and/or a haptic module. The sensor unit 140b may obtain XR device status, surrounding environment information, user information, and the like. The sensor unit 140b may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140c may supply power to the XR device 100*a* and may include a wired/wireless charging circuit, a battery, and the like.

As an example, the memory unit 130 of the XR device 100*a* may include information (e.g., data, etc.) necessary for generating an XR object (e.g., AR/VR/MR object). The input/output unit 140*a* may acquire a command to manipulate the XR device 100*a* from a user, and the control unit 120 may drive the XR device 100*a* according to the user's driving command. For example, when the user tries to watch a movie, news, etc., through the XR device 100*a*, the control unit 120 may transmit content request information through the communication unit 130 to another device (for example, the portable device 100*b*) or to a media server. The communication unit 130 may download/stream content such as movies and news from another device (e.g., the portable device 100*b*) or the media server to the memory unit 130. The control unit 120 may control and/or perform procedures such as video/image acquisition, (video/image) encoding, and metadata generating/processing for the content, and generate/output an XR object based on information on a surrounding space or a real object through the input/output unit 140*a*/sensor unit 140*b*.

In addition, the XR device 100*a* may be wirelessly connected to the portable device 100*b* through the communication unit 110, and an operation of the XR device 100*a* may be controlled by the portable device 100*b*. For example, the portable device 100*b* may operate as a controller for the XR device 100*a*. To this end, the XR device 100*a* may acquire 3D location information of the portable device 100*b*, generate an XR entity corresponding to the portable device 100*b*, and output the generated XR entity.

Figure 40:
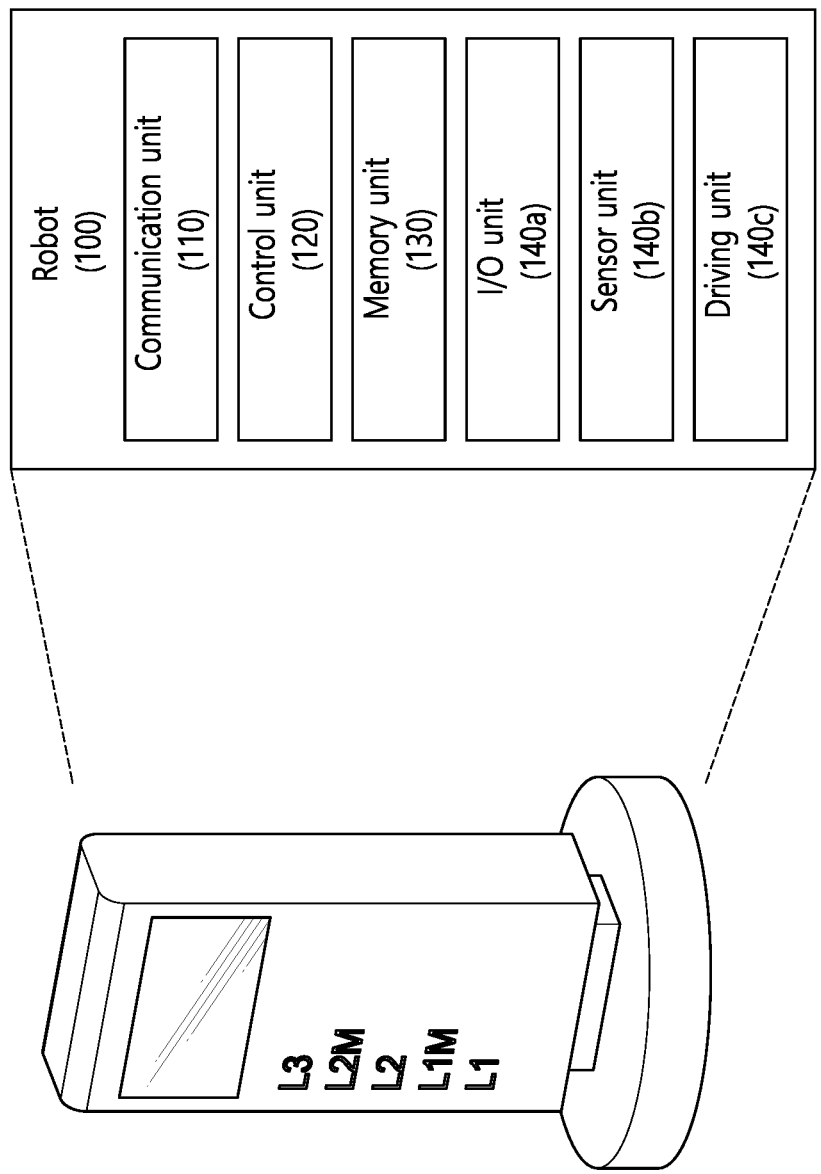
FIG. 40 illustrates a robot applied to the present disclosure.

FIG. 40 illustrates a robot applied to the present disclosure.

Robots may be classified as industrial, medical, household, military, etc. depending on the purpose or field of use.

Referring to FIG. 40, a robot 100 may include a communication unit 110, a control unit 120, a memory unit 130, an input/output unit 140*a*, a sensor unit 140*b*, and a driving unit 140*c*. Blocks 110 to 130/140*a* to 140*d* correspond to blocks 110 to 130/140 of FIG. 32, respectively.

The communication unit 110 may transmit and receive signals (e.g., driving information, control signals, etc.) with other wireless devices, other robots, or external devices such as a control server. The control unit 120 may perform various operations by controlling components of the robot 100. The memory unit 130 may store data/parameters/programs/codes/commands supporting various functions of the robot 100. The input/output unit 140*a* may acquire information from the outside of the robot 100 and may output the information to the outside of the robot 100. The input/output unit 140*a* may include a camera, a microphone, a user input unit, a display unit, a speaker, and/or a haptic module. The sensor unit 140*b* may obtain internal information, surrounding environment information, user information, and the like of the robot 100. The sensor unit 140*b* may include a proximity sensor, an illuminance sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140*c* may perform various physical operations such as moving a robot joint. In addition, the driving unit 140*c* may cause the robot 100 to travel on the ground or fly in the air. The driving unit 140*c* may include an actuator, a motor, a wheel, a brake, a propeller, and the like.

Figure 41:
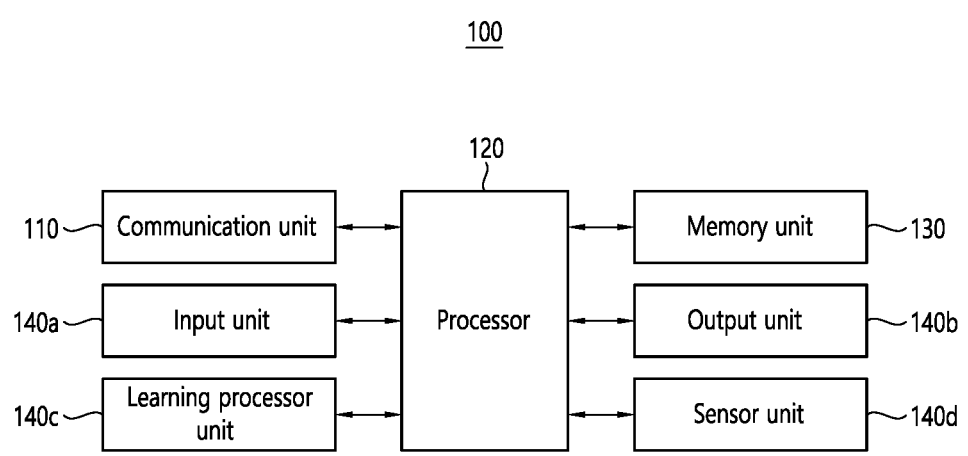
FIG. 41 illustrates an AI device applied to the present disclosure.

FIG. 41 illustrates an AI device applied to the present disclosure. AI devices may be implemented as fixed devices or moving devices such as TVs, projectors, smartphones, PCs, notebooks, digital broadcasting UEs, tablet PCs, wearable devices, set-top boxes (STBs), radios, washing machines, refrigerators, digital signage, robots, vehicles, etc.

Referring to FIG. 41, the AI device 100 may include a communication unit 110, a control unit 120, a memory unit 130, an input/output unit 140*a*/140*b*, a learning processor unit 140*c*, and a sensor unit. Blocks 110 to 130/140*a* to 140*d* correspond to blocks 110 to 130/140 of FIG. 32, respectively.

The communication unit 110 may transmit and receive wireless signals (e.g., sensor information, user input, learning model, control signals, etc.) with external devices such as another AI device (e.g., FIG. 36, 100*x*, 200, or 400) or an AI server (e.g., 400 in FIG. 36) using wired/wireless communication technology. To this end, the communication unit 110 may transmit information in the memory unit 130 to an external device or may transfer a signal received from the external device to the memory unit 130.

The control unit 120 may determine at least one executable operation of the AI device 100 based on information determined or generated using a data analysis algorithm or a machine learning algorithm. In addition, the control unit 120 may perform a determined operation by controlling the components of the AI device 100. For example, the control unit 120 may request, search, receive, or utilize data from the learning processor unit 140*c* or the memory unit 130, and may control components of the AI device 100 to execute a predicted operation among at least one an executable operation or an operation determined to be desirable. In addition, the control unit 120 may collect history information including operation content of the AI device 100 or the user's feedback on the operation, and store the collected information in the memory unit 130 or the learning processor unit 140*c* or transmit the information to an external device such as an AI server (400 of FIG. 36). The collected historical information may be used to update a learning model.

The memory unit 130 may store data supporting various functions of the AI device 100. For example, the memory unit 130 may store data obtained from the input unit 140*a*, data obtained from the communication unit 110, output data from the learning processor unit 140*c*, and data obtained from the sensing unit 140. In addition, the memory unit 130 may store control information and/or software codes necessary for the operation/execution of the control unit 120.

The input unit 140*a* may acquire various types of data from the outside of the AI device 100. For example, the input unit 140*a* may acquire training data for model training and input data to which the training model is applied. The input unit 140*a* may include a camera, a microphone, and/or a user input unit. The output unit 140*b* may generate output related to visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information by using various sensors. The sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 140*c* may train a model configured as an artificial neural network using training data. The learning processor unit 140*c* may perform AI processing together with the learning processor unit (400 in FIG. 36) of the AI server. The learning processor unit 140*c* may process information received from an external device through the communication unit 110 and/or information stored in the memory unit 130. In addition, an output value of the learning processor unit 140c may be transmitted to an external device through the communication unit 110 and/or may be stored in the memory unit 130.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 6. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 6

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 7 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 7

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 42:
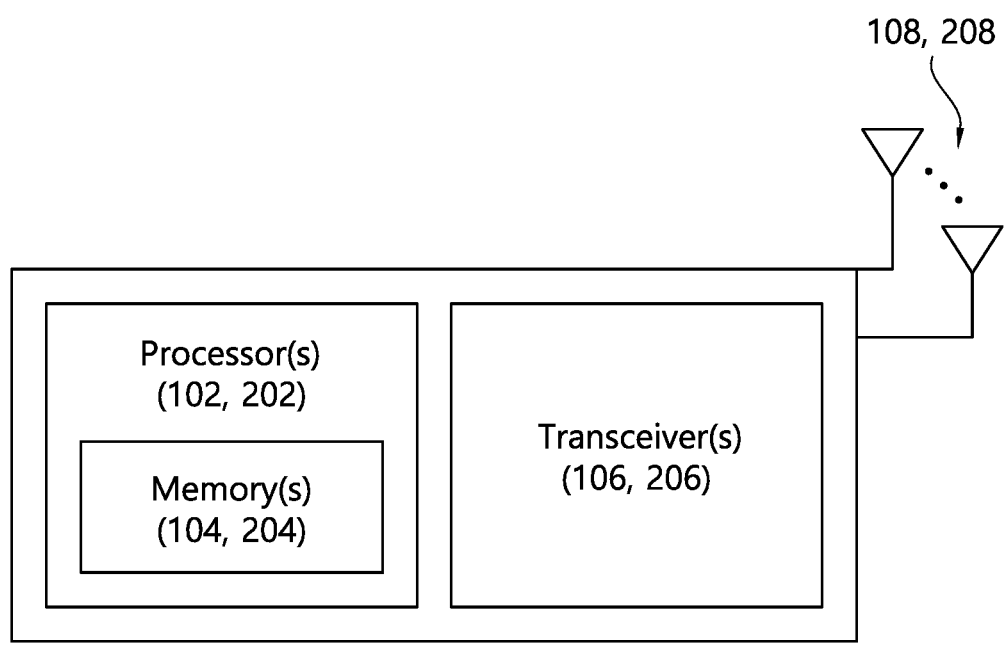
FIG. 42 shows another example of a wireless device that can be applied to the present specification.

FIG. 42 shows another example of a wireless device that can be applied to the present specification.

According to FIG. 42, the wireless device may include at least one processor 102, 202, at least one memory 104, 204, at least one transceiver 106, 206, and one or more antennas 108, 208.

A difference between the above-described exemplary wireless device of FIG. 26 and the exemplary wireless device of FIG. 42 is that the processors (102, 202) and the memories (104, 204) of FIG. 26 are separated, and that the at least one memory (104, 204) is included in the at least one processor (102, 202) in the example of FIG. 42

Here, detailed descriptions of the processors 102 and 202, the memories 104 and 204, the transceivers 106 and 206, and the one or more antennas 108 and 208 may be the same as described above.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method for performing a channel access procedure of a terminal in an unlicensed band, the method comprising:
   determining a contention window size (CWS) as a first CWS value; and
   performing a channel access procedure for a first channel based on the first CWS value,
   wherein the channel access procedure comprises:
   i) setting a value for a counter (N) as $N_{init}$, where $N_{init}$ is a random number between 0 and the determined CWS, wherein the determined CWS is based on a channel access priority class signaled to the terminal,
   ii) sensing a channel for an additional sensing slot duration,
   iii) based on the additional sensing slot duration being idle, N being larger than 0, and the terminal choosing to decrement the counter, setting N equal to N−1, and
   iv) transmitting a signal through the channel after N is zero, and
   wherein, based on a transmission history of a second channel to be reflected in the determining of the CWS being absent for a specific time duration, the CWS is changed from the first CWS value to a second CWS value which is a minimum CWS value in a specific channel access priority class (CAPC).

2. The method of claim 1, wherein the first channel is a channel on which a base station does not provide explicit feedback on whether or not the first channel is successfully received.

3. The method of claim 1, wherein the second channel is a channel on which a base station provides explicit feedback on whether or not the second channel is successfully received.

4. The method of claim 3, wherein the second channel is a physical uplink shared channel (PUSCH).

5. The method of claim 1, wherein a plurality of CWS values are included in the CAPC of the second channel.

6. The method of claim 1, wherein the minimum CWS value is a smallest CWS specified for CAPC of the second channel.

7. A terminal, comprising:
   a transceiver;
   at least one memory; and
   at least one processor being operatively connected to the at least one memory and the transceiver, wherein the processor is configured to:

determine a contention window size (CWS) as a first CWS value; and perform a channel access procedure for a first channel based on the first CWS value, wherein the channel access procedure comprises:

i) setting a value for a counter (N) as $N_{init}$, where $N_{init}$ is a random number between 0 and the determined CWS, wherein the determined CWS is based on a channel access priority class signaled to the terminal, ii) sensing a channel for an additional sensing slot duration, iii) based on the additional sensing slot duration being idle, N being larger than 0, and the terminal choosing to decrement the counter, setting N equal to N−1, and iv) transmitting a signal through the channel after N is zero, and wherein, based on a transmission history of a second channel to be reflected in the determining of the CWS being absent for a specific time duration, the CWS is changed from the first CWS value to a second CWS value which is a minimum CWS value in a specific channel access priority class (CAPC).

8. The terminal of claim 7, wherein the first channel is a channel on which a base station does not provide explicit feedback on whether or not the first channel is successfully received.

9. The terminal of claim 7, wherein the second channel is a channel on which a base station provides explicit feedback on whether or not the second channel is successfully received.

10. The terminal of claim 9, wherein the second channel is a physical uplink shared channel (PUSCH).

11. The terminal of claim 7, wherein a plurality of CWS values are included in the CAPC of the second channel.

12. The terminal of claim 7, wherein the minimum CWS value is a smallest CWS specified for CAPC of the second channel.

13. An apparatus, comprising:

at least one memory; and at least one processor being operatively connected to the at least one memory, wherein the processor is configured to:

determine a contention window size (CWS) as a first CWS value; and perform a channel access procedure for a first channel based on the first CWS value, wherein the channel access procedure comprises:

i) setting a value for a counter (N) as $N_{init}$, where $N_{init}$ is a random number between 0 and the determined CWS, wherein the determined CWS is based on a channel access priority class signaled to the apparatus, ii) sensing a channel for an additional sensing slot duration, iii) based on the additional sensing slot duration being idle, N being larger than 0, and the terminal choosing to decrement the counter, setting N equal to N−1, and iv) transmitting a signal through the channel after N is zero, and wherein, based on a transmission history of a second channel to be reflected in the determining of the CWS being absent for a specific time duration, the CWS is changed from the first CWS value to a second CWS value which is a minimum CWS value in a specific channel access priority class (CAPC).

14. The apparatus of claim 13, wherein the first channel is a channel on which a base station does not provide explicit feedback on whether or not the first channel is successfully received.

15. The apparatus of claim 13, wherein the second channel is a channel on which a base station provides explicit feedback on whether or not the second channel is successfully received.

16. The apparatus of claim 15, wherein the second channel is a physical uplink shared channel (PUSCH).

17. The apparatus of claim 13, wherein a plurality of CWS values are included in the CAPC of the second channel.

18. The apparatus of claim 13, wherein the minimum CWS value is a smallest CWS specified for CAPC of the second channel.

* * * * *